US010001674B2

(12) United States Patent
Takeda et al.

(10) Patent No.: US 10,001,674 B2
(45) Date of Patent: *Jun. 19, 2018

(54) BRIGHTNESS ENHANCEMENT FILM, OPTICAL SHEET MEMBER, AND LIQUID CRYSTAL DISPLAY DEVICE

(71) Applicant: FUJIFILM Corporation, Tokyo (JP)

(72) Inventors: Jun Takeda, Kanagawa (JP); Yuki Matsuda, Kanagawa (JP); Nobuyuki Akutagawa, Kanagawa (JP); Kotaro Yasuda, Kanagawa (JP); Katsufumi Ohmuro, Kanagawa (JP); Hideyuki Nishikawa, Kanagawa (JP); Akiko Watano, Kanagawa (JP); Yukito Saitoh, Kanagawa (JP); Mitsuyoshi Ichihashi, Kanagawa (JP); Wataru Hoshino, Kanagawa (JP); Hiroyuki Ishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/231,057

(22) Filed: Aug. 8, 2016

(65) Prior Publication Data

US 2016/0342003 A1 Nov. 24, 2016

Related U.S. Application Data

(63) Continuation of application No. PCT/JP2015/053904, filed on Feb. 13, 2015.

(30) Foreign Application Priority Data

Feb. 14, 2014 (JP) .................................. 2014-026616
May 8, 2014 (JP) .................................. 2014-096970
Jun. 20, 2014 (JP) .................................. 2014-127734
Aug. 26, 2014 (JP) .................................. 2014-171778
Oct. 1, 2014 (JP) .................................. 2014-203284

(51) Int. Cl.
*G02F 1/1333* (2006.01)
*G02F 1/13363* (2006.01)
(Continued)

(52) U.S. Cl.
CPC .... *G02F 1/13363* (2013.01); *B29D 11/00644* (2013.01); *B29D 11/00788* (2013.01); *C09K 19/18* (2013.01); *C09K 19/2007* (2013.01); *C09K 19/2014* (2013.01); *C09K 19/24* (2013.01); *C09K 19/3486* (2013.01); *C09K 19/36* (2013.01); *C09K 19/3823* (2013.01); *C09K 19/3852* (2013.01); *C09K 19/50* (2013.01); *C09K 19/544* (2013.01);
(Continued)

(58) Field of Classification Search
CPC .......... G02F 1/13363; G02F 1/133536; G02F 1/133602; G02F 1/133615; G02F 1/13362; G02F 1/133617; G02F 1/133621; G02F 1/133784; G02F 1/133788; G02F 2001/133545; G02F 2001/133614; G02F 2001/133638; G02F 2001/133507; G02F 2202/022; G02F 2202/36; G02F 2203/05; G02F 2413/01; G02F 2413/05; B29D 11/00644; B29D 11/00788; G02B 5/3016; C09K 19/544; C09K 19/56; C09K 19/601; C09K 19/18; C09K 19/2007; C09K 19/36; C09K 19/3823; C09K 19/50; C09K 19/2014; C09K 19/24; C09K 19/3486; C09K 19/3852; C09K 2019/188; C09K 2019/2078; C09K 2019/0429; C09K 2019/0448; C09K 2019/3408
USPC ...................................... 252/299.01; 428/1.1
See application file for complete search history.

(56) References Cited

U.S. PATENT DOCUMENTS 5,828,488 A 10/1998 Ouderkirk et al.
6,061,108 A 5/2000 Anderson et al.
(Continued)

FOREIGN PATENT DOCUMENTS

JP H01-133003 A 5/1989
JP 09-054556 A 2/1997
(Continued)

OTHER PUBLICATIONS

International Preliminary Report on Patentability issued by WIPO dated Aug. 25, 2016, in connection with International Patent Application No. PCT/JP2015/053904.
(Continued)

*Primary Examiner* — Geraldina Visconti
(74) *Attorney, Agent, or Firm* — Edwards Neils LLC; Jean C. Edwards, Esq.

(57) ABSTRACT

Provided are a brightness enhancement film including a λ/4 plate, and a reflection polarizer, in which the reflection polarizer includes at least two light reflection layers formed by immobilizing a cholesteric liquid crystalline phase, one light reflection layer of the reflection layers is a layer formed of a polymerizable liquid crystal composition containing a rod-like liquid crystal compound, and the other light reflection layer is a layer formed of a polymerizable liquid crystal composition containing a disk-like liquid crystal compound, and an optical sheet member including the brightness enhancement film, and a liquid crystal display device including the optical sheet member. The brightness enhancement film of the present invention has high brightness and is able to suppress an oblique change in the shade at the time of being incorporated in a liquid crystal display device.

20 Claims, 3 Drawing Sheets

(51) Int. Cl.

| | |
|---|---|
| *B29D 11/00* | (2006.01) |
| *G02B 5/30* | (2006.01) |
| *C09K 19/18* | (2006.01) |
| *C09K 19/20* | (2006.01) |
| *C09K 19/36* | (2006.01) |
| *C09K 19/38* | (2006.01) |
| *C09K 19/50* | (2006.01) |
| *G02F 1/1337* | (2006.01) |
| *C09K 19/24* | (2006.01) |
| *C09K 19/34* | (2006.01) |
| *C09K 19/54* | (2006.01) |
| *C09K 19/56* | (2006.01) |
| *C09K 19/60* | (2006.01) |
| *G02F 1/1335* | (2006.01) |
| *C09K 19/04* | (2006.01) |

(52) U.S. Cl.
CPC ............ *C09K 19/56* (2013.01); *C09K 19/601* (2013.01); *G02B 5/3016* (2013.01); *G02F 1/13362* (2013.01); *G02F 1/133617* (2013.01); *G02F 1/133621* (2013.01); *G02F 1/133784* (2013.01); *G02F 1/133788* (2013.01); *C09K 2019/0429* (2013.01); *C09K 2019/0448* (2013.01); *C09K 2019/188* (2013.01); *C09K 2019/2078* (2013.01); *C09K 2019/3408* (2013.01); *G02F 1/133536* (2013.01); *G02F 1/133602* (2013.01); *G02F 1/133615* (2013.01); *G02F 2001/133507* (2013.01); *G02F 2001/133545* (2013.01); *G02F 2001/133614* (2013.01); *G02F 2001/133638* (2013.01); *G02F 2202/022* (2013.01); *G02F 2202/36* (2013.01); *G02F 2203/05* (2013.01); *G02F 2413/01* (2013.01); *G02F 2413/05* (2013.01)

(56) References Cited

U.S. PATENT DOCUMENTS

| | | | |
|---|---|---|---|
| 6,084,708 A * | 7/2000 | Schuster | G02B 5/3091 |
| | | | 359/352 |
| 6,175,400 B1 | 1/2001 | Duncan et al. | |
| 6,519,017 B1 | 2/2003 | Ichihashi et al. | |
| 6,825,903 B2 | 11/2004 | Ohtake et al. | |
| 6,839,103 B2 | 1/2005 | Kelly et al. | |
| 9,110,203 B2 | 8/2015 | Seo et al. | |
| 2002/0021392 A1 | 2/2002 | Ohtake et al. | |
| 2003/0164920 A1 | 9/2003 | Kelly et al. | |
| 2007/0064168 A1 | 3/2007 | Shiraogawa et al. | |
| 2009/0101192 A1 | 4/2009 | Kothari et al. | |
| 2010/0007823 A1 | 1/2010 | Haraguchi et al. | |
| 2010/0165466 A1 | 7/2010 | Endo et al. | |
| 2012/0188469 A1 | 7/2012 | Fukui | |
| 2012/0206935 A1 | 8/2012 | Seo et al. | |
| 2012/0230024 A1 | 9/2012 | Moore | |
| 2012/0242948 A1 | 9/2012 | Taguchi et al. | |
| 2013/0010229 A1 | 1/2013 | Shin et al. | |
| 2013/0027634 A1 | 1/2013 | Saneto et al. | |
| 2014/0218668 A1 | 8/2014 | Sakai | |
| 2014/0347613 A1 | 11/2014 | Kim et al. | |
| 2016/0170114 A1* | 6/2016 | Watano | G02B 5/3041 |
| | | | 349/69 |

FOREIGN PATENT DOCUMENTS

| | | |
|---|---|---|
| JP | 2001-004843 A | 1/2001 |
| JP | 2001-081465 A | 3/2001 |
| JP | 2001-183643 A | 7/2001 |
| JP | 2001-290022 A | 10/2001 |
| JP | 2001-305520 A | 10/2001 |
| JP | 2003-270443 A | 9/2003 |
| JP | 3448626 B2 | 9/2003 |
| JP | 3518660 B2 | 4/2004 |
| JP | 2005-128219 A | 5/2005 |
| JP | 4570377 B2 | 10/2010 |
| JP | 2011-221376 A | 11/2011 |
| JP | 2012-169271 | 9/2012 |
| JP | 2013-047794 A | 3/2013 |
| WO | 95/17699 A1 | 6/1995 |
| WO | 2008/016056 A1 | 2/2008 |

OTHER PUBLICATIONS

Notification of Reasons for Refusal issued by the Japanese Patent Office (JPO) dated Jul. 26, 2016 in connection with related Japanese Patent Application No. 2014-171096.
International Search Report issued in connection with International Patent Application No. PCT/JP2014/072209 dated Dec. 9, 2014.
Written Opinion issued in connection with International Patent Application No. PCT/JP2014/072209 dated Dec. 9, 2014.
International Preliminary Report on Patentability issued by WIPO dated Mar. 10, 2016, in connection with International Patent Application No. PCT/JP2014/072209.
International Search Report issued in connection with International Patent Application No. PCT/JP2015/053904 dated May 12, 2015.
Written Opinion issued in connection with International Patent Application No. PCT/JP2015/053904 dated May 12, 2015.
Jian Chen et al.; A High-Efficiency Wide-Color-Gamut Solid-State Backlight System for LCDs Using Quantum Dot Enhancement Film; SID 2012 Digest; Jun. 2012; pp. 895-896; vol. 43, Issue 1; Society for Information Display; U.S.
Notification of Reasons for Refusal issued by the Japanese Patent Office (JPO) dated May 9, 2017 in connection with Japanese Patent Application No. 2014-171096.
Non-Final Office Action issued by the U.S. Patent and Trademark Office (USPTO) dated May 2, 2017 in connection with related U.S. Appl. No. 15/052,312.
Notification of Reasons for Refusal issued by the Japanese Patent Office (JPO) dated Aug. 29, 2017 in connection with related Japanese Patent Application No. 2015-562869.
Office Action, issued by the Korean Intellectual Property Office dated Dec. 14, 2017, in connection with related Korean Patent Application No. 10-2016-7004662.
Notification of Reasons for Refusal issued by the Japanese Patent Office on Jan. 30, 2018, in connection with Japanese Patent Application No. 2015-562869.

* cited by examiner

BRIGHTNESS ENHANCEMENT FILM, OPTICAL SHEET MEMBER, AND LIQUID CRYSTAL DISPLAY DEVICE

CROSS-REFERENCE TO RELATED APPLICATIONS

This application is a continuation of PCT International Application No. PCT/JP2015/053904 filed on Feb. 13, 2015, which was published under PCT Article 21(2) in Japanese, and claims priorities under 35 U.S.C § 119 (a) to Japanese Patent Applications Nos. 2014-026616, 2014-096970, 2014-127734, 2014-171778, and 2014-203284 filed on Feb. 14, May 8, Jun. 20, Aug. 26, and Oct. 1, 2014, respectively. The above applications are hereby expressly incorporated herein by reference, in their entirety, into the present application.

BACKGROUND OF THE INVENTION

1. Field of the Invention

The present invention relates to a brightness enhancement film, an optical sheet member, and a liquid crystal display device. More specifically, the present invention relates to a brightness enhancement film which has high brightness and is able to suppress an oblique change in the shade at the time of being incorporated in a liquid crystal display device, an optical sheet member using the brightness enhancement film, and a liquid crystal display device using the brightness enhancement film.

2. Description of the Related Art

A flat panel display such as a liquid crystal display device (hereinafter, also referred to as LCD) has been annually variously used as a space saving image display device having low power consumption. The liquid crystal display device, for example, is configured by disposing backlight (hereinafter, also referred to as BL), a backlight side polarizing plate, a liquid crystal cell, a visible side polarizing plate, and the like in this order.

In the recent flat panel display market, power saving, high definition, and enhancement in color reproducibility have progressed as enhancement in LCD performance in both large-size application mainly for TV and middle-size and small-size application for a tablet PC or a smart phone.

It has been proposed that a reflection polarizer is disposed between the backlight and the backlight side polarizing plate according to power saving of the backlight. The reflection polarizer is an optical element in which among incident light rays vibrating in all directions, only light rays vibrating in a specific polarization direction are transmitted, and light rays vibrating in the other polarization direction are reflected. Increasing brightness (the degree of brightness per unit area of a light source) by solving low light efficiency of LCD has been expected as a main component for a low power LCD according to an increase in mobile devices and low power consumption of home electric appliances.

In response, in JP3448626B, a technology is disclosed in which an optical sheet member (a dual brightness enhancement film (DBEF: Registered Trademark) or the like) is combined between the backlight and the backlight side polarizing plate, and thus, a light utilization rate of the BL is improved by recycling light, and the brightness is improved while saving power of the backlight.

In JP1989-133003A (JP-H01-133003A), a technology is disclosed in which a reflection range broadens by a reflection polarizing plate configured by laminating a λ/4 plate and a layer formed by immobilizing a cholesteric liquid crystalline phase and three or more layers formed by immobilizing cholesteric liquid crystalline phases in which the pitches of the cholesteric liquid crystalline phases are different from each other, and thus, a light utilization rate of the BL is enhanced by recycling light.

Here, when the reflection polarizing plate configured by laminating the λ/4 plate and the layer formed by immobilizing the cholesteric liquid crystalline phase is incorporated in the liquid crystal display device, it has been known that a change in the shade (also referred to as shade unevenness) when viewed from an oblique direction which is caused by optical properties of the cholesteric liquid crystalline phase and the λ/4 plate easily occurs. In response, in JP3518660B, a method in which the pitch of the cholesteric liquid crystalline phase shortens at an incidence side of the light, and disposing a compensation layer having a refractive index in a vertical direction which is greater than an in-plane refractive index are proposed. In addition, in WO2008/016056A, a method is proposed in which retardation of the λ/4 plate in a thickness direction is set to be less than 0.

In addition, a method is proposed in which a plurality of layers having different pitches are disposed as a polarizing plate using a layer formed by immobilizing other cholesteric liquid crystalline phases in order to broadening the reflection range, and the pitches are gradually changed. In JP4570377B, simply and reliably forming a liquid crystal layer having a structure in which a spiral pitch of the liquid crystal layer is gradually changed in the thickness direction by applying a liquid crystal composition containing a compound having a fluorinated alkyl group onto a transparent substrate, and integrating a retardation element having specific Rth with a ¼ wavelength plate are proposed.

Furthermore, when the layer is formed by immobilizing the cholesteric liquid crystalline phase, in general, a rod-like liquid crystal compound is used as a cholesteric liquid crystal material, and the same reflection function as that of a case of using the rod-like liquid crystal compound is able to be obtained by aligning a disk-like liquid crystal into the shape of a spiral. The disk-like liquid crystal having a spiral structure, for example, is disclosed in JP2001-81465A.

On the other hand, a method has been also known in which a light emitting spectrum of the backlight becomes sharp from the viewpoint of high definition and enhancement in color reproducibility in the liquid crystal display device. For example, in JP2012-169271A, a method is disclosed in which white light is embodied by using a quantum dot (hereinafter, also referred to as QD) emitting red light and green light between a blue LED and a light guide plate as a fluorescent body, and thus, high brightness and enhancement in color reproducibility are realized. In SID'12 DIGEST p. 895, a method of combining a light conversion sheet (QDEF, also referred to as a quantum dot sheet) using a quantum dot for enhancing color reproducibility of the LCD is proposed.

SUMMARY OF THE INVENTION

The technology of enhancing the light utilization rate disclosed in JP3448626B and JP1989-133003A (JP-H01-133003A) is for providing a broadband light recycling function with respect to white light, and thus, has a multilayer configuration and complicated design in consideration of wavelength dispersion properties of a member, and according to this, manufacturing costs increase. In addition, in the fluorescent (PL) application technology disclosed in JP2012-169271A and SID'12 DIGEST p. 895, high brightness and enhancement in color reproducibility are realized by using the quantum dot, compared to the white light, and in a case where the technologies disclosed in JP3448626B and JP1989-133003A (JP-H01-133003A) are combined in order to further improve the brightness, for example, it is necessary to make the design complicated.

On the other hand, the liquid crystal display device using the polarizing plate in which the layer formed by immobilizing the cholesteric liquid crystalline phase and the λ/4 plate disclosed in JP3518660B and WO2008/016056A are combined insufficiently contributes to enhancement in the change in the shade when viewed from the oblique direction, and a problem occurs from the viewpoint of member costs or productivity.

In addition, in the brightness enhancement film disclosed in JP4570377B which gradually changes the spiral pitch, film thickness is thick, which is 120 μm even in a case of only using the retardation element, and thus, it is necessary to further decrease the film thickness in order to apply the film to a liquid crystal panel in which recently thinning has rapidly progressed.

Thus, a member which is able to realize brightness enhancement according to enhancement in a BL light utilization rate necessary for power saving and suppression in the oblique change in the shade has not been known in the related art.

An object of the present invention is to provide a brightness enhancement film which has high front brightness and is able to suppress an oblique change in the shade at the time of being incorporated in a liquid crystal display device.

Therefore, the present inventors have completed the present invention by conducting more intensive studies with respect to the configuration of the brightness enhancement film.

That is, the present invention provides [1] to [19] described below.

[1] A brightness enhancement film, comprising: a λ/4 plate; and a reflection polarizer, in which the reflection polarizer includes a first light reflection layer and a second light reflection layer in this order from the λ/4 plate side, both of the first light reflection layer and the second light reflection layer are light reflection layers formed by immobilizing a cholesteric liquid crystalline phase, and one light reflection layer of the first light reflection layer and the second light reflection layer is a layer formed of a polymerizable liquid crystal composition containing a rod-like liquid crystal compound, and the other light reflection layer is formed of a polymerizable liquid crystal composition containing a disk-like liquid crystal compound.

[2] The brightness enhancement film according to [1], in which at least one of the first light reflection layer or the second light reflection layer is a broadband light reflection layer.

[3] The brightness enhancement film according to [1] or [2], in which the first light reflection layer is a layer formed of a polymerizable liquid crystal composition containing a disk-like liquid crystal compound, and the second light reflection layer is a layer formed of a polymerizable liquid crystal composition containing a rod-like liquid crystal compound.

[4] The brightness enhancement film according to any one of [1] to [3], in which a spiral pitch of a cholesteric liquid crystalline phase of the layer formed of the polymerizable liquid crystal composition containing the rod-like liquid crystal compound is continuously changed in a film thickness direction of the layer.

[5] The brightness enhancement film according to any one of [1] to [4], in which a birefringence Δn of the rod-like liquid crystal compound is greater than or equal to 0.2 and less than or equal to 0.5.

[6] The brightness enhancement film according to any one of [1] to [5], in which one light reflection layer of the first light reflection layer and the second light reflection layer is a broadband light reflection layer which reflects blue light and green light, and the other light reflection layer is a red light reflection layer.

[7] The brightness enhancement film according to [6], in which the red light reflection layer is a light reflection layer which further reflects infrared light.

[8] The brightness enhancement film according to any one of [1] to [5], in which one light reflection layer of the first light reflection layer and the second light reflection layer is a broadband light reflection layer which reflects green light and red light, and the other light reflection layer is a blue light reflection layer.

[9] The brightness enhancement film according to any one of [1] to [8], in which the λ/4 plate is a layer formed of a polymerizable liquid crystal composition containing a disk-like liquid crystal compound.

[10] The brightness enhancement film according to any one of [1] to [9], further comprising: a layer changing a polarization state of light on a side of the reflection polarizer opposite to the λ/4 plate side, in which the layer changing the polarization state of the light satisfies the following conditions.

0<|Average Refractive Index of Layer Changing Polarization State of Light−Average Refractive Index of Light Reflection Layer on Outermost Layer|<0.8

[11] An optical sheet member, comprising: the brightness enhancement film according to any one of [1] to [10]; and a polarizing plate including a polarizer, in which an angle between a slow axis of the λ/4 plate and an absorption axis of the polarizer is 30° to 60°, and the polarizing plate, the λ/4 plate, and the reflection polarizer are disposed in this order.

[12] A liquid crystal display device, sequentially comprising: a liquid crystal cell; a polarizing plate including a polarizer; the brightness enhancement film according to any one of [1] to [10]; and a backlight unit, in which the backlight unit comprises a light source emitting blue light which has a light emission center wavelength in a wavelength range of 430 nm to 500 nm, green light having a light emission center wavelength in a wavelength range of 500 nm to 600 nm, and red light having at least a part of a light emission intensity peak in a wavelength range of 600 nm to 700 nm, and the backlight unit comprises a reflection member performing conversion of a polarization state of light which is emitted from the light source and is reflected on the brightness enhancement film and reflection of the light in the rear of the light source.

[13] The liquid crystal display device according to [12], in which all half-widths of the blue light, the green light, and the red light are less than or equal to 100 nm.

[14] The liquid crystal display device according to [12] or [13], in which the light source is a light source including a blue light emitting diode which emits the blue light, and a fluorescent material which emits the green light and the red light when the blue light of the blue light emitting diode is incident thereon.

[15] The liquid crystal display device according to [14], in which the fluorescent material is a quantum dot member.

[16] The liquid crystal display device according to [12], in which the light source is a white LED.

[17] The liquid crystal display device according to any one of [12] to [16], in which the backlight unit comprises at least one light condensing sheet.

[18] The liquid crystal display device according to [17], in which the light condensing sheet includes a transparent support and a light condensing layer, a surface on the light condensing layer side with respect to the transparent support has an irregular shape, Re of the transparent support at a wavelength of 550 nm is greater than or equal to 0 nm and less than or equal to 20 nm, and Rth of the transparent support at a wavelength of 550 nm is greater than or equal to −80 nm and less than or equal to 80 nm.

[19] The liquid crystal display device according to [17], in which the light condensing sheet is formed of a polymer film, the light condensing sheet is obtained by allowing at least one surface of a substrate to have an irregular shape, Re of the substrate at a wavelength of 550 nm is greater than or equal to 0 nm and less than or equal to 20 nm, and Rth of the substrate at a wavelength of 550 nm is greater than or equal to −80 nm and less than or equal to 80 nm.

According to the present invention, it is possible to provide a brightness enhancement film which has high brightness and is able to suppress an oblique change in the shade at the time of being incorporated in a liquid crystal display device.

DESCRIPTION OF THE PREFERRED EMBODIMENTS

Figure 1:
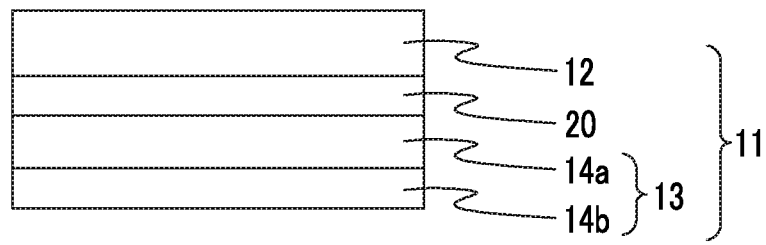
FIG. 1 is a diagram illustrating one embodiment of a layer configuration of a brightness enhancement film of the present invention.
Figure 2:
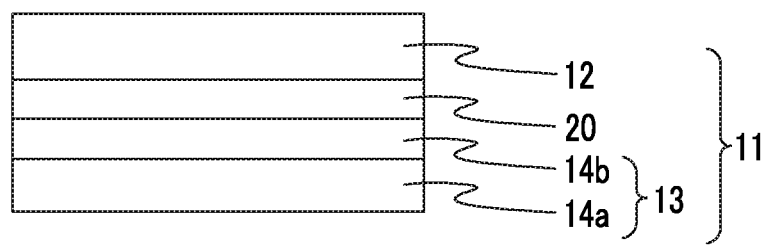
FIG. 2 is a diagram illustrating one embodiment of a layer configuration of the brightness enhancement film of the present invention.

Hereinafter, the present invention will be described in detail.

The following description of configuration requirement is based on a representative embodiment of the present invention, but the present invention is not limited to such an embodiment. Furthermore, herein, a numerical range denoted by using "to" indicates a range including numerical values described before and after "to" as the lower limit value and the upper limit value.

Herein, a "half-width" of a peak indicates the width of a peak at a height of ½ of a peak height. A reflection center wavelength and a half-width of a light reflection layer are able to be obtained as follows.

When a transmission spectrum of a light reflection layer is measured by using a spectrophotometer UV3150 (manufactured by Shimadzu Corporation), a decreasing peak of transmittance in a selective reflection region is observed. Among two wavelengths at which the transmittance becomes transmittance at a height of ½ of the maximum peak height, when the value of the wavelength on a short wave side is λ1 (nm) and the value of the wavelength on a long wave side is λ2 (nm), the reflection center wavelength and the half-width are able to be denoted by the following expressions.

Reflection Center Wavelength=(λ1+λ2)/2

Half-Width=(λ2−λ1)

Herein, Re (λ) and Rth (λ) each represent in-plane retardation and retardation in a thickness direction at a wavelength of λ. The unit of both of Re (λ) and Rth (λ) is nm. Re (λ) is measured by allowing light having a wavelength of λ nm to be incident in a film normal direction using KOBRA 21ADH or WR (manufactured by Oji Scientific Instruments). The measurement is able to be performed by manually replacing a wavelength selective filter or by converting a measured value with a program or the like in a case of selecting a measurement wavelength of λ nm. In a case where a film to be measured is denoted by a uniaxial index ellipsoid or a biaxial index ellipsoid, Rth (λ) is calculated by the following method. Furthermore, a part of the measurement method is used in measurement of an average tilt angle of disk-like liquid crystal molecules on an alignment layer side in an optical anisotropic layer described below and an average tilt angle on a side opposite to the alignment layer side.

In Rth (λ), Re (λ) described above is measured at total 6 points by allowing the light having a wavelength of λ nm to be incident from directions respectively inclined in 10° step from a normal direction to 50° on one side with respect to the film normal direction in which an in-plane slow axis (determined by KOBRA 21ADH or WR) is used as an tilt axis (a rotational axis) (in a case where there is no slow axis, an arbitrary direction of a film plane is used as the rotational axis), and Rth (λ) is calculated by KOBRA 21ADH or WR on the basis of an assumed value of the measured retardation value and the average refractive index, and the input film thickness value. In the above description, in a case of a film having a direction in which a retardation value at a certain tilt angle is zero by using the in-plane slow axis as the rotational axis from the normal direction, a retardation value at an tilt angle greater than the tilt angle described above is changed to have a negative sign, and then, Rth (λ) is calculated by KOBRA 21ADH or WR. Furthermore, a retardation value is measured from two arbitrarily tilted directions by using the slow axis as the tilt axis (the rotational axis) (in a case where there is no slow axis, an arbitrary direction of the film plane is used as the rotational axis), and Rth is able to be calculated by Expression (A) described below and Expression (B) described below on the basis of an assumed value of the retardation value and the average refractive index, and the input film thickness value.

$$Re(\theta) = \left[ nx - \frac{ny \times nz}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \quad \text{Expression (A)}$$

$$\frac{d}{\cos\left(\sin^{-1}\left(\frac{\sin(-\theta)}{nx}\right)\right)}$$

Furthermore, Re (θ) described above indicates a retardation value in a direction tilted by an angle of θ from the normal direction. In addition, in Expression (A), nx represents a refractive index in a slow axis direction in the plane, ny represents a refractive index in a direction orthogonal to nx in the plane, and nz represents a refractive index in a direction orthogonal to nx and ny. d represents a film thickness.

$Rth=((nx+ny)/2-nz)\times d$      Expression (B)

In a case where the film to be measured is a so-called film not having an optic axis which is not able to be denoted by a uniaxial index ellipsoid or a biaxial index ellipsoid, Rth (λ) is calculated by the following method. In Rth (λ), Re (λ) described above is measured at 11 points by allowing the light having a wavelength of λ nm to be incident from directions respectively tilted in 10° step from −50° to +50° with respect to the film normal direction in which the in-plane slow axis (determined by KOBRA 21ADH or WR) is used as the tilt axis (the rotational axis), and Rth (λ) is calculated by KOBRA 21ADH or WR on the basis of an assumed value of the measured retardation value and the average refractive index, and the input film thickness value. In addition, in the measurement described above, a catalog value of various optical films in a polymer handbook (JOHN WILEY&SONS, INC) is able to be used as the assumed value of the average refractive index. In a case where the value of the average refractive index is not known in advance, the value of the average refractive index is able to be measured by using an ABBE'S REFRACTOMETER. The value of the average refractive index of a main optical film will be exemplified as follows: cellulose acylate (1.48), a cycloolefin polymer (1.52), polycarbonate (1.59), polymethyl methacrylate (1.49), and polystyrene (1.59). The assumed values of the average refractive index and the film thickness are input, and thus, nx, ny, and nz are calculated by KOBRA 21ADH or WR. Nz=(nx−nz)/(nx−ny) is further calculated by the calculated nx, ny, and nz.

In a light reflection layer formed by immobilizing a cholesteric liquid crystalline phase, in a case where an ordinary light refractive index no and an extraordinary light refractive index ne of the original liquid crystal are used, the average value of in-plane refractive indices is denoted by (nx+ny)/2=(no+ne)/2.

In addition, the refractive index in the film thickness direction is no, and thus, Rth of the light reflection layer formed by immobilizing the cholesteric liquid crystalline phase is denoted by the following expression. In a brightness enhancement film of the present invention, a value calculated by using the following expression is adopted as Rth of a first light reflection layer and a second light reflection layer, and Rth of the first light reflection layer and the second light reflection layer at a wavelength of λ nm is described as Rth (λ).

$Rth=\{(no+ne)/2-no\}\times d=\{(ne-no)/2\}\times d$

Furthermore, ne and no are able to be measured by an ABBE'S REFRACTOMETER.

In addition, a method using polarization ellipsometry is able to be applied as a method of obtaining Rth of a cholesteric liquid crystal layer.

For example, as described in M. Kimura et al. Jpn. J. Appl. Phys. 48 (2009) 03B021, in a case where an ellipsometry measurement method is used, the thickness, the pitch, the twisted angle, and the like of the cholesteric liquid crystal layer are able to be obtained, and the value of Rth is able to be obtained therefrom.

Herein, "visible light" indicates light having a wavelength of 380 nm to 780 nm. In addition, herein, in a case where a measurement wavelength is not particularly described, the measurement wavelength is 550 nm.

In addition, herein, an angle (for example, an angle of "90°" or the like), and a relationship thereof (for example "orthogonal", "parallel", "intersect at 45°", and the like) include an error range which is allowable in the technical field belonging to the present invention. For example, the angle indicates a range of less than an exact angle ±10°, and an error with respect to the exact angle is preferably less than or equal to 5°, and is more preferably less than or equal to 3°.

Herein, an "absorption axis" and a "transmission axis" of a polarizer or a polarizing plate indicate a direction in which an angle between the absorption axis and the transmission axis is 90°.

Herein, a "slow axis" of a retardation film or the like indicates a direction in which a refractive index is maximized.

In addition, herein, numerical values, numerical ranges, and qualitative expressions (for example, "equivalent", "equal", and the like) indicating optical properties of each member such as phase difference region, a retardation film, and a liquid crystal layer are interpreted as indicating numerical values, numerical ranges, and properties including error which is generally allowable in a liquid crystal display device and the members used therein.

In addition, herein, "front" indicates a normal direction with respect to a display surface.

Herein, a reflection polarizer and a polarizer are separately used.

Herein, a "depolarization degree" of a film indicates a value which is measured and calculated by the following procedure. A linear polarizing plate 1 and the film are arranged such that the film plane is parallel to the linear polarizing plate, light is incident from the linear polarizer 1 side at an angle of −80 degrees to 80 degrees to a film normal direction from a parallel light source, and a color brightness meter BM-5 (manufactured by TOPCON CORPORATION) to which a linear polarizing plate 2 is attached is arranged, and thus, brightness is measured. The linear polarizing plate 2 is timely rotated at the time of performing measurement, and thus, an angle formed of minimum brightness (Ymin) and maximum brightness (Ymax) is found, and the depolarization degree is calculated by Expression 1 described below.

Depolarization Degree=100×(1−(Ymax−Ymin)/(Ymax+Ymin))      (Expression 1)

Herein, "ellipticity" is ellipticity of light. The "ellipticity" indicates a ratio of the length of a short axis of an ellipse obtained from the locus of a light wave to the length of a long axis of the ellipse (the length of the short axis/the length of the long axis). The ellipticity is able to be measured by using a commercially available stokes polarimeter. For example, the ellipticity is able to be measured by using a spectral stokes polarimeter Poxi-spectra manufactured by Tokyo Instruments, Inc. or a stokes polarimeter PMI-VIS manufactured by Meadowlark Optics, Inc. Herein, the "ellipticity" of the film such as a prism sheet is used as an index indicating the size of the retardation of the film. Specifically, in a case where circularly polarized light is incident on a member (for example, a prism sheet), the retardation corresponds to zero as the ellipticity of a polarization state of exiting light is 100% (the circularly polarized light itself), and the retardation corresponds to λ/4 as the ellipticity is 0%.

Ellipticity measurement is able to be performed by a method according to the method disclosed in pp. 90 to 96 of Spectral Ellipsometry (written by Hiroyuki FUJIWARA and published by Maruzen, Inc.) using the same principle as that of the measuring instrument described above.

<Brightness Enhancement Film>

The brightness enhancement film of the present invention includes a λ/4 plate and a reflection. The reflection polarizer of the brightness enhancement film of the present invention includes at least two layers formed by immobilizing cholesteric liquid crystalline phases. The brightness enhancement film may include a support, layer changing a polarization state of light, or the like.

The brightness enhancement film includes a first light reflection layer and a second light reflection layer in this order from the λ/4 plate side, and both of the first light reflection layer and the second light reflection layer are light reflection layers formed by immobilizing cholesteric liquid crystalline phases.

In the brightness enhancement film, it is preferable that two adjacent layers on the λ/4 plate side which are one or more selected from the group consisting of the first light reflection layer and the second light reflection layer are directly in contact with each other.

Examples of a method of laminating the members to be directly in contact with each other are able to include a method of laminating the members by applying the other member onto one member. Alternatively, an adhesive layer may be arranged between the adjacent layers.

In the brightness enhancement film, the brightness of the liquid crystal display device is improved by the following mechanism at the time of incorporating the brightness enhancement film in the liquid crystal display device.

The light reflection layer formed by immobilizing the cholesteric liquid crystalline phase which is included in the reflection polarizer of the brightness enhancement film reflects at least one (circularly polarized light in a first polarization state) of right circularly polarized light or left circularly polarized light in a wavelength range in the vicinity of the reflection center wavelength and transmits the other one (circularly polarized light in a second polarization state). The direction and the polarization state of the reflected circularly polarized light in the second polarization state are randomized and recirculated by a reflection member described below (also referred to as a light guide device and an optical resonator), and a part of the light is reflected again by the reflection polarizer as the circularly polarized light in the first polarization state and a part of the remaining light is transmitted as the circularly polarized light in the second polarization state, and thus, a light utilization rate on a backlight side increases and the brightness of the liquid crystal display device is able to be enhanced.

The polarization state of the light exiting from the reflection polarizer, that is, the polarization state of transmitted light and reflected light of the reflection polarizer, for example, is able to be measured by performing polarization measurement using Axoscan manufactured by Axometrics Inc.

<λ/4 Plate>

The brightness enhancement film of the present invention includes the λ/4 plate.

The λ/4 plate indicates an optical anisotropic layer in which in-plane retardation Re (λ) at a specific wavelength of λ nm satisfies Re (λ)=λ/4. In the brightness enhancement film, the λ/4 plate functions as a layer for converting circularly polarized light obtained by being transmitted through the reflection polarizer into linearly polarized light.

It is preferable that the λ/4 plate satisfies at least one of Expression (A), (B), or (C) described below, and it is more preferable that the λ/4 plate satisfies all of Expressions (A) to (C) described below.

$$450 \text{ nm}/4-35 \text{ nm} < Re(450) < 450 \text{ nm}/4+35 \text{ nm} \quad \text{Expression (A)}$$

$$550 \text{ nm}/4-35 \text{ nm} < Re(550) < 550 \text{ nm}/4+35 \text{ nm} \quad \text{Expression (B)}$$

$$630 \text{ nm}/4-35 \text{ nm} < Re(630) < 630 \text{ nm}/4+35 \text{ nm} \quad \text{Expression (C)}$$

(In Expressions (A) to (C), Re (λ) represents retardation (Unit: nm) in an in-plane direction at a wavelength of λ nm).

By adjusting Rth, the λ/4 plate is also able to cancel the retardation of the light reflection layer in a thickness direction which occurs in a case of being viewed from an oblique azimuth.

Rth (550) of the λ/4 plate is preferably −120 nm to 120 nm, is more preferably −80 nm to 80 nm, and is particularly preferably −70 nm to 70 nm.

A method disclosed in JP1996-271731A (JP-H08-271731A) is able to be used as a manufacturing method of the λ/4 plate. The λ/4 plate may be a single layer, or a laminated body of two or more layers, and it is preferable that the λ/4 plate is a laminated body of two or more layers. In particular, it is more preferable that the λ/4 plate is a (approximately optically monoaxial or biaxial) retardation film or one or more retardation films including at least one of liquid crystal compounds (a disk-like liquid crystal, a rod-like liquid crystal, or a cholesteric liquid crystal) formed by polymerizing a liquid crystal monomer exhibiting a nematic liquid crystal layer or a smectic liquid crystal layer. A retardation film which is subjected to stretching of transport direction stretching or stretching in a direction vertical to the transport direction, and 45-degree stretching is able to be selected as the retardation film, and in consideration of manufacturability, a retardation film formed by performing 45-degree stretching with respect to a cyclic polyolefin resin (a norbornene-based resin) in which an optical sheet member is able to be prepared by a so-called roll to roll process, or a film including a layer in which a transparent film is subjected to an alignment treatment, liquid crystal compounds are aligned at a 45-degree azimuth with respect to the transport direction at the time of manufacturing the film are preferable. At this time, in a case where a transparent substrate having positive Rth is used, it is preferable that a disk-like liquid crystal compound having negative Rth in an alignment state is used.

Hereinafter, the material and the manufacturing method of the λ/4 plate will be described in detail.

The material used in the λ/4 plate included in the brightness enhancement film of the present invention is not particularly limited. Various polymer films, for example, a polyester-based polymer such as cellulose acylate, polycarbonate-based polymer, polyethylene terephthalate, or polyethylene naphthalate, an acrylic polymer such as polymethyl methacrylate, a styrene-based polymer such as polystyrene or an acrylonitrile-styrene copolymer (an AS resin), and the like are able to be used. In addition, a polymer film is prepared by using one type or two or more types of polymers are selected from polyolefin such as polyethylene and polypropylene, a polyolefin-based polymer such as an ethylene-propylene copolymer, an amide-based polymer such as a vinyl chloride-based polymer, nylon, or aromatic polyamide, an imide-based polymer, a sulfone-based polymer, a polyether sulfone-based polymer, a polyether ether ketone-based polymer, a polyphenylene sulfide-based polymer, a vinylidene chloride-based polymer, a vinyl alcohol-based polymer, a vinyl butyral-based polymer, an acrylate-based polymer, a polyoxymethylene-based polymer, an epoxy-based polymer, or a polymer in which the polymers described above are mixed as a main component, and the polymers are used for preparing an optical film in a combination of satisfying the properties described above.

The λ/4 plate may be an optical anisotropy support having a desired λ/4 function in the support itself, or may be a plate including an optical anisotropic layer or the like on the support formed of a polymer film.

When the λ/4 plate is the optical anisotropy support having a desired λ/4 function in the support itself, for example, the optical anisotropy support is able to be obtained by a method in which a polymer film is subject to a monoaxial stretching treatment or a biaxial stretching treatment, or the like. The type of polymer is not particularly limited, but a polymer having excellent transparency is preferably used. Examples of the polymer include the materials used in the λ/4 plate, a cellulose acylate film (for example, a cellulose triacetate film (a refractive index of 1.48), a cellulose diacetate film, a cellulose acetate butyrate film, and a cellulose acetate propionate film), polyolefin such as polyethylene and polypropylene, a polyester resin-based film such as polyethylene terephthalate and polyethylene naphthalate, a polyacrylic resin film such as a polyether sulfone film and a polymethyl methacrylate, a polyurethane-based resin film, a polyester film, a polycarbonate film, a polysulfone film, a polyether film, a polymethyl pentene film, a polyether ketone film, a (meth)acrylonitrile film, polyolefin, a polymer having an alicyclic structure (a norbornene-based resin (ARTON: Product Name, manufactured by JSR Corporation), amorphous polyolefin (ZEONEX: Product Name, manufactured by Zeon Corporation)), and the like. Among them, the triacetyl cellulose, the polyethylene terephthalate, and the polymer having an alicyclic structure are preferable, and the triacetyl cellulose is particularly preferable.

As described below, an angle between a slow axis direction of the λ/4 plate and an absorption axis direction of the polarizing plate is 30° to 60°, is preferably 35° to 55°, is more preferably 40° to 50°, and is particularly preferably 45°. When the polarizing plate is prepared in a roll to roll manner, in general, a longitudinal direction (a transport direction) is an absorption axis direction, and thus, it is preferable that an angle between the slow axis direction of the λ/4 plate and the longitudinal direction is 30° to 60°. A manufacturing method of the λ/4 plate in which the angle between the slow axis direction and the longitudinal direction is 30° to 60° is not particularly limited insofar as an alignment axis of a polymer is inclined at a desired angle by being continuously stretched in a direction at 30° to 60° with respect to the longitudinal direction, and a known method is able to be adopted as the manufacturing method. In addition, a stretching machine used in oblique stretching is not particularly limited, but a known tenter stretching machine of the related art is able to be used in which a feeding force or pulling force, or a taking off force having speeds different in right and left is able to be applied in a horizontal direction or a vertical direction. In addition, examples of a tenter type stretching machine include a horizontally monoaxially stretching machine, a simultaneously biaxially stretching machine, and the like, but the tenter type stretching machine is not particularly limited insofar as a long film is able to be continuously subjected to an oblique stretching treatment, and various types of stretching machines are able to be used.

For example, methods disclosed in JP1975-83482A (JP-S50-83482A), JP1990-113920A (JP-H02-113920A), JP1991-182701A (JP-H03-182701A), JP2000-9912A, JP2002-86554A, JP2002-22944A, and WO2007/111313A are able to be used as a method of the oblique stretching.

In a case where the λ/4 plate include the optical anisotropic layer or the like on the support formed of the polymer film, other layers are laminated on the support, and thus, a desired λ/4 function is obtained. The configuration material of the optical anisotropic layer is not particularly limited, but the optical anisotropic layer may be a layer which is formed of a composition containing a liquid crystal compound and exhibits optical anisotropy expressed by aligning molecules of the liquid crystal compound or a layer which has optical anisotropy expressed by stretching a polymer film and by aligning the polymer in the film, or may be both of the layers. That is, the optical anisotropic layer is able to be configured of one or two or more biaxial films, and is also able to be configured of a combination of two or more monoaxial films such as a combination of a C plate and an A plate. Naturally, the optical anisotropic layer is able to be configured of a combination of one or more biaxial films and one or more monoaxial films.

It is preferable that the λ/4 plate includes at least one layer formed of the composition containing the liquid crystal compound. That is, it is preferable that the λ/4 plate is a laminated body of the polymer film (the support) and the optical anisotropic layer formed of the composition containing the liquid crystal compound.

A polymer film having small optical anisotropy may be used in the support, or a polymer film in which optical anisotropy is expressed by a stretching treatment may be used. It is preferable that the support has light transmittance of greater than or equal to 80%. A specific example of the support will be described below.

In addition, the type of liquid crystal compound which is used for forming the optical anisotropic layer is not particularly limited. For example, an optical anisotropic layer which is obtained by forming a low molecular liquid crystal compound in nematic alignment or smectic alignment in a liquid crystal state, and then, by immobilizing the alignment by photocross-linking or thermal cross-linking, or an optical anisotropic layer which is obtained by forming a high molecular liquid crystal compound in nematic alignment or smectic alignment in a liquid crystal state, and then, by immobilizing the alignment by cooling is able to be used. Furthermore, in the present invention, even in a case where the liquid crystal compound is used in the optical anisotropic layer, the optical anisotropic layer is a layer formed by immobilizing the liquid crystal compound by polymerization or the like, and it is not necessary to exhibit liquid crystallinity any more after the layer is formed. A polymerizable liquid crystal compound may be a multifunctional polymerizable liquid crystal or a monofunctional polymerizable liquid crystal compound. In addition, the liquid crystal compound may be a disk-like liquid crystal compound, or may be a rod-like liquid crystal compound. In the present invention, the disk-like liquid crystal compound is more preferable.

The material and the preparation method for preparing the λ/4 plate which is formed of a composition containing a liquid crystal compound can be referred to the preparation of the light reflection layer described below. However, it is preferable that the composition for preparing the λ/4 plate does not contain a chiral agent.

In the optical anisotropic layer described above, it is preferable that the molecules of the liquid crystal compound are immobilized in any one alignment state of a vertical alignment, a horizontal alignment, a hybrid alignment, and an tilt alignment. In order to prepare a phase difference plate having symmetric view angle dependency, it is preferable that a disk surface of the disk-like liquid crystal compound is substantially vertical to a film surface (the surface of the optical anisotropic layer), or a long axis of the rod-like liquid crystal compound is substantially horizontal to the film surface (the surface of the optical anisotropic layer). The disk-like liquid crystal compound being substantially vertical to the film surface indicates that the average value of an angle between the film surface (the surface of the optical anisotropic layer) and the disk surface of the disk-like liquid crystal compound is in a range of 70° to 90°. The average value of the angle is more preferably 80° to 90°, and is even more preferably 85° to 90°. The rod-like liquid crystal compound being substantially horizontal to the film surface indicates that an angle between the film surface (the surface of the optical anisotropic layer) and a director of the rod-like liquid crystal compound is in a range of 0° to 20°. The angle is more preferably 0° to 10°, and is even more preferably 0° to 5°.

The optical anisotropic layer described above is able to be formed by applying a coating liquid containing the liquid crystal compound such as the rod-like liquid crystal compound or the disk-like liquid crystal compound, and as desired, a polymerization initiator or an alignment control agent described below, or other additives onto the support. It is preferable that the optical anisotropic layer is formed by forming the alignment layer on the support, and by coating the surface of the alignment layer with the coating liquid described above.

<Reflection Polarizer>

In the brightness enhancement film of the present invention, the reflection polarizer includes at least two light reflection layers formed by immobilizing cholesteric liquid crystalline phases. It is preferable that the reflection polarizer includes two to four light reflection layers, it is more preferable that the reflection polarizer includes two to three light reflection layers, it is even more preferable that the reflection polarizer includes two light reflection layers. The reflection polarizer including two light reflection layers indicates that the reflection polarizer includes only two light reflection layers. The two layers to be included may be separated from each other according to the composition, the optical properties, or the manufacturing step. The reflection polarizer may include other layers such as an adhesive layer or an alignment layer.

The film thickness of the reflection polarizer may be 2 μm to 25 μm, is preferably 2 μm to 20 μm, is more preferably greater than or equal to 5.0 μm and less than 15 μm, and is particularly preferably greater than or equal to 6 μm and less than or equal to 10 μm. According to a configuration in which adjacent light reflection layers are directly in contact with each other, it is possible to further decrease the film thickness of the reflection polarizer.

Herein, in a case where two or more light reflection layers of the reflection polarizer are referred, numbers are sequentially applied to the light reflection layers from the λ/4 plate side. For example, in a case where the polarizer layer includes four light reflection layers, the four light reflection layers will be sequentially referred to as a first light reflection layer, a second light reflection layer, a third light reflection layer, and a fourth light reflection layer from the λ/4 plate side, and in a case where the polarizer layer includes three light reflection layers, the three light reflection layers will be sequentially referred to as a first light reflection layer, a second light reflection layer, and a third light reflection layer from the λ/4 plate side. In a case where the polarizer layer includes two light reflection layers, one light reflection layer closer to the λ/4 plate side will be referred to as a first light reflection layer, and the other light reflection layer will be referred to as a second light reflection layer.

In the brightness enhancement film of the present invention, the reflection polarizer includes a layer formed of a polymerizable liquid crystal composition containing a rod-like liquid crystal compound, and a layer formed of a polymerizable liquid crystal composition containing a disk-like liquid crystal compound. In the first light reflection layer and the second light reflection layer, one light reflection layer is the layer formed of the polymerizable liquid crystal composition containing the rod-like liquid crystal compound, and the other light reflection layer is the layer formed of the polymerizable liquid crystal composition containing the disk-like liquid crystal compound. The first light reflection layer may be the layer formed of the polymerizable liquid crystal composition containing the rod-like liquid crystal compound and the second light reflection layer may be the layer formed of the polymerizable liquid crystal composition containing the disk-like liquid crystal compound, or the first light reflection layer may be the layer formed of the polymerizable liquid crystal composition containing the disk-like liquid crystal compound and the second light reflection layer may be the layer formed of the polymerizable liquid crystal composition containing the rod-like liquid crystal compound.

Furthermore, herein, the layer formed of the polymerizable liquid crystal composition containing the disk-like liquid crystal compound indicates a layer formed of a polymerizable liquid crystal composition in which the main component of a liquid crystal compound to be contained is a disk-like liquid crystal compound, and the layer formed of the polymerizable liquid crystal composition containing the rod-like liquid crystal compound indicates a layer formed of a polymerizable liquid crystal composition in which the main component of a liquid crystal compound to be contained is a rod-like liquid crystal compound. The main component indicates that a mass ratio of a component is greater than or equal to 80 mass % with respect to the total mass of the liquid crystal compound. The mass ratio of the liquid crystal compound which is the main component is preferably greater than or equal to 90 mass %, is more preferably greater than or equal to 95 mass %, is even more preferably greater than or equal to 99 mass %, and is particularly preferably 100 mass %, with respect to the total mass of the liquid crystal compound in the polymerizable liquid crystal composition.

As described below, in general, the layer formed of the polymerizable liquid crystal composition is a layer obtained by applying a polymerizable liquid crystal composition onto the other layer, and then, by curing a coated film. In the layer formed of the polymerizable liquid crystal composition containing the rod-like liquid crystal compound, Rth substantially functions as a positive value with respect to light having a wavelength other than a wavelength range exhibiting selective reflection, and in the layer formed of the polymerizable liquid crystal composition containing the disk-like liquid crystal compound, Rth substantially functions as a negative value. In a case where the signs of the first light reflection layer and the second light reflection layer, and Rth are reversed, the retardation is able to be compensated and an oblique change in the shade is able to be suppressed. On the other hand, in the preliminary studies of the present inventors, even in a case where the layer formed of the polymerizable liquid crystal composition containing the rod-like liquid crystal compound (Rth is positive) and a biaxial film having negative Rth are used in combination, the same effect is not able to be obtained. For this reason, it is considered that the retardation is able to be compensated and the oblique change in the shade is able to be suppressed by a configuration using a rod-like liquid crystal compound and a disk-like liquid crystal compound.

In the brightness enhancement film of the present invention, it is preferable that the reflection polarizer has a function of reflecting blue light, green light, and red light. In addition, it is preferable that the brightness enhancement film including the reflection polarizer preferably has a region of greater than or equal to 150 nm in which reflectivity is greater than or equal to 40%, more preferably has a region of greater than or equal to 170 nm in which the reflectivity is greater than or equal to 40%, and even more preferably has a region of greater than or equal to 200 nm in which the reflectivity is greater than or equal to 40%. The region in which the reflectivity is greater than or equal to 40% may be measured as a region in which transmittance is greater than or equal to 60%. Furthermore, the transmittance indicates a value obtained by measuring transmittance of a film by using a general spectrophotometer. Specifically, transmittance at the time of measuring the transmittance of the film by spectral transmittance measurement using UV3150 manufactured by Shimadzu Corporation is able to be used. The reflectivity indicates a value in which light is incident from a direction of 5°, and light to be reflected is integrating accumulated by an integrating sphere.

Further, it is preferable that the reflection polarizer includes one broadband light reflection layer, it is preferable that at least one of the first light reflection layer or the second light reflection layer is a broadband light reflection layer, and it is preferable that any one of the first light reflection layer and the second light reflection layer is a broadband light reflection layer. The broadband light reflection layer is a light reflection layer having reflectivity of greater than or equal to 40% in the entire range of a continuous wavelength width of greater than or equal to 150 nm in a visible light wavelength range. Any one of the first light reflection layer and the second light reflection layer may be the broadband light reflection layer, and it is preferable that the layer formed of polymerizable liquid crystal composition containing the rod-like liquid crystal compound is the broadband light reflection layer. The broadband light reflection layer is a layer which reflects at least one light of blue light, green light, or red light, and further reflects light in a wavelength region exceeding the wavelength region of the one light. For example, the broadband light reflection layer may be a layer which reflects blue light and green light by one layer or a layer which reflects green light and red light by one layer.

In the present invention, the blue light is light having a wavelength of 380 nm to 499 nm, the green light is light having a wavelength of 500 nm to 599 nm, and the red light is light having a wavelength of 600 nm to 780 nm. In addition, infrared light is light having a wavelength of 780 nm to 850 nm.

[First Preferred Embodiment of Reflection Polarizer Including Two Light Reflection Layers]

A first preferred embodiment of the reflection polarizer including two light reflection layers is an embodiment in which any one of the first light reflection layer and the second light reflection layer is a broadband light reflection layer which reflects the blue light and the green light, and the other is a red light reflection layer. Specifically, it is preferable that any one of the first light reflection layer and the second light reflection layer is a light reflection layer reflecting blue light and green light which has a reflectivity peak having a reflection center wavelength of 380 nm to 599 nm and a half-width of less than or equal to 220 nm, and the other is a red light reflection layer which has a reflectivity peak having a reflection center wavelength of 600 nm to 750 nm and a half-width of less than or equal to 200 nm.

The light reflection layer reflecting the blue light and the green light has a reflectivity peak having a reflection center wavelength in a wavelength range of 380 nm to 599 nm and a half-width of less than or equal to 250 nm. It is preferable that the half-width is greater than or equal to 100 nm.

The reflection center wavelength of the light reflection layer reflecting the blue light and the green light is preferably in a wavelength range of 430 nm to 590 nm, and is more preferably in a wavelength range of 430 nm to 580 nm.

The half-width of the reflectivity peak of the light reflection layer reflecting the blue light and the green light is preferably less than or equal to 300 nm, and is more preferably less than or equal to 250 nm, is even more preferably less than or equal to 220 nm, is particularly preferably less than or equal to 210 nm, and is most preferably less than or equal to 200 nm.

It is preferable that the light reflection layer reflecting the blue light and the green light does not have a reflectivity peak in a wavelength range of 600 nm to 750 nm. In addition, in the light reflection layer reflecting the blue light and the green light, it is preferable that the average reflectivity in the wavelength range of 600 nm to 750 nm is less than or equal to 5%.

A film thickness d of the reflection layer reflecting the blue light and the green light is preferably 0.5 µm to 10 µm, and is more preferably greater than or equal to 1.0 µm and less than 9 µm.

The red light reflection layer has a reflectivity peak having a reflection center wavelength in a wavelength range of 600 nm to 750 nm and a half-width of less than or equal to 200 nm.

The reflection center wavelength of the red light reflection layer is preferably in a wavelength range of 610 nm to 690 nm, and is more preferably in a wavelength range of 610 nm to 660 nm.

The half-width of the reflectivity peak of the red light reflection layer is preferably less than or equal to 200 nm, is more preferably less than or equal to 190 nm, and is particularly preferably less than or equal to 180 nm.

It is preferable that the red light reflection layer does not have a reflectivity peak in a wavelength range of 380 nm to 499 nm and 500 nm to 599 nm. In addition, in the red light reflection layer, it is preferable that the average reflectivity in the wavelength range of 380 nm to 499 nm and 500 nm to 599 nm is less than or equal to 5%.

[Second Preferred Embodiment of Reflection Polarizer Including Two Light Reflection Layers]

A second preferred embodiment of the reflection polarizer including two light reflection layers is an embodiment in which any one of the first light reflection layer and the second light reflection layer is a broadband light reflection layer reflecting green light and red light, and the other is a blue light reflection layer. Specifically, any one the first light reflection layer and the second light reflection layer of the reflection polarizer is a blue light reflection layer which has a reflectivity peak having a reflection center wavelength of 380 nm to 499 nm and a half-width of less than or equal to 120 nm, and any one of the first light reflection layer and the second light reflection layer of the reflection polarizer is a light reflection layer reflecting green light and red light which has a reflectivity peak having a reflection center wavelength of 500 nm to 750 nm and a half-width of less than or equal to 300 nm.

The blue light reflection layer has a reflectivity peak having a reflection center wavelength in a wavelength range of 380 nm to 499 nm and a half-width of less than or equal to 120 nm.

The reflection center wavelength of the blue light reflection layer is preferably in a wavelength range of 430 nm to 480 nm, and is more preferably in a wavelength range of 430 nm to 470 nm.

The half-width of the reflectivity peak of the blue light reflection layer is preferably less than or equal to 120 nm, is more preferably less than or equal to 110 nm, and is particularly preferably less than or equal to 100 nm.

It is preferable that the blue light reflection layer does not have a reflectivity peak in a wavelength range of 500 nm to 750 nm. In addition, in the blue light reflection layer, it is preferable that the average reflectivity in a wavelength range of 500 nm to 750 nm is less than or equal to 5%.

A film thickness d of the blue light reflection layer is preferably 0.5 μm to 3.0 μm, and is more preferably 1.0 μm to 2.6 μm.

The light reflection layer reflecting the green light and the red light has a reflectivity peak having a reflection center wavelength in a wavelength range of 500 nm to 750 nm and a half-width of less than or equal to 300 nm. It is preferable that the half-width is greater than or equal to 100 nm.

The reflection center wavelength of the light reflection layer reflecting the green light and the red light is preferably in a wavelength range of 520 nm to 690 nm, and is more preferably in a wavelength range of 520 nm to 660 nm.

The half-width of the reflectivity peak of the light reflection layer reflecting the green light and the red light is preferably less than or equal to 300 nm, is more preferably less than or equal to 290 nm, and is particularly preferably less than or equal to 280 nm.

It is preferable that the light reflection layer reflecting the green light and the red light has not a reflectivity peak in a wavelength range of 380 nm to 499 nm. In addition, in the light reflection layer reflecting the green light and the red light, it is preferable that the average reflectivity in a wavelength range of 380 nm to 499 nm is less than or equal to 5%.

A film thickness d of the light reflection layer reflecting the green light and the red light is preferably 0.8 μm to 10 μm, and is more preferably greater than or equal to 1.5 μm and less than 9 μm.

[Reflection of Infrared Light]

Further, a method of widening a reflection range to an infrared range is preferable as means for suppressing an oblique change in the shade.

A principle of widening the reflection range to the infrared range and of improving a shade is as follows.

Even in a case where the reflection range of the cholesteric liquid crystal layer includes the red light, the green light, and the blue light with respect to front incidence light, the reflection range is shifted to a short wave side with respect to the oblique light, and thus, a red reflection layer performs green reflection, a green reflection layer performs blue reflection, and a blue reflection layer performs ultraviolet reflection, with respect to the oblique light.

For this reason, the red light, the green light, and the blue light are reflected on a front surface with an excellent balance, and thus, a change in the shade decreases, but reflection components of the red light in the oblique direction are reduced, and a balance among the red light, the green light, and the blue light is broken and the change in the shade increases.

In order to prevent such a problem, in a case where a layer which is able to reflect light in a infrared range is disposed on the front surface, an infrared reflection layer reflects infrared light with respect to the oblique light, and thus, the balance among the red light, the green light, and the blue light is able to be retained even in the oblique direction and the change in the shade is able to be suppressed. For example, in the first preferred embodiment described above, the red light reflection layer may be a light reflection layer reflecting infrared light. At this time, it is preferable that the red light reflection layer has an optical spectrum having a reflection center wavelength in a wavelength range of 500 nm to 900 nm and a half-width of greater than or equal to 150 nm.

[Other Preferred Embodiments]

A reflection polarizer having low reflectivity in a range of a wavelength of 470 nm to 500 nm is also preferable. Specifically, the reflectivity is preferably less than or equal to 30%, is more preferably less than or equal to 27%, and is even more preferably less than or equal to 25%. Furthermore, here, the reflectivity indicates a value in which light is incident from a direction of 5°, and light to be reflected is integrating accumulated by an integrating sphere.

[Light Reflection Layer]

The light reflection layer formed by immobilizing the cholesteric liquid crystalline phase (herein, may be referred to as a "cholesteric liquid crystal layer") indicates selective reflection having a reflection center wavelength λ based on a spiral cycle of a cholesteric liquid crystalline phase. The light reflection layer formed by immobilizing the cholesteric liquid crystalline phase selectively reflects any one of right circularly polarized light and left circularly polarized light in a wavelength range exhibiting selective reflection, and transmits the other circularly polarized light. The reflection center wavelength λ depends on a pitch length P (the spiral cycle) of a spiral structure of the cholesteric liquid crystalline phase, and accords with a relationship of λ=n×P with respect to an average refractive index n of the cholesteric liquid crystal layer. The average refractive index n is (no+ne)/2 described above. In a half-width Δλ of the selective reflection, Δλ depends on birefringence Δn of a liquid crystal compound and the pitch length P described above, and accords with a relationship of Δλ=Δn×P.

(Polymerizable Liquid Crystal Composition)

The polymerizable liquid crystal composition for forming the light reflection layer may contain a liquid crystal compound, and the polymerizable liquid crystal composition for forming the light reflection layer may contain other components such as a chiral agent, an alignment control agent, a polymerization initiator, and an alignment aid.

The light reflection layer is able to be obtained by applying the polymerizable liquid crystal composition onto other layers such as a λ/4 plate, other light reflection layers, a temporary support, and an alignment layer, and then, by curing a coated film.

(Liquid Crystal Compound)

Examples of the liquid crystal compound include a rod-like liquid crystal compound and a disk-like liquid crystal compound.

Azomethines, azoxys, cyanobiphenyls, cyanophenyl esters, benzoic acid esters, phenyl cyclohexane carboxylic acid esters, cyanophenyl cyclohexanes, cyano-substituted phenyl pyrimidines, alkoxy-substituted phenyl pyrimidines, phenyl dioxanes, trans, and alkenyl cyclohexyl benzonitriles are preferably used as the rod-like liquid crystal compound. It is possible to use not only low molecular liquid crystalline molecules as described above but also high molecular liquid crystalline molecules.

It is more preferable that alignment is immobilized by polymerizing the rod-like liquid crystal compound, and compound disclosed in Makromol. Chem., Vol. 190, p. 2255 (1989), Advanced Materials, Vol. 5, p. 107 (1993), U.S. Pat. No. 4,683,327A, U.S. Pat. No. 5,622,648A, U.S. Pat. No. 5,770,107A, WO95/22586A, WO95/24455A, WO97/00600A, WO98/23580A, WO98/52905A, JP1989-272551A (JP-H01-272551A), 1994-16616A (JP-H06-16616A), 1995-110469A (JP-H07-110469A), JP1999-80081A (JP-H11-80081A), JP2001-64627A, and the like are able to be used as a polymerizable rod-like liquid crystal compound. Further, for example, a rod-like liquid crystal compound disclosed in JP1999-513019A (JP-H11-513019A) or JP2007-279688A is able to be preferably used as the rod-like liquid crystal compound.

For example, a disk-like liquid crystal compound disclosed in JP2007-108732A or JP2010-244038A is able to be preferably used as the disk-like liquid crystal compound, but the disk-like liquid crystal compound is not limited thereto.

Hereinafter, a preferred example of the disk-like liquid crystal compound will be described, but the present invention is not limited thereto.

disclosed in Liquid Crystal Device Handbook, Chapter 3, pp. 4-3, a chiral agent for TN and STN, and a chiral agent disclosed in p. 199, Japan Society for the Promotion of Science edited by the 142nd committee in 1989) are able to be used. In general, the chiral agent includes an asymmetric carbon atom, but an axial asymmetric compound or a planar asymmetric compound which does not include the asymmetric carbon atom is also able to be used as the chiral agent. In an example of the axial asymmetric compound or the planar asymmetric compound, binaphthyl, helicene, paracyclophane, and a derivative thereof are included. The chiral agent may have a polymerizable group. In a case where the chiral agent has a polymerizable group and the rod-like liquid crystal compound used together also has a polymerizable group, a polymer having a repeating unit derived from the rod-like liquid crystal compound and a repeating unit derived from the chiral agent is able to be formed by a polymerization reaction between the chiral agent having a polymerizable group and a polymerizable rod-like liquid crystal compound. In the embodiment, it is preferable that the polymerizable group of the chiral agent having a polymerizable group is identical to the polymerizable group of the polymerizable rod-like liquid crystal compound. Accordingly, the polymerizable group of the chiral agent is preferably an unsaturated polymerizable group, an epoxy group,

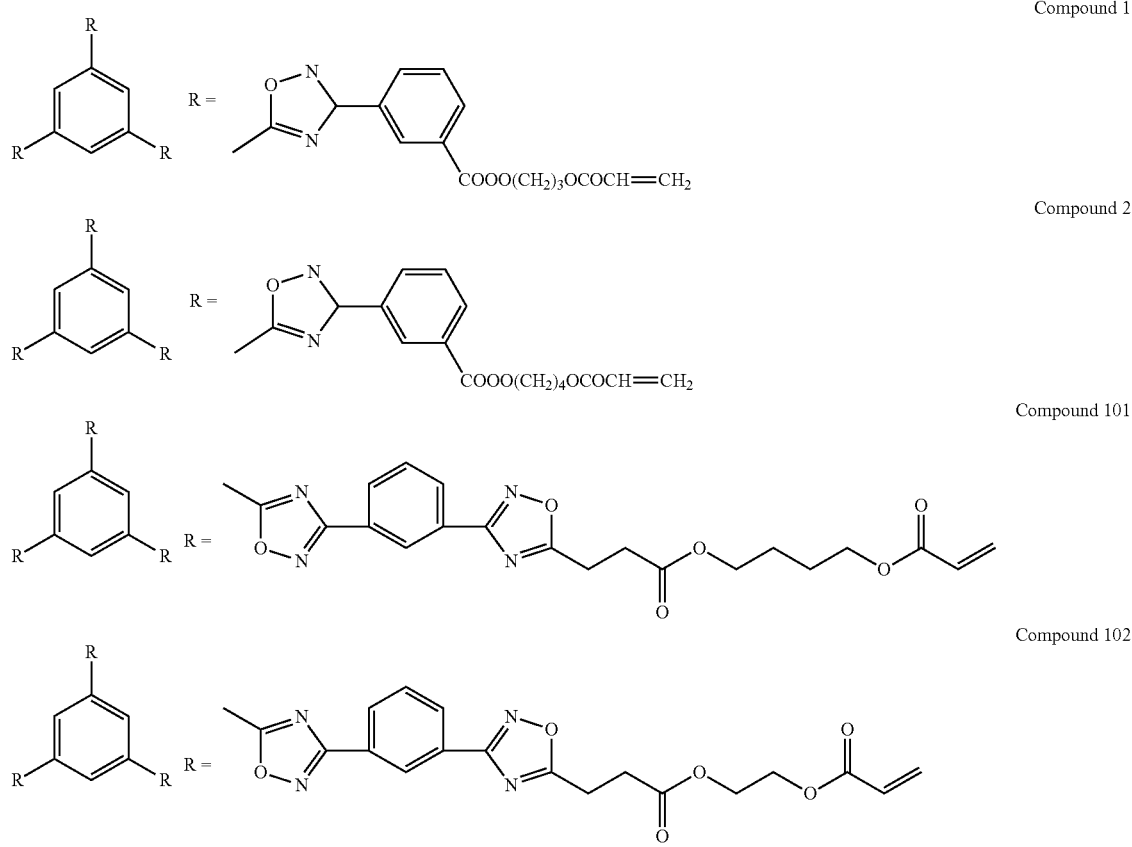

(Chiral Agent)

The chiral agent is a compound for adjusting the spiral cycle of the cholesteric liquid crystal compound, and will be also referred to as a chiral agent. In the present invention, various known chiral agents (for example, a chiral agent or an aziridinyl group, is more preferably an unsaturated polymerizable group, and is particularly preferably an ethylenically unsaturated polymerizable group.

In addition, the chiral agent described above may be a liquid crystal compound.

Examples of the chiral agent exhibiting a strong twisting force include chiral agents disclosed in JP2010-181852A, JP2003-287623A, JP2002-80851A, JP2002-80478A, and JP2002-302487A, and the chiral agents are able to be preferably used in the present invention. Further, isomannide compounds having a corresponding structure are able to be used as isosorbide compounds disclosed in the publications, and isosorbide compounds having a corresponding structure are able to be used as isomannide compounds disclosed in the publications.

(Alignment Control Agent)

In an example of the alignment control agent described above, a compound exemplified in [0092] and [0093] of JP2005-99248A, a compound exemplified in [0076] to [0078] and [0082] to [0085] of JP2002-129162A, a compound exemplified in [0094] and [0095] of JP2005-99248A, and a compound exemplified in [0096] of JP2005-99248A are included.

A compound disclosed in [0082] to [0090] of JP2014-119605A is also preferably used as a fluorine-based alignment control agent.

(Polymerization Initiator)

Examples of a photopolymerization initiator include an α-carbonyl compound (disclosed in each of the specifications of U.S. Pat. No. 2,367,661A and U.S. Pat. No. 2,367,670A), acyloin ether (disclosed in the specification of U.S. Pat. No. 2,448,828A), α-hydrocarbon-substituted aromatic acyloin compounds (disclosed in the specification of U.S. Pat. No. 2,722,512A), a polynuclear quinone compound (disclosed in each of the specifications of U.S. Pat. No. 3,046,127A and U.S. Pat. No. 2,951,758A), a combination of a triarylimidazole dimer and p-amino phenyl ketone (disclosed in the specification of U.S. Pat. No. 3,549,367A), an acridine compound and a phenazine compound (disclosed in JP1985-105667A (JP-S60-105667A) and in the specification of U.S. Pat. No. 4,239,850A) and an oxadiazole compound (disclosed in the specification of U.S. Pat. No. 4,212,970A), an acyl phosphine oxide compound (disclosed in JP1988-40799B (JP-S63-40799B), JP1993-29234B (JP-H05-29234B), JP1998-95788A (JP-H10-95788A), and JP1998-29997A (JP-H10-29997A)), and the like.

(Solvent)

The polymerizable liquid crystal composition may contain a solvent. An organic solvent is preferably used as a solvent of a composition for forming each of the light reflection layers. Examples of the organic solvent include amide (for example, N,N-dimethyl formamide), sulfoxide (for example, dimethyl sulfoxide), a heterocyclic compound (for example, pyridine), hydrocarbon (for example, benzene and hexane), alkyl halide (for example, chloroform and dichloromethane), ester (for example, methyl acetate and butyl acetate), ketone (for example, acetone, methyl ethyl ketone, and cyclohexanone), and ether (for example, tetrahydrofuran and 1,2-dimethoxyethane). The alkyl halide and the ketone are preferable. Two or more types of organic solvents may be used in combination. For example, it is also preferable to use a mixed solvent in which the content of tert-butyl alcohol is 5 mass % to 40 mass %, preferably 7 mass % to 36 mass %, is more preferably 10 mass % to 30 mass %, and is particularly preferably 10 mass % to 25 mass %, with respect to the total amount of the solvent. At this time, methyl ethyl ketone, acetone, cyclohexanone, methyl acetate, methyl isobutyl ketone, or the like is preferable as the solvent which also contains the tert-butyl alcohol. It is preferable that a polymerizable liquid crystal composition contains the mixed solvent containing the tert-butyl alcohol since cissing at the time of performing coating is easily suppressed, and the cissing is easily suppressed even at the time of further forming a layer on a layer after being formed.

(Coating and Curing of Polymerizable Liquid Crystal Composition)

The coating of the polymerizable liquid crystal composition is able to be performed by a method in which the polymerizable liquid crystal composition is set to be in a solution state by a solvent or the polymerizable liquid crystal composition is set to be a liquid material such as a melting liquid by heating, and the polymerizable liquid crystal composition is applied by a suitable method such as a roll coating method or a gravure printing method, and a spin coating method. Further, the coating of the polymerizable liquid crystal composition is able to be performed by various methods such as a wire bar coating method, an extrusion coating method, a direct gravure coating method, a reverse gravure coating method, and a die coating method. In addition, the liquid crystal composition is ejected from a nozzle by using an ink jet device, and thus, a coated film is able to be formed.

After that, the alignment state of the molecules of the liquid crystal compound is maintained and immobilized according to the curing of the polymerizable liquid crystal composition. It is preferable that the curing is performed by a polymerization reaction of a polymerizable group introduced into liquid crystalline molecules.

The coated film may be dried by a known method after the coating of the polymerizable liquid crystal composition and before the polymerization reaction for the curing of the polymerizable liquid crystal composition. For example, the coated film may be dried by being left to stand, or may be dried by heating.

In a step of coating and drying the polymerizable liquid crystal composition, the molecules of the liquid crystal compound may be aligned in the polymerizable liquid crystal composition.

For example, in an embodiment in which the polymerizable liquid crystal composition is prepared as a coating liquid containing a solvent, the solvent is removed by drying the coated film, and thus, the polymerizable liquid crystal composition may be in the state of the cholesteric liquid crystalline phase. In addition, the coated film may be heated at a temperature at which transition to a cholesteric liquid crystalline phase. For example, first, the coated film is heated to a temperature of an isotropic phase, and then, is cooled to a cholesteric liquid crystalline phase transition temperature, and thus, it is possible to stably set the polymerizable liquid crystal composition in the state of the cholesteric liquid crystalline phase. The liquid crystalline phase transition temperature of the polymerizable liquid crystal composition described above is preferably in a range of 10° C. to 250° C., and is more preferably in a range of 10° C. to 150° C., from the viewpoint of manufacturing suitability or the like. In a case where the liquid crystalline phase transition temperature is higher than or equal to 10° C., a cooling step is not necessary in order to decrease the temperature to a temperature range at which a liquid crystalline phase is exhibited. In addition, it is preferable that the liquid crystalline phase transition temperature is lower than or equal to 250° C. since, first, a high temperature is not required in order to set the polymerizable liquid crystal composition in an isotropic liquid state of which the temperature is higher than the temperature range at which the crystalline phase is exhibited, and thus, it is preferable from the viewpoint of waste of thermal energy, deformation of a substrate, modification, and the like.

A thermal polymerization reaction using a thermal polymerization initiator and a photopolymerization reaction using a photopolymerization initiator are included in the polymerization reaction. The photopolymerization reaction is preferable. It is preferable that an ultraviolet ray is used in light irradiation for polymerizing the liquid crystalline molecules. The irradiation energy may be greater than or equal to 1 mJ/cm$^2$, may be greater than or equal to 20 mJ/cm$^2$, or may be greater than or equal to 100 mJ/cm$^2$, and may be less than or equal to 50 J/cm$^2$, may be less than or equal to 800 mJ/cm$^2$, or may be less than or equal to 400 mJ/cm$^2$. It is preferable that the ultraviolet illuminance, for example, is 0.1 mW/cm$^2$ to 50 mW/cm$^2$.

In order to accelerate a curing reaction (the photopolymerization reaction), the light irradiation (the ultraviolet irradiation) may be performed under heating conditions. In particular, when the light reflection layer is formed, it is preferable that the temperature at the time of performing the ultraviolet irradiation is maintained in a temperature range exhibiting a cholesteric liquid crystalline phase such that the cholesteric liquid crystalline phase is not disturbed. The temperature at the time of performing the ultraviolet irradiation may be higher than or equal to a liquid crystalline phase transition temperature. In general, a temperature of lower than or equal to 140° C. is preferable. Specifically, a temperature of approximately 60° C. to 140° C. is preferable, and a temperature of 80° C. to 120° C. is preferable. There is an effect of accelerating a diffusion speed of a monomer component by heating. In a case where the temperature is higher than or equal to 60° C., the diffusion speed of the liquid crystal compound becomes fast, and thus, it is possible to shorten an ultraviolet irradiation time.

Furthermore, a turning direction of cholesteric alignment (a liquid crystalline phase) is able to be adjusted according to the type of liquid crystal to be used or the type of chiral agent to be added, and a spiral pitch (that is, a selective reflection wavelength) is able to be adjusted by the concentration of the materials. In addition, it has been known that a wavelength in a specific region which is reflected by each of the light reflection layers is able to be shifted due to various factors of a manufacturing method, and is able to be shifted according to conditions or the like, such as a temperature or illuminance, and an irradiation time at the time of immobilizing the cholesteric alignment, in addition to the added concentration of a chiral agent or the like.

In addition, an oxygen concentration in the atmosphere is involved in a degree of polymerization, and does not reach a desired degree of polymerization in the air, and in a case where film hardness is insufficient, it is preferable to decrease the oxygen concentration in the atmosphere by a method such as nitrogen substitution. A preferred oxygen concentration is preferably less than or equal to 10%, is more preferably less than or equal to 7%, and is most preferably less than or equal to 3%. The reaction rate of the curing reaction (for example, a polymerization reaction) which is performed by the ultraviolet irradiation is preferably greater than or equal to 70%, is more preferably greater than or equal to 80%, and is even more preferably greater than or equal to 90% from the viewpoint of retaining the mechanical strength of a layer or suppressing the outflow of an unreacted substance from the layer. In order to improve the reaction rate, a method of increasing the irradiation dose of the ultraviolet ray to be emitted or polymerization under a nitrogen atmosphere or under heating conditions is effective. In addition, a method in which first, the polymerization is performed, and then, the temperature is retained in a high temperature state which is higher than the polymerization temperature, and thus, the reaction is further performed by a thermal polymerization reaction or a method in which the ultraviolet irradiation is performed again is able to be used. The reaction rate is able to be measured by comparing absorption intensities of infrared vibration spectrums of a reactive group (for example, a polymerizable group) before and after the reaction.

It is sufficient, insofar as optical properties based on the alignment of the molecules in the liquid crystal compound of the polymerizable liquid crystal composition, for example, the optical properties of the cholesteric liquid crystalline phase are retained in a layer, and it is not necessary that the liquid crystal composition of the λ/4 plate or the light reflection layer after being cured exhibits liquid crystallinity anymore. For example, the liquid crystal composition has a high molecular weight due to the curing reaction, and thus, the liquid crystallinity may not be exhibited any more.

In the formation of the light reflection layer, the cholesteric liquid crystalline phase is immobilized by the curing described above, and thus, the light reflection layer is formed. Here, a state where the alignment of the liquid crystal compound formed of the cholesteric liquid crystalline phase is retained is the most typical and preferred embodiment as the state where the liquid crystalline phase is "immobilized". The state is not limited thereto, and specifically, indicates a state where the shape of alignment is able to be stably and continuously maintained in a temperature range of generally 0° C. to 50° C., and in a temperature range of −30° C. to 70° C. under more rigorous conditions without fluidity in the layer or without a change in the shape of the alignment due to an external field or an external force.

In addition, a manufacturing method of the light reflection layer formed by immobilizing the cholesteric liquid crystalline phase, for example, can be referred to methods disclosed in JP1989-133003A (JP-H01-133003A), JP3416302B, JP3363565B, and JP1996-271731A (JP-H08-271731A).

[Alignment Layer]

The brightness enhancement film or the reflection polarizer may include an alignment layer. The alignment layer is used for aligning the molecules of the liquid crystal compound in the polymerizable composition at the time of forming the λ/4 plate or the light reflection layer.

The alignment layer is used at the time of forming the λ/4 plate or the light reflection layer, and the brightness enhancement film may or may not include the alignment layer.

The alignment layer is able to be disposed by means such as a rubbing treatment of an organic compound (preferably a polymer), an oblique vapor deposition of an inorganic compound such as SiO, and formation of a layer having microgrooves. Further, an alignment layer which has an alignment function by applying an electric field, by applying a magnetic field, or by performing light irradiation has been known.

Even in a case where the alignment layer is not disposed, the support is directly subjected to an alignment treatment (for example, a rubbing treatment) according to the material of an underlayer such as the support, the λ/4 plate, or the light reflection layer, and thus, the support is able to function as the alignment layer. Examples of such a support which becomes such an underlayer are able to include PET.

In addition, in a case where a direct light reflection layer is laminated on the light reflection layer, the light reflection layer on the underlayer may align the liquid crystal compound for preparing the light reflection layer on the upper layer which functions as the alignment layer. In this case, even in a case where the alignment layer is not disposed and a special alignment treatment (for example, a rubbing treatment) is not performed, the liquid crystal compound on the upper layer is able to be aligned.

Hereinafter, a rubbing treatment alignment layer and a photo alignment layer which are used by performing a rubbing treatment with respect to the surface will be described as a preferred example.

(Rubbing Treatment Alignment Layer)

Examples of the polymer which is able to be used in the rubbing treatment alignment layer include a methacrylate-based copolymer, a styrene-based copolymer, polyolefin, polyvinyl alcohol and modified polyvinyl alcohol, poly(N-methylol acrylamide), polyester, polyimide, a vinyl acetate copolymer, carboxy methyl cellulose, polycarbonate, and the like, disclosed in paragraph [0022] of the specification of JP1996-338913A (JP-H08-338913A). A silane coupling agent is able to be used as the polymer. A water-soluble polymer (for example, poly(N-methylol acrylamide), carboxy methyl cellulose, gelatin, polyvinyl alcohol, and modified polyvinyl alcohol) is preferable, the gelatin, the polyvinyl alcohol, and the modified polyvinyl alcohol are more preferable, and the polyvinyl alcohol and the modified polyvinyl alcohol are most preferable.

A rubbing treatment surface of the alignment layer is coated with the composition described above, and thus, the molecules of the liquid crystal compound are aligned. After that, as necessary, the polymer of the alignment layer reacts with a multifunctional monomer included in the optical anisotropic layer or the polymer of the alignment layer is cross-linked by using a cross-linking agent, and thus, the optical anisotropic layer described above is able to be formed.

It is preferable that the film thickness of the alignment layer is in a range of 0.1 μm to 10 μm.

—Rubbing Treatment—

The surface of the alignment layer, the temporary support, the λ/4 plate, or the light reflection layer which is coated with the polymerizable liquid crystal composition, as necessary, may be subjected to a rubbing treatment. In general, the rubbing treatment is able to be performed by rubbing the surface of a film containing a polymer as a main component with paper or cloth in a constant direction. A general method of the rubbing treatment, for example, is disclosed in "Liquid Crystal Handbook" (published by Maruzen Company, Limited, Oct. 30, 2000).

A method disclosed in "Liquid Crystal Handbook" (published by Maruzen Company, Limited) is able to be used as a method of changing a rubbing density. A rubbing density (L) is able to be quantified by Expression (A) described below.

$$L = Nl(1 + 2\pi rn/60v) \quad \text{Expression (A)}$$

In Expression (A), N represents the number of rubbing treatments, l represents a contact length of a rubbing roller, r represents the radius of the roller, n represents the number of rotations of the roller (rpm), and v represents a stage shifting speed (per second).

In order to increase the rubbing density, the number of rubbing treatments may increase, the contact length of the rubbing roller may increase, the radius of the roller may increase, the number of rotations of the roller may increase, and the stage shifting speed may decrease, and in order to decrease the rubbing density, these factors are adjusted vice versa. In addition, conditions at the time of performing the rubbing treatment can be referred to conditions disclosed in JP4052558B.

(Photo Alignment Layer)

A photo alignment material which is used in the photo alignment layer formed by the light irradiation is disclosed in a plurality of literatures or the like. Examples of the photo alignment material include an azo compound disclosed in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, an aromatic ester compound disclosed in JP2002-229039A, a maleimide and/or alkenyl substitution nadimide compound having a photo alignment unit, disclosed in JP2002-265541A and JP2002-317013A, a photocross-linking silane derivative disclosed in JP4205195B and JP4205198B, photocross-linking polyimide, polyamide, or ester disclosed in JP2003-520878A, JP2004-529220A, and JP4162850B, and a compound which is able to be subjected to photo dimerization, disclosed in JP1997-118717A (JP-H09-118717A), JP1999-506420A (JP-H10-506420A), JP2003-505561A, WO2010/150748A, JP2013-177561A, and JP2014-12823A, and in particular, preferred examples of the photo alignment material include a cinnamate compound, a chalcone compound, and a coumarin compound. It is particularly preferable that the photo alignment material is the azo compound, the photocross-linking polyimide, the polyamide, the ester, the cinnamate compound, and the chalcone compound.

Specific examples of a particularly preferable photo alignment material are able to include a compound denoted by Expression (X) described below disclosed in JP2006-285197A.

Formula (X)

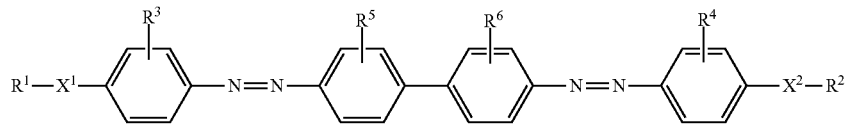

(In the formula, $R^1$ and $R^2$ each independently represent a hydroxy group or a polymerizable group selected from the group consisting of a (meth)acryloyl group, a (meth)acryloyl oxy group, a (meth)acrylamide group, a vinyl group, a vinyl oxy group, and a maleimide group. In a case where $R^1$ is a hydroxy group, $X^1$ represents a single bond, in a case where $R^1$ is a polymerizable group, $X^1$ represents a linking group denoted by $-(A^1-B^1)_m-$, in a case where $R^2$ is a hydroxy group, $X^2$ represents a single bond, and in a case where $R^2$ or $R^8$ is a polymerizable group, $X^2$ represents a linking group denoted by $-(A^2-B^2)_n-$. Here, $A^1$ is bonded to $R^1$ or $R^7$, $A^2$ is bonded to $R^2$ or $R^8$, and $B^1$ and $B^2$ are respectively bonded to an adjacent phenylene group. $A^1$ and $A^2$ each independently represent a single bond or a divalent hydrocarbon group, $B^1$ and $B^2$ each independently represent a single bond, —O—, —CO—O—, —O—CO—, —CO—NH—, —NH—CO—, —NH—CO—O—, or O—CO—NH—. m and n each independently represent an integer of 0 to 4.

Here, in a case where m or n is greater or equal to 2, a plurality of $A^1$'s, $B^1$'s, $A^2$'s, and $B^2$'s may be identical to each other or different from each other. Here, $A^1$ or $A^2$ interposed between two $B^1$'s or $B^2$'s is not a single bond. $R^3$ and $R^4$ each independently represent a hydrogen atom, a halogen atom, a carboxyl group, a halogenated methyl group, a halogenated methoxy group, a cyano group, a nitro group, —$OR^7$ (here, $R^7$ represents a lower alkyl group having 1 to 6 carbon atoms, a cycloalkyl group having 3 to 6 carbon atoms, or a lower alkyl group having 1 to 6 carbon atoms which is substituted with a lower alkoxy group having 1 to 6 carbon atoms), a hydroxy alkyl group having 1 to 4 carbon atoms, or $CONR^8R^9$ ($R^8$ and $R^9$ each independently represent a hydrogen atom or a lower alkyl group having 1 to 6 carbon atoms), or a methoxy carbonyl group. Here, the carboxyl group may form an alkali metal and a salt. $R^5$ and $R^6$ each independently represent a carboxyl group, a sulfo group, a nitro group, an amino group, or a hydroxy group. Here, the carboxyl group and the sulfo group may form a alkali metal and a salt.)

The photo alignment layer formed of the material described above is subjected to linear polarization irradiation or non-polarization irradiation, and thus, the photo alignment layer is manufactured.

Herein, the "linear polarization irradiation" is an operation for allowing a photo reaction to occur in the photo alignment material. The wavelength of light to be used is different according to a photo alignment material to be used, and is not particularly limited insofar as the wavelength is a wavelength necessary for the photo reaction. Ultraviolet light is used in which the peak wavelength of the light to be used in the light irradiation is preferably 200 nm to 700 nm, and is more preferably less than or equal to 400 nm.

Examples of a light source to be used in the light irradiation are able to include a generally used light source, for example, a lamp such as a tungsten lamp, a halogen lamp, a xenon lamp, a xenon flash lamp, a mercury lamp, a mercury xenon lamp, and a carbon arc lamp, various lasers (for example, semiconductor laser, helium neon laser, argon ion laser, helium cadmium laser, and YAG laser), a light emitting diode, a cathode ray tube, and the like.

A method using a polarizing plate (for example, an iodine polarizing plate, a dichroic pigment polarizing plate, and a wire grid polarizing plate), a method using a reflection type polarizer which uses a prism-based element (for example, a GLAN-THOMSON prism) or a BREWSTER angle, or a method using light exiting from a laser light source including polarized light is able to be adopted as means for obtaining linearly polarized light. In addition, only the light having a necessary wavelength may be selectively emitted by using a filter, a wavelength conversion element, or the like.

In a case where the light to be emitted is the linearly polarized light, a method of emitting light from a vertical direction or an oblique direction with respect to the surface of the alignment layer from the upper surface or the back surface with respect to the alignment layer is adopted. An incidence angle of the light is different according to the photo alignment material, for example, is 0° to 90° (vertical), and is preferably 40° to 90°.

In a case where the light to be emitted is non-polarized light, the non-polarized light is emitted from the oblique direction. The incidence angle is 10° to 80°, is preferably 20° to 60°, and is particularly preferably 30° to 50°.

An irradiation time is preferably 1 minute to 60 minutes, and is more preferably 1 minute to 10 minutes.

In addition, by selecting the material of an alignment film, it is possible to peeling off the alignment film from the temporary support for forming an optical anisotropic layer or it is possible to peeling off only the optical anisotropic layer, and by bonding the transferred optical anisotropic layer, that is, the peeled off optical anisotropic layer, it is possible to provide a thin optical anisotropic layer of several μm. Further, an embodiment is also preferable in which a directly rubbing alignment film or a photo alignment film is applied and laminated onto the linear polarizer and is subjected to a rubbing treatment or a photo alignment treatment, and thus, an alignment function is provided. That is, the laminated body of the present invention includes the linear polarizer, and may be a laminated body which is a laminated body including the photo alignment film or the rubbing alignment film on the surface of the linear polarizer described above.

In the present invention, a pretilt angle of the polymerizable rod-like liquid crystal compound contained in the optical anisotropic layer is able to be 0°, and thus, an embodiment using the photo alignment film as the alignment film is particularly preferable, and it is possible to make high contrast in which a front light leakage is reduced and excellent view angle dependency in which an oblique change in the shade is reduced compatible by using a retardation film including the optical anisotropic layer having a pretilt angle of 0°, in particular, in an IPS mode using photo alignment. In the photo alignment film which is used in the present invention, an embodiment is preferable in which an alignment regulating force is provided by a step of performing the polarization irradiation with respect to the photo alignment film from the vertical direction or the oblique direction or a step of performing the non-polarization irradiation from the oblique direction. In a case where the irradiation is performed from the oblique direction, the oblique direction is preferably a direction having an angle of 5 degrees to 45 degrees, and is more preferably a direction having an angle of 10 degrees to 30 degrees, with respect to the photo alignment film. An ultraviolet ray having an irradiation intensity of preferably 200 mJ/cm$^2$ to 2000 mJ/cm$^2$ may be emitted.

[Preparation of Broadband Light Reflection Layer]

Examples of a method of setting the light reflection layer formed by immobilizing the cholesteric liquid crystalline phase to be a broadband light reflection layer include a method using a liquid crystal compound having high Δn or a pitch gradient method.

As described above, Δn is the birefringence of the liquid crystal compound, and for example, in a case of the rod-like liquid crystal compound, Δn indicates a difference in the values of the respective refractive indices in a short axis direction and a long axis direction of the compound.

In the liquid crystal compound which is used in the light reflection layer formed by immobilizing the cholesteric liquid crystalline phase, it is practical that Δn is approximately 0.06≤Δn≤0.5 (a liquid crystal material having high Δn which is disclosed in JP2011-510915A is able to be used), and Δn corresponds to 15 nm to 150 nm at a half-width. In addition, examples of the liquid crystal compound having high Δn include compounds disclosed in JP3999400B, JP4053782B, JP4947676B, and the like, but the present invention is not limited thereto. A measurement method of Δn can be referred to a method disclosed in paragraph [0112] of JP4053782B, paragraph [0142] of JP4947676B, or the like.

In a case of preparing a broadband light reflection layer by controlling the half-width to be less than or equal to 200 nm, it is possible to use a pitch gradient method in which a wide half-width is able to be realized not by a single pitch but by gradually changing the number of pitches in a cholesteric spiral direction. The pitch indicates a pitch length P of a spiral structure of the cholesteric liquid crystalline phase described above, and indicates the thickness of a molecular layer at the time of rotating an alignment direction of the molecular layer of the liquid crystal compound by 360 degrees.

From the viewpoint of broadening the half-width and of reducing (thinning) the film thickness at a pitch gradient, Δn is preferably greater than or equal to 0.16, is more preferably greater than or equal to 0.2, is even more preferably greater than or equal to 0.3, and is particularly preferably approximately 0.5 which is the upper limit of Δn of a liquid crystal industrialized in the present situation. However, hereinafter, in a case where a liquid crystal having higher Δn is developed, in principle, the liquid crystal is able to be used in the present invention, and the film thickness further decreases.

In a case where a liquid crystal compound having Δn of 0.156 is used and has at least a pitch gradient range of 400 nm to 600 nm, the film thickness of a broadband pitch gradient layer is preferably greater than or equal to 6 μm, is more preferably greater than or equal to 8 μm, and is even more preferably greater than or equal to 10 μm, from the viewpoint of brightness performance. In a case where a liquid crystal compound having Δn of 0.3 is used and has at least a pitch gradient range of 400 nm to 600 nm, the film thickness is preferably greater than or equal to 2 μm, is more preferably greater than or equal to 3 μm, is even more preferably greater than or equal to 4 μm, and is particularly preferably greater than or equal to 5 μm.

In dispersion of Δn of the liquid crystal, it has been known that it is preferable that dispersion at each wavelength decreases. It is preferable that Δn (a ratio of 450/550)≤1.6, it is more preferable that Δn (a ratio of 450/550)≤1.4, it is even more preferable that Δn (a ratio of 450/550)≤1.2, and it is particularly preferable that Δn (a ratio of 450/550)≤1.1.

In the pitch gradient method, the pitch is gradually changed in the spiral direction of the cholesteric liquid crystalline phase (in general, the film thickness direction), and thus, a wide half-width is able to be realized. In a light reflection layer to which the pitch gradient method is applied, it is preferable that the pitch is continuously changed in the film thickness direction. In addition, in the light reflection layer to which the pitch gradient method is applied, it is preferable that the pitch continuously increases from one surface of the layer towards the other surface or the pitch continuously decreases. The pitch gradient method is attained by continuously changing the concentration of a compound, which does not form a spiral in the thickness direction of the liquid crystal layer, in the thickness direction of the liquid crystal layer, by continuously changing the concentration of a chiral agent in the thickness direction of the liquid crystal layer, or by changing HTP (helical twisting power) of a chiral agent by using the chiral agent having a photoisomerization portion and by isomerizing a photoisomerization portion of the chiral agent with UV irradiation at the time of forming the light reflection layer. A vinylene group, an azo group, or the like is preferable as the photoisomerization portion.

Methods disclosed in (Nature 378, 467-469 1995), JP4990426B, JP2005-265896A, and the like are able to be applied as the pitch gradient method. In addition, a compound disclosed in JP4570377B, which has a fluorinated alkyl group and does not form a spiral, is able to be used.

[Support]

The brightness enhancement film of the present invention may include a support. The support is able to function as a layer which supports a layer formed of a composition containing a liquid crystal compound.

In the brightness enhancement film of the present invention, the light reflection layer may be formed by using the λ/4 plate itself as the support, and the light reflection layer may be formed by using the entire λ/4 plate formed on the support as the support.

The brightness enhancement film of the present invention may not include the support at the time of forming the light reflection layer, and for example, the first light reflection layer and the second light reflection layer are formed by using glass or a transparent film as the support at the time of forming the first light reflection layer and the second light reflection layer, and then, the glass or the transparent film is peeled off from the support at the time of forming only the first light reflection layer and the second light reflection layer, and thus, the brightness enhancement film of the present invention may be formed. Furthermore, in a case where the first light reflection layer and the second light reflection layer are formed, and then, the glass or the transparent film is peeled off from the support at the time of forming only the first light reflection layer and the second light reflection layer, it is preferable that the first light reflection layer and the second light reflection layer to be peeled off are bonded to each other through an adhesive layer, and thus, the brightness enhancement film of the present invention is formed by using a film in which the λ/4 plate and the adhesive layer (and/or a pressure sensitive adhesive material) are laminated.

In addition, it is also preferable that a film in which the λ/4 plate and the first light reflection layer are formed on the support in this order, and a film in which the second light reflection layer is formed on the support in this order are bonded to each other by disposing the adhesive layer (and/or the pressure sensitive adhesive material) between the first light reflection layer and the second light reflection layer, and thus, the brightness enhancement film of the present invention is formed. At this time, the support may be or may not be peeled off after the adhesion.

In a case where the support does not have a function as a part or all of the λ/4 plate, Re of the support is preferably 0 nm to 50 nm, is more preferably 0 nm to 30 nm, and is even more preferably 0 nm to 10 nm. It is preferable that Re of the support is set to be in the range described above since a light leakage of reflected light is able to be reduced to the extent of being invisible.

In addition, it is preferable that retardation (Rth) of the support in the thickness direction is selected according to a combination with the optical anisotropic layer disposed on or under the support. Accordingly, the light leakage of the reflected light and shading at the time of being observed from the oblique direction are able to be reduced. Rth of the support, for example, is preferably −40 nm to 120 nm, is more preferably 0 nm to 80 nm, and is even more preferably 20 nm to 60 nm.

Example of the material of the polymer film used as the support include the materials used in the λ/4 plate described above, a cellulose acylate film (for example, a cellulose triacetate film (a refractive index of 1.48), a cellulose diacetate film, a cellulose acetate butyrate film, a cellulose acetate propionate film), polyolefin such as polyethylene and polypropylene, a polyester-based resin film such as polyethylene terephthalate or polyethylene naphthalate, a polyacrylic resin film such as a polyether sulfone film and polymethyl methacrylate, a polyurethane-based resin film, a polyester film, a polycarbonate film, a polysulfone film, a polyether film, a polymethyl pentene film, a polyether ketone film, a (meth)acrylonitrile film, polyolefin, and polymer having an alicyclic structure (a norbornene-based resin (ARTON: Product Name, manufactured by JSR Corporation), amorphous polyolefin (ZEONEX: Product Name, manufactured by Zeon Corporation)), and the like. Among them, the triacetyl cellulose, the polyethylene terephthalate, and the polymer having an alicyclic structure are preferable, and the triacetyl cellulose is particularly preferable.

A transparent support having a thickness of approximately 5 μm to 150 μm is able to be used, and the thickness of the transparent support is preferably 5 μm to 80 μm, and is more preferably 20 μm to 60 μm. In addition, the transparent support may be formed by laminating a plurality of layers. In order to suppress external light reflection, it is preferable as the thickness of the transparent support becomes thinner, but when the thickness is less than 5 μm, the strength of the film becomes weaker, and thus, setting the thickness to be less than 5 μm does not tend to be preferable. In order to enhance adhesion between the transparent support and a layer disposed on the transparent support (the adhesive layer, the vertical alignment layer, or a retardation layer), the transparent support may be subjected to a surface treatment (for example, a glow discharge treatment, a corona discharge treatment, an ultraviolet ray (UV) treatment, and a flame treatment). The adhesive layer (the undercoat layer) may be disposed on the transparent support. In addition, it is preferable that a transparent support to which slidability is applied in a transporting step or a transparent support which is formed by applying a polymer layer in which inorganic particles having an average particle diameter of approximately 10 nm to 100 nm are mixed at a mass ratio of solid contents of 5% to 40% onto one surface of the support or by cocasting with the support in order to prevent a back surface from being bonded to the surface after being wound is used in the transparent support or a long transparent support.

[Adhesive Layer (Pressure Sensitive Adhesive Layer) and Adhesive Agent]

Herein, "adhesive" is used as the concept which also includes "pressure sensitive adhesive".

An adhesive layer may be disposed between the respective members configuring the brightness enhancement film and an optical sheet member described below. For example, the adhesive layer may be disposed between the λ/4 plate and the reflection polarizer, between the light reflection layers of the reflection polarizer, between the polarizing plate or the polarizer and the λ/4 plate, or the like.

The pressure sensitive adhesive agent which is used in the adhesive layer, for example, indicates a substance having a ratio (tan δ=G"/G') of a modulus of loss elasticity G" to a modulus of storage elasticity G' measured by a dynamic viscoelasticity measurement device of 0.001 to 1.5, and includes a so-called pressure sensitive adhesive agent, a substance which is easy to creep, or the like. Examples of the pressure sensitive adhesive agent which is able to be used in the present invention include an acrylic pressure sensitive adhesive agent and a polyvinyl alcohol-based adhesive agent, but are not limited thereto.

In addition, examples of the adhesive agent include an aqueous solution of boron compound, a curable adhesive agent of an epoxy compound as disclosed in JP2004-245925A which does not have an aromatic ring in the molecules, an active energy ray curable type adhesive agent disclosed in JP2008-174667A which includes a photopolymerization initiator having a molar absorption coefficient at a wavelength of 360 nm to 450 nm of greater than or equal to 400 and an ultraviolet ray curable compound as an essential component, an active energy ray curable type adhesive agent disclosed in JP2008-174667A which contains (a) a (meth)acrylic compound having two or more (meth)acryloyl groups in the molecules, (b) a (meth)acrylic compound having a hydroxyl group and only one polymerizable double bond in the molecules, and (c) phenol ethylene oxide-modified acrylate or nonyl phenol ethylene oxide-modified acrylate in the total amount of 100 parts by mass of a (meth)acrylic compound, and the like.

In the optical sheet member of the present invention described below, a difference in refractive indices between the reflection polarizer and a layer adjacent to the reflection polarizer on the polarizing plate side is preferably less than or equal to 0.15, is more preferably less than or equal to 0.10, and is particularly preferably less than or equal to 0.05. Examples of the layer adjacent to the reflection polarizer on the polarizing plate side described above are able to include the adhesive layer described above.

An adjustment method of the refractive index of the adhesive layer is not particularly limited, and for example, a method disclosed in JP1999-223712A (JP-H11-223712A) is able to be used. In the method disclosed in JP1999-223712A (JP-H11-223712A), the following embodiment is particularly preferable.

Examples of the pressure sensitive adhesive agent which is used in the adhesive layer described above are able to include resins such as a polyester-based resin, an epoxy-based resin, a polyurethane-based resin, a silicone-based resin, and an acrylic resin. One type of the resin may be independently used or two or more types thereof may be used by being mixed. In particular, the acrylic resin is preferable from the viewpoint of excellent reliability with respect to water resistance, heat resistance, light resistance, and the like, an excellent adhesion force and excellent transparency, and ease of adjusting the refractive index to be suitable for a liquid crystal display. Examples of the acrylic pressure sensitive adhesive agent are able to include a homopolymer or a copolymer of an acrylic monomer such as an acrylic acid and ester thereof, a methacrylic acid and ester thereof, acrylamide, and acrylonitrile, and a copolymer of at least one type of acrylic monomer described above and an aromatic vinyl monomer of vinyl acetate, maleic anhydride, styrene, and the like. In particular, a copolymer formed of main monomers such as ethylene acrylate, butyl acrylate, and 2-ethyl hexyl acrylate which exhibits pressure sensitive adhesiveness, a monomer such as vinyl acetate, acrylonitrile, acrylamide, styrene, methacrylate, and methyl acrylate which become an aggregation force component, and functional group-containing monomers such as a methacrylic acid, an acrylic acid, an itaconic acid, hydroxy ethyl methacrylate, hydroxy propyl methacrylate, dimethyl amino ethyl methacrylate, acrylamide, methylol acrylamide, glycidyl methacrylate, and maleic anhydride which improve an adhesion force or provide a cross-linking starting point, in which a glass transition point (Tg) is in a range of −60° C. to −15° C., and a weight average molecular weight is in a range of 200,000 to 1,000,000 is preferable.

In the present invention, a sheet-like photocurable type pressure sensitive-adhesive agent (disclosed in TREND of Research Annual Review, Vol. 14, published on Jan. 1, 2011 by Toagosei Company, Limited) is able to be used in the adhesive layer. As with the pressure sensitive adhesive agent, the sheet-like photocurable type adhesive agent, allows optical films to be easily bonded to each other, is cross-linked and cured by an ultraviolet ray (UV), and has an improved storage modulus of elasticity, an improved adhesion force, and improved heat resistance, and an adhesion method thereof is suitable for the present invention.

<Preparation Method of Brightness Enhancement Film>

A preparation method of brightness enhancement film is not particularly limited, and it is preferable that at least one of the light reflection layers is formed by being directly applied onto the surface of the λ/4 plate or the surface of the other light reflection layer. This is because a brightness enhancement film having more excellent bending properties is able to be provided. It is also preferable that all of the light reflection layers are formed by being directed applied onto the surface of the λ/4 plate or the surface of the other light reflection layer.

The preparation method of the brightness enhancement film, for example, includes applying the polymerizable liquid crystal composition onto the surface of the λ/4 plate which is the polymer film, and forming the light reflection layer (the first light reflection layer) by curing the coated film. As described above, the polymerizable liquid crystal composition may be further applied onto the surface of the prepared laminated body of the λ/4 plate and the first light reflection layer, and the light reflection layer (the second light reflection layer) may be formed by curing the coated film, or the light reflection layer (the second light reflection layer) formed on the support (the temporary support) may be laminated by using the adhesive layer. After that, the temporary support may be or may not be peeled off therefrom. The brightness enhancement film may be prepared by a method which includes applying a composition containing a liquid crystal compound onto the support, and preparing the λ/4 plate by curing the coated film. The brightness enhancement film may be prepared by sequentially applying the λ/4 plate, the first light reflection layer, and the second light reflection layer onto the support and by curing the coated film, or may be prepared by allowing a laminated body including the λ/4 plate on the support to adhere to a laminated body including the second light reflection layer and the first light reflection layer on the temporary support in this order from the temporary support side such that the λ/4 plate and the second light reflection layer are adjacent to each other. After that, the temporary support may be or may not be peeled off therefrom.

When the λ/4 plate formed of the composition containing the liquid crystal compound and the light reflection layer formed by immobilizing the cholesteric liquid crystalline phase are formed, a superposition method of the liquid crystal layer through the alignment layer, or the like is also able to be adopted.

<Optical Sheet Member>

The optical sheet member includes the brightness enhancement film and the polarizing plate. It is preferable that an angle between a slow axis of the λ/4 plate and an absorption axis of the polarizer is 30° to 60°, the polarizing plate, and the λ/4 plate and the reflection polarizer are directly in contact with each other in this order, or are laminated through the adhesive layer. The slow axis indicates a direction in which the refractive index is maximized.

The optical sheet member of the present invention may include a polarizing plate protective film on a side of the polarizer opposite to a liquid crystal cell. In a case where the polarizing plate protective film is not disposed on a side of the polarizer opposite to the liquid crystal cell, the reflection polarizer may be directly disposed on the polarizer or may be disposed on the polarizer through the adhesive agent. The λ/4 plate may also function as the polarizing plate protective film, and the polarizing plate protective film may also function as a part of the λ/4 plate which is realized by laminating the polarizing plate protective film.

Among the protective films, a thermoplastic resin having excellent transparency, excellent mechanical strength, excellent heat stability, excellent moisture blocking properties, excellent isotropy, and the like is used as a protective film which is arranged on a side opposite to the liquid crystal cell. Specific examples of such a thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (a norbornene-based resin), a polyarylate resin, a polystyrene resin, a polyvinyl alcohol resin, and a mixture thereof.

[Polarizing Plate]

The polarizing plate may be formed only of the polarizer, and it is preferable that the polarizing plate is configured of the polarizer and the polarizing plate protective film which protects at least one surface of the polarizer. It is also preferable that the polarizing plate is formed of the polarizer and two polarizing plate protective films (hereinafter, also referred to as a protective film) which are arranged on both sides of the polarizer.

(Polarizer)

It is preferable that a polarizer in which iodine is adsorptively aligned on a polymer film is used as the polarizer described above. The polymer film is not particularly limited, but various polymer films are able to be used. Examples of the polymer film include a hydrophilic polymer film such as a polyvinyl alcohol-based film, a polyethylene terephthalate-based film, an ethylene-vinyl acetate copolymer-based film, a partially saponified film thereof, and a cellulose-based film, an polyene-based orientation film of a dehydration treatment product of polyvinyl alcohol or a dehydrochlorination treatment product of polyvinyl chloride, and the like. Among them, it is preferable that the polyvinyl alcohol-based film having excellent dyeability of iodine is used as the polarizer.

Polyvinyl alcohol or a derivative thereof is used as the material of the polyvinyl alcohol-based film. Examples of the derivative of the polyvinyl alcohol include polyvinyl formal, polyvinyl acetal, and the like, and olefin such as ethylene and propylene, an unsaturated carboxylic acid such as an acrylic acid, a methacrylic acid, and a crotonic acid, and alkyl ester thereof, and an acrylamide-modified derivative.

The degree of polymerization of the polymer which is the material of the polymer film described above is generally 500 to 10,000, is preferably in a range of 1000 to 6000, and is more is preferably in a range of 1400 to 4000. Further, in a case of a saponification film, the degree of saponification, for example, is preferably greater than or equal to 75 mol %, is more preferably greater than or equal to 98 mol %, and is more preferably in a range of 98.3 mol % to 99.8 mol %, from the viewpoint of solubility with respect to water.

The polymer film (an unstretched film) described above is subjected to at least a monoaxial stretching treatment and an iodine dyeing treatment according to a normal method. Further, a boric acid treatment and a cleaning treatment are able to be performed. In addition, the polymer film (a stretched film) which has been subjected to the treatment described above is subjected to a drying treatment and becomes the polarizer according to a normal method.

The thickness of the polarizer is generally 5 μm to 80 μm, is preferably 5 μm to 50 μm, and is more preferably 5 μm to 25 μm.

In the optical properties of the polarizer, single body transmittance at the time of being measured by a polarizer single body is preferably greater than or equal to 43%, and is more preferably in a range of 43.3% to 45.0%. In addition, it is preferable that orthogonal transmittance measured by preparing two polarizers described above, and by superposing the two polarizers such that an angle between the absorption axes of the two polarizers is 90° is small, and practically, the orthogonal transmittance is preferably greater than or equal to 0.00% and less than or equal to 0.050%, and is more preferably less than or equal to 0.030%. Practically, the degree of polarization is preferably greater than or equal to 99.90% and less than or equal to 100%, and is particularly preferably greater than or equal to 99.93% and less than or equal to 100%. Even when the optical properties of the polarizing plate are measured, it is preferable that approximately the same optical properties as those described above are able to be obtained.

The polarizer is able to be obtained by methods disclosed in JP2006-293275A, JP2009-98653A, and JP2001-350021A.

(Polarizing Plate Protective Film)

A thermoplastic resin having excellent transparency, excellent mechanical strength, excellent thermal stability, excellent moisture blocking properties, and excellent isotropy is used as the protective film described above. Specific examples of such a thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (a norbornene-based resin), a polyarylate resin, a polystyrene resin, a polyvinyl alcohol resin, and a mixture thereof.

The cellulose resin is ester of cellulose and a fatty acid. Specific example of such a cellulose ester-based resin include triacetyl cellulose, diacetyl cellulose, tripropyl cellulose, dipropyl cellulose, and the like. Among them, the triacetyl cellulose is particularly preferable. Various products are commercially available as the triacetyl cellulose, and are advantageous from the viewpoint of easy obtainability and cost. Examples of a commercially available product of the triacetyl cellulose include "UV-50", "UV-80", "SH-80", "TD-80U", "TD-TAC", and "UZ-TAC" (Product Name), manufactured by Fujifilm Corporation, "KC Series" manufactured by Konica Minolta, Inc., and the like.

Specific examples of the cyclic polyolefin resin preferably include a norbornene-based resin. The cyclic olefin-based resin is a general term of a resin which is polymerized by using cyclic olefin as polymerization unit, and examples of the cyclic olefin-based resin include resins disclosed in JP1989-240517A (JP-H01-240517A), JP1991-14882A (JP-H03-14882A), JP1991-122137A (JP-H03-122137A), and the like. Specific examples of the cyclic olefin-based resin include a ring opening (co)polymer of cyclic olefin, an addition polymer of cyclic olefin, a copolymer of cyclic olefin and α-olefin such as ethylene and propylene (representatively, a random copolymer), and a graft polymer in which the polymers are modified by an unsaturated carboxylic acid or a derivative thereof, a hydride thereof, and the like. Specific examples of the cyclic olefin include a norbornene-based monomer.

Various products are commercially available as the cyclic polyolefin resin. Specific example of the cyclic polyolefin resin include "ZEONEX" and "ZEONOR" (Product Name) manufactured by Zeon Corporation, "ARTON" (Product Name) manufactured by JSR Corporation, "TOPAS" (Product Name) manufactured by TICONA GmbH, and "APEL" (Product Name) manufactured by Mitsui Chemicals, Inc.

An arbitrary suitable (meth)acrylic resin is able to be adopted as the (meth)acrylic resin. Examples of the (meth)acrylic resin include poly(meth)acrylic acid ester such as polymethyl methacrylate, a methyl methacrylate-(meth)acrylic acid copolymer, a methyl methacrylate-(meth)acrylic acid ester copolymer, a methyl methacrylate-acrylic acid ester-(meth)acrylic acid copolymer, a methyl (meth)acrylate-styrene copolymer (an MS resin and the like), and a polymer having an alicyclic hydrocarbon group (for example, a methyl methacrylate-cyclohexyl methacrylate copolymer, a methyl methacrylate-norbornyl (meth)acrylate copolymer, and the like). Preferably, examples of the (meth)acrylic resin include poly(meth)acrylic acid alkyl having 1 to 6 carbon atoms such as polymethyl (meth)acrylate. More preferably, examples of the (meth)acrylic resin include a methyl methacrylate-based resin having methyl methacrylate as a main component (50 mass % to 100 mass %, and preferably 70 mass % to 100 mass %).

Specific examples of the (meth)acrylic resin include ACRYPET VH or ACRYPET VRL20A manufactured by Mitsubishi Rayon Co., Ltd, a (meth)acrylic resin disclosed in JP2004-70296A which has a ring structure in the molecules, and a (meth)acrylic resin having high Tg which is obtained by cross-linking in the molecules or a cyclization reaction in the molecules.

A (meth)acrylic resin having a lactone ring structure is able to be used as the (meth)acrylic resin. This is because the (meth)acrylic resin having a lactone ring structure has high heat resistance, high transparency, and high mechanical strength which is obtained by biaxial stretching.

The thickness of the protective film is able to be suitably set, and is generally approximately 1 μm to 80 μm from the viewpoint of workability such as strength or handling, thin layer properties, and the like. In particular, the thickness of the protective film is preferably 1 μm to 60 μm, and is more preferably 5 μm to 40 μm, and is even more preferably 5 μm to 25 μm.

<Liquid Crystal Display Device>

The liquid crystal display device may include the liquid crystal cell, the polarizing plate including the polarizer, the brightness enhancement film, and the backlight unit in this order. At this time, the polarizing plate, the λ/4 plate, the reflection polarizer, and the backlight unit are arranged in this order.

<Backlight Unit>

In the liquid crystal display device, the brightness enhancement film or the optical sheet member is able to be used by being combined with a backlight unit. The backlight unit may comprise a light source which emits blue light having a light emission center wavelength in a wavelength range of 430 nm to 500 nm, green light having a light emission center wavelength in a wavelength range of 500 nm to 600 nm, and red light having at least a part of a light emission intensity peak in a wavelength range of 600 nm to 700 nm.

The configuration of the backlight may be an edge light mode in which a light guide plate, a reflection plate, or the like is included as a configuration member, or may be a direct backlight mode. It is also preferable that the liquid crystal display device comprises the reflection member reflecting light which is emitted from the light source and is reflected on the optical sheet member in the rear of the light source described above. Such a reflection member is not particularly limited, and known reflection members disclosed in JP88-168626A (JP-S63-168626A), JP3416302B, JP3363565B, JP4091978B, JP3448626B, and the like are able to be used.

The light reflection layer formed by immobilizing the cholesteric liquid crystalline phase which is included in the reflection polarizer of the brightness enhancement film reflects at least one (circularly polarized light in a first polarization state) of right circularly polarized light or left circularly polarized light in a wavelength range in the vicinity of the reflection center wavelength and transmits the other one (circularly polarized light in a second polarization state). The reflected circularly polarized light in the first polarization state is reflected on the reflection member or the other member in the backlight unit (for example, a light condensing sheet such as a prism sheet, a diffusion sheet, and the like), and is recirculated. In a case where the circularly polarized light is not depolarized at the time of being reflected, properties of changing optically rotating properties of the light are obtained, and thus, the circularly polarized light in the first polarization state is converted into the circularly polarized light in the second polarization state at the time of being reflected on the reflection member or the other member in the backlight unit, and is transmitted through the light reflection layer in this state. Accordingly, in a case where a member having a low depolarization degree is used in the reflection member or the other member in the backlight unit, it is possible to reduce the number of times of reflection for reusing the light, and thus, it is possible to reduce a loss due to absorption or scattering, and accordingly, it is possible to further increase light utilization efficiency.

Preferred examples of such a reflection member include a reflection member disclosed in JP1988-168626A (JP-S63-168626A). As disclosed in JP1988-168626A (JP-S63-168626A), it is preferable that a configuration is realized in which reflectivity is high and depolarization rarely occurs by arranging mirror as the reflection member.

It is preferable that the light source of the backlight includes a blue light emitting diode emitting the blue light described above, and a fluorescent material which emits the green light described above and the red light described above when the blue light described above of the blue light emitting diode described above is incident thereon.

Furthermore, a blue light emitting diode emitting the blue light described above, a green light emitting diode emitting the green light described above, and a red light emitting diode emitting the red light described above may be used as the light source of the backlight.

The light source of the backlight may be a white light source such as a white light emitting diode (LED).

Examples of the fluorescent material include a yttrium.aluminum.garnet-based yellow fluorescent body, a terbium.aluminum.garnet-based yellow fluorescent body, and the like. The fluorescent wavelength of the fluorescent material is able to be controlled according to a change in the particle diameter of the fluorescent body.

In the liquid crystal display device of the present invention, it is preferable that the backlight unit includes the blue light emitting diode emitting the blue light described above and the fluorescent material emitting the green light described above and the red light described above when the blue light described above of the blue light emitting diode described above is incident thereon, the fluorescent material is a quantum dot member (for example, a quantum dot sheet or a bar-like quantum dot bar), and the quantum dot member is arranged between the optical sheet member and a blue light source. Such a quantum dot member is not particularly limited, but known quantum dot members disclosed in, for example JP2012-169271A, SID' 12 DIGEST p. 895, and the like are able to be used, and the contents of these literatures are incorporated in the present invention. In addition, a Quantum Dot Enhancement Film (QDEF, manufactured by NanoSys Co., Ltd) is able to be used as such a quantum dot sheet.

Preferred emission center wavelengths of light rays having each of the colors which are emitted from the backlight unit are as follows. In the blue light, it is preferable that the light emission center wavelength is in a wavelength range of 440 nm to 470 nm. In the green light, it is preferable that the light emission center wavelength is in a wavelength range of 520 nm to 570 nm. In the red light, it is preferable that the light emission center wavelength is in a wavelength range of 600 nm to 640 nm.

It is preferable that all of the half-widths of the blue light described above, the green light described above, and the red light described above are less than or equal to 100 nm.

The half-width of the blue light emitted from the backlight unit preferably has a light emission intensity peak of less than or equal to 80 nm, more preferably has a light emission intensity peak of less than or equal to 70 nm, and particularly preferably has a light emission intensity peak of less than or equal to 30 nm.

The half-width of the green light emitted from the backlight unit preferably has a light emission intensity peak of less than or equal to 80 nm, more preferably has a light emission intensity peak of less than or equal to 70 nm, and particularly preferably has a light emission intensity peak of less than or equal to 60 nm.

The half-width of the red light emitted from the backlight unit preferably has a light emission intensity peak of less than or equal to 80 nm, more preferably has a light emission intensity peak of less than or equal to 70 nm, and particularly preferably has a light emission intensity peak of less than or equal to 60 nm.

As a result of studies of the present inventors, a difference (Reflection Center Wavelength−Emission Center Wavelength) between the light emission center wavelength (a wavelength providing a light emission intensity peak) of the blue light, the green light, and the red light of the backlight unit, and the reflection center wavelength (a wavelength providing a reflectivity peak) of each of the colors in the brightness enhancement film is preferably less than or equal to ±50 nm, and is more preferably less than or equal to ±25 nm, with respect to the blue light and the green light.

On the other hand, the light emission center wavelength of the red light is preferably 0 nm to 75 nm, is more preferably 0 nm to 50 nm, and is even more preferably 10 nm to 30 nm, from the viewpoint of suppressing an oblique change in the shade.

It is preferable that the backlight unit further comprises a known diffusion plate or diffusion sheet, a light condensing sheet such as a prism sheet, and a light guide device. These other members are disclosed in JP3416302B, JP3363565B, JP4091978B, JP3448626B, and the like.

[Light Condensing Sheet]

As described above, it is preferable that the light condensing sheet which is the member in the backlight unit has a low depolarization degree. In order to suppress the depolarization, it is preferable to use a light condensing sheet having small refractive index anisotropy, and in particular, to use a light condensing sheet having refractive index isotropy. In a case where the refractive index anisotropy of the light condensing sheet is large, the polarization direction is changed due to retardation while first polarized light which is reflected on the light reflection layer is reflected on the reflection member or the other member in the backlight unit, and is incident again on the reflection polarizer, and the ratio of the circularly polarized light in the second polarization state is reduced, and thus, light which is able to transmitted through the light reflection layer by one time of reflection is reduced, and the light utilization efficiency decreases.

A prism sheet or a lens sheet is able to be used as the light condensing sheet. It is preferable that the light condensing sheet is a sheet in which irregularity is formed on the surface, and various materials and manufacturing methods are able to be used as a material or a preparation method of the light condensing sheet, and in particular, a light condensing sheet manufactured by a refractive index isotropic material is preferable since a polarization change of light which has passed through the light condensing sheet decreases, and the light utilization efficiency is improved.

A resin sheet having small molecular alignment, for example, a sheet in which a light condensing layer is formed by using a film having small refractive index anisotropy of a cyclic olefin resin, an acrylic resin, a cellulose acylate resin, and the like as a transparent support and by disposing an acrylic resin or the like onto the transparent support is preferably used as the light condensing sheet manufactured by the refractive index isotropic material. Re (550)/Rth (550) of the transparent support of the light condensing sheet formed as described above is preferably 0 nm to 20 nm/−80 nm to 80 nm, is more preferably 0 nm to 15 nm/−65 nm to 65 nm, and is even more preferably 0 nm to 10 nm/−50 nm to 50 nm. In addition, the depolarization degree of light which is incident within a range of ±80 degrees with respect to a normal direction of the transparent support is preferably less than or equal to 10%, is more preferably less than or equal to 7%, and is even more preferably less than or equal to 5%. In addition, the ellipticity of the transparent support with respect to the light which is incident within the range of ±80 degrees with respect to the normal direction of the transparent support is preferably 0.8 to 1, is more preferably 0.85 to 1, and is even more preferably 0.9 to 1.

In addition, a light condensing sheet in which the surface of the film (a substrate) having small refractive index anisotropy of the cyclic olefin resin, the acrylic resin, the cellulose acylate resin, and the like is subjected to embossing by using a mold or the like, and thus, irregularity is formed thereon is preferably used. Re (550)/Rth (550) of the substrate of the light condensing sheet formed as described above before forming an irregular shape is preferably 0 nm to 20 nm/−80 nm to 80 nm, is more preferably 0 nm to 15 nm/−65 nm to 65 nm, and is even more preferably 0 nm to 10 nm/−50 nm to 50 nm. In addition, the depolarization degree of the light which is incident within the range of ±80 degrees with respect to the normal direction of the substrate is preferably less than or equal to 10%, is more preferably less than or equal to 7%, and is even more preferably less than or equal to 5%. In addition, the ellipticity of the substrate with respect to the light which is incident within the range of ±80 degrees with respect to the normal direction of the substrate is preferably 0.8 to 1, is more preferably 0.85 to 1, and is even more preferably 0.9 to 1.

(Material and Manufacturing Method of Light Condensing Sheet)

The material configuring the light condensing sheet and the manufacturing method of the light condensing sheet will be described below.

The manufacturing method of the light condensing sheet according to the present invention may be a method in which a fine irregular pattern such as prism or a lens is able to be formed, but the manufacturing method is not limited thereto.

For example, a manufacturing method of a light condensing sheet is able to be used in which a sheet-like resin material extruded by a die is clamped between a transfer roller (having a reverse pattern opposite to the irregular pattern to be formed on the light condensing sheet on the surface) which rotates at the approximately same speed as an extrusion speed of the resin material and a nip roller plate which is arranged to face the transfer roller and rotates at the same speed, and the irregular pattern on the surface of the transfer roller is transferred onto the resin material, and thus, a light condensing sheet is manufactured.

In addition, a manufacturing method of a light condensing sheet is able to be used in which a transfer type plate (a stamper) having a reverse pattern opposite to the irregular pattern to be formed on the light condensing sheet on the surface and a resin plate are laminated by a hot press, and are subjected to press molding by heat transfer.

Further, a manufacturing method of a light condensing sheet is also able to be used in which a light condensing sheet is manufactured by injection molding using a flat die having a reverse pattern opposite to the irregular pattern to be formed on the light condensing sheet.

For example, a thermoplastic resin having small refractive index anisotropy, such as a cyclic olefin resin, an acrylic resin, and a cellulose acylate resin is used as the resin material configuring the light condensing sheet to be used in the manufacturing method as described above.

In addition, a manufacturing method of a light condensing sheet in which an irregular pattern is transferred onto the surface of a transparent film by using an irregular roller (having a reverse pattern opposite to the irregular pattern to be formed on the light condensing sheet on the surface), and thus, a light condensing sheet is manufactured is able to be used as other manufacturing methods. Specifically, a manufacturing method of a light condensing sheet in which an adhesive agent and a resin are sequentially applied onto the surface of the transparent film, an adhesive layer and a resin layer (for example, a UV curable resin) are formed, are wound around the irregular roller rotating the transparent film, and are continuously travelled, the irregular pattern to be formed on the surface of the irregular roller is transferred onto the resin layer, and the resin layer is cured (for example, UV irradiation) in a state where the transparent film is wound around the irregular roller, and thus, a light condensing sheet is manufactured.

Furthermore, in a case where the adhesive layer has excellent adhesiveness between the resin layer and the transparent film, it is not necessary to provide adhesiveness, and examples of a method of improving the adhesiveness include a method of disposing an undercoat layer on the transparent film, a method of performing an activation treatment such as a corona treatment, and the like, and the method is not particularly limited insofar as the adhesiveness becomes excellent by the method.

In addition, the method of improving the adhesiveness include a method in which a resin material (for example, a UV curing resin) is applied onto the irregular roller on which the reverse pattern with respect to the irregular pattern to be formed on the light condensing sheet is formed, the transparent film which is continuously travelled is interposed between the irregular roller and the nip roller, and the resin material of the irregular roller adheres to the transparent film, and then, is cured (for example, UV irradiation). In order to increase the adhesiveness between the resin material and the transparent film, a method of disposing the adhesive layer described above, or the like may be used.

(Transparent Support)

A manufacturing method of the transparent support is not particularly limited. Both of a solution film formation method and a melting film formation method is able to be used. The solution film formation method is preferable. Re (550)/Rth (550) of the transparent support is preferably 0 nm to 20 nm/−80 nm to 80 nm, is more preferably 0 nm to 15 nm/−65 nm to 65 nm, and is even more preferably 0 nm to 10 nm/−50 nm to 50 nm.

For example, a material having small refractive index anisotropy, such as a cyclic olefin resin, an acrylic resin, and a cellulose acylate, is used as a material for forming the transparent support. In addition, the transparent support is able to be formed as a cured layer of an ultraviolet curable resin such as an acrylic resin, an urethane-based resin, an acrylic urethane-based resin, an epoxy-based resin, and a silicone-based resin, and a thermosetting resin.

The transparent support may be a stretching film which has been subjected to a stretching treatment insofar as the film is in a range in which the refractive index isotropy is satisfied. It is possible to adjust retardation and an in-plane slow axis by the stretching treatment.

A method of actively performing stretching in a width direction (a TD direction), for example, is disclosed in each of the publications of JP1987-115035A (JP-S62-115035A), JP1992-152125A (JP-H04-152125A), JP1992-284211A (JP-H04-284211A), JP1992-298310A (JP-H04-298310A), and JP1999-48271A (JP-H11-48271A). The film is stretched at normal temperature or under heating conditions. It is preferable that a heating temperature is −20° C. to +100° C. interposing the glass transition temperature of the film therebetween. In a case where the film is stretched at a temperature which is extremely lower than the glass transition temperature, a breakage easily occurs, and thus, desired optical properties are not able to be exhibited. In addition, in a case where the film is stretched at a temperature which is extremely higher than the glass transition temperature, molecular alignment which is obtained by stretching is relaxed by heat at the time of performing stretching before being thermally immobilized, and thus, the alignment is not able to be immobilized, and the exhibiting properties of the optical properties deteriorate.

The stretching of the film may be monoaxial stretching which is performed only in an MD direction or a TD direction, or may be simultaneously or sequentially biaxial stretching, and it is preferable that the film is more generally stretched in the TD direction. It is preferable that the stretching in the TD direction is stretching of 1% to 100%, is more preferably stretching of 10% to 70%, and is particularly preferably stretching of 20% to 60%. The stretching in the MD direction is preferably stretching of 1% to 10%, and is particularly preferably stretching of 2% to 5%.

The stretching treatment may be performed during a film formation step, and a raw web which is formed and wound may be subjected to the stretching treatment.

In a case where the stretching is performed during the film formation step, the stretching may be performed in a state of including the amount of residual solvent, and it is preferable that the stretching is performed in conditions where Amount of Residual Solvent=(Mass of Residual Volatile Content/Mass of Film after Heat Treatment)×100% is 0.05% to 50%.

In a case where the raw web which is formed and wound is stretched, it is preferable that stretching of 1% to 100% is performed in the TD direction in a state where the amount of residual solvent is 0% to 5%, it is more preferable that stretching of 10% to 70% is performed, and it is particularly preferable that stretching of 20% to 60% is performed.

The stretching treatment may be performed during the film formation step, and then, may be further performed with respect to the raw web which is formed and wound.

In a case where the stretching treatment is further performed after winding the film which has been subjected to the stretching treatment during the film formation step, the stretching during the film formation step may be performed in a state of including the amount of residual solvent, it is preferable that the stretching is performed in conditions where Amount of Residual Solvent=(Mass of Residual Volatile Content/Mass of Film after Heat Treatment)×100% is 0.05% to 50%, it is preferable that the stretching of the raw web which is formed and wound is performed in a state where the amount of residual solvent is 0% to 5%, and the stretching in the TD direction is preferably stretching of 1% to 100% on the basis of an unstretched state, is more preferably stretching of 10% to 70%, and is particularly preferably stretching of 20% to 60%.

In addition, the transparent support may be subjected to biaxial stretching insofar as the support is in a range where the refractive index isotropy is satisfied. In the biaxial stretching, a simultaneously biaxial stretching method and a sequentially biaxial stretching method are used, and the sequentially biaxial stretching method is preferable from the viewpoint of continuous manufacturing, the film is peeled off by a band or a drum after casting a dope, is stretched in the TD direction, and then, is stretched in the MD direction, or the film is stretched in the MD direction, and then, is stretched in the TD direction.

In order to relax a residual strain by the stretching, to reduce a dimensional change, and to decrease a variation with respect to the TD direction of the in-plane slow axis, it is preferable that a relaxing step is provided after horizontal stretching. In the relaxing step, it is preferable that the width of the film after being relaxed with respect to the width of the film before being relaxed is adjusted to be in a range of 100% to 70% (relaxivity of 0% to 30%). It is preferable that the temperature in the relaxing step is the apparent glass transition temperature of the film of Tg−50° C. to Tg+50° C. In general stretching, a time passing through a tenter zone from a relaxivity zone after passing the maximum widening rate is shorter than 1 minute.

Here, in the apparent Tg of the film in the stretching step, an aluminum pan is sealed with a film containing a residual solvent and is heated at 20° C./minute from 25° C. to 200° C. by a differential scanning calorimeter (DSC), and an endothermic curve is obtained, and thus, Tg is obtained.

In a case where the stretching treatment is performed during the film formation step, the film is able to be dried while being transported. A drying temperature is preferably 100° C. to 200° C., is more preferably 100° C. to 150° C., is even more preferably 110° C. to 140° C., and is particularly preferably 130° C. to 140° C. A drying time is not particularly limited, but is preferably 10 minutes to 40 minutes.

By selecting a suitable drying temperature after the stretching, a residual stress of a cellulose ester film to be manufactured is relaxed, and it is possible to decrease a dimensional change, a change in optical properties, and a change in slow axis azimuth under a high temperature and under a high temperature and high humidity.

In a case where the raw web which is formed and wound is subjected to the stretching treatment, the film which has been subjected to the stretching treatment may be manufactured through a step in which the film is further subjected to a heat treatment. It is preferable that the film passes through the step of performing the heat treatment since a residual stress of a transparent support to be manufactured is relaxed, a dimensional change under a high temperature and under a high temperature and high humidity decreases, and a refractive index easily has isotropy. The temperature at the time of heating is not particularly limited, and is preferably 100° C. to 200° C.

Next, in the light condensing sheet having an irregular pattern manufactured by the step described above, a resin material for forming a light condensing layer for obtaining a light condensing sheet 15 will be described.

(Light Condensing Layer and Light Condensing Sheet)

The resin material for forming the light condensing layer or the light condensing sheet has a predetermined refractive index, but is not particularly limited insofar as the resin material has physical properties such as viscosity at which a valley bottom of a concave section is able to be filled with the material. Specifically, a resin such as a polymethyl methacrylate resin (PMMA), a polycarbonate resin, a polystyrene resin, an MS resin, an AS resin, a polypropylene resin, a polyethylene resin, a polyethylene terephthalate resin, a polyvinyl chloride resin (PVC), cellulose acylate, cellulose triacetate, cellulose acetate propionate, cellulose diacetate, a thermoplastic elastomer, or a copolymer thereof, and a cycloolefin polymer may be diluted by a solvent, and the solvent flowing into the concave section may be volatilized. In addition, a UV curing resin or the like may flow into the concave section, and may be immobilized by being irradiated with UV light.

In a case of using the UV curable resin, a UV curable resin having the structure as described above is used in which a reactive group-containing compound such as a (meth)acryloyl group, a vinyl group, or an epoxy group and a compound generating active species such as radicals or cations which is able to allow a reaction of the reactive group-containing compound to occur by radiation irradiation of an ultraviolet ray or the like are mixed. In particular, it is preferable that a reactive group-containing compound (a monomer) having an unsaturated group such as a (meth) acryloyl group and a vinyl group, and a photoradical polymerization initiator generating radicals by light are combined from the viewpoint of rapidity of curing.

Examples of a (meth)acryloyl group compound include phenoxy ethyl (meth)acrylate, phenoxy-2-methyl ethyl (meth)acrylate, phenoxy ethoxy ethyl (meth)acrylate, 3-phenoxy-2-hydroxy propyl (meth)acrylate, 2-phenyl phenoxy ethyl (meth)acrylate, 4-phenyl phenoxy ethyl (meth)acrylate, 3-(2-phenyl phenyl)-2-hydroxy propyl (meth)acrylate, (meth)acrylate of p-cumyl phenol obtained by a reaction of ethylene oxide, ethylene oxide added bisphenol A (meth) acrylic acid ester, propylene oxide added bisphenol A (meth) acrylic acid ester, bisphenol A epoxy (meth)acrylate obtained by an epoxy ring opening reaction of bisphenol A diglycidyl ether and a (meth)acrylic acid, bisphenol F epoxy (meth)acrylate obtained by an epoxy ring opening reaction of bisphenol F diglycidyl ether and a (meth)acrylic acid, and the like.

A compound in which an aromatic ring is substituted with a halogen group such as Br and Cl is used as a (meth) acryloyl group compound having a higher refractive index. Examples of an unsaturated monomer having such a structure include ethylene oxide added tetrabromobisphenol A (meth)acrylic acid ester, propylene oxide added tetrabromobisphenol A (meth)acrylic acid ester, tetrabromobisphenol A epoxy (meth)acrylate obtained by an epoxy ring opening reaction of tetrabromobisphenol A diglycidyl ether and a (meth)acrylic acid, tetrabromobisphenol F epoxy (meth) acrylate obtained by an epoxy ring opening reaction of tetrabromobisphenol F diglycidyl ether and a (meth)acrylic acid, 2-bromophenoxy ethyl (meth)acrylate, 4-bromophenoxy ethyl (meth)acrylate, 2,4-dibromophenoxy ethyl (meth)acrylate, 2,6-dibromophenoxy ethyl (meth)acrylate, 2,4,6-tribromophenyl (meth)acrylate, 2,4,6-tribromophenoxy ethyl (meth)acrylate, and the like.

Further, it is possible to increase the refractive index of the resin material by containing an inorganic fine particle material having a high refractive index. Examples of such an inorganic material having a high refractive index include $TiO_2$ (a refractive index of 2.2 to 2.7), $CeO_2$ (a refractive index of 2.2), $ZrO_2$ (a refractive index of 2.1), $In_2O_3$ (a refractive index of 2.0), $La_2O_3$ (a refractive index of 1.95), $SnO_2$ (a refractive index of 1.9), $Sb_2O_5$ (a refractive index of 1.7), and the like. In addition, the transparency of the resin material becomes higher as the particle diameter of fine particles decreases, and thus, the particle diameter is preferably less than or equal to 100 nm, is more preferably less than or equal to 50 nm, and is even more preferably less than or equal to 20 nm. Such an inorganic fine particle material having a high refractive index is able to be used by being mixed with a general UV curable resin, and it is possible to make the refractive index of the UV curable resin higher by mixing the inorganic fine particle material with the UV curable resin having a high refractive index.

Examples of an inflow method into the concave section include a method of allowing a liquid for forming a material with which the valley bottom of the concave section described above is filled to flow into the valley bottom of the concave section by being thinly applied onto the entire surface of the light condensing sheet, and a method of allowing the liquid to flow into the valley bottom of the concave section in each line by a dispenser or the like, and a method may be used in which the valley bottom of the concave section is able to be filled with the liquid with a desired depth.

An optical diffusion function is able to be added to the formed light condensing sheet 15. Examples of a method of adding the optical diffusion function include a method of containing an optical diffusion substance in the light condensing sheet 15. In addition, examples of the method of adding the optical diffusion function include a method of containing optical diffusion particles formed of beads or the like in the light condensing sheet 15, a method of kneading resins having different refractive indices, a method of containing air hollow beads or the like, and the like. Further, examples of the method of adding the optical diffusion function include a method in which the surface of the light condensing sheet 15 has random irregularity by a method of attaching the beads to the surface of the light condensing sheet 15, a method of aspirating the surface of the light condensing sheet 15 by a blast treatment such as a sand blast, and a plasma treatment, a method of dissolving the surface of the light condensing sheet 15 by being impregnated with a solution which dissolves the light condensing sheet 15, and thus, an optical diffusion function is added to the light condensing sheet 15.

It is preferable that an irregular pattern on a light condensing sectional surface is in the shape of a triangular prism, and in particular, it is more preferable that the irregular pattern is in the shape of an isosceles triangle, and it is preferable that the irregular pattern is a prism sheet in which a convex section is directed towards a liquid crystal cell side.

In the characteristics of the shape, the apex angle of the triangle is preferably 70° to 130°, and is more preferably 80° to 110°. In a case where the apex angle is less than 70°, a considerable increase in black display brightness easily occurs due to side lobe light. In contrast, in a case where the apex angle is greater than 130°, a light condensing effect decreases, and brightness in a front direction decreases.

In addition, even in a case where the apex angle of the triangular prism sectional surface is less than 95°, it is possible to reduce side lobe light by disposing an optical adjustment section on a support separately from a prism section, and thus, this is another preferred embodiment.

In addition, a prism sheet in which a plurality of optical adjustment sections are disposed on the plane of the support at predetermined intervals is also a preferred embodiment, examples of the optical adjustment section include an optical adjustment section having optical reflection properties, an optical adjustment section having optical diffusion properties, an optical adjustment section using a refractive index difference, and in particular, the optical adjustment section having optical reflection properties is preferable.

The optical adjustment section is identical to an optical adjustment section of an optical sheet disclosed in JP2008-003515A and JP2008-176197A.

(Manufacturing Method of Light Condensing Sheet)

Figure 7:
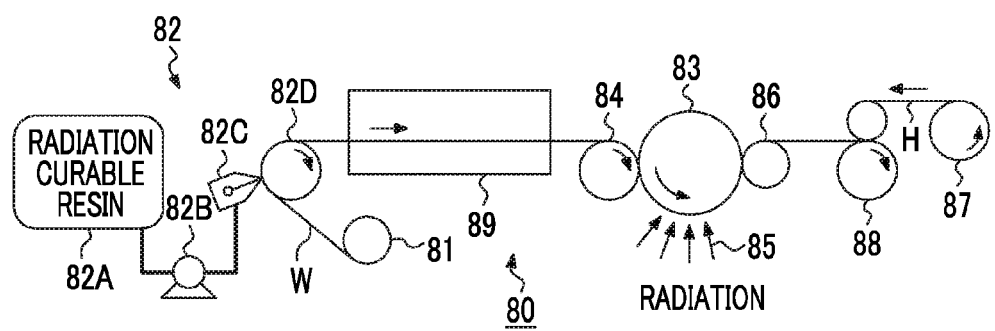
FIG. 7 is a conceptual diagram illustrating a configuration of a manufacturing device of a light condensing sheet.

An example of a manufacturing method of the light condensing sheet will be described with reference to the drawings. FIG. 7 is a conceptual diagram illustrating a configuration of a manufacturing device 80 of a light condensing sheet. The manufacturing device 80 of the light condensing sheet is configured of sheet-like body supply means 81, coating means 82, drying means 89, an embossing roll 83 which is an irregular roll, a nip roll 84, resin curing means 85, a peeling roll 86, protective film supply means 87, sheet winding means 88, and the like.

The details of the manufacturing method of the light condensing sheet are identical to those disclosed in JP2008-176197A.

[Preferred Embodiment of Liquid Crystal Display Device]

In the liquid crystal display device of the present invention, it is preferable that both of the half-widths of the blue light described above and the green light described above are less than or equal to 100 nm. In the liquid crystal display device of the present invention, it is preferable that the red light described above has a light emission center wavelength in a wavelength range of 600 nm to 700 nm, and the half-width of the red light described above is less than or equal to 100 nm. In such an embodiment which is a part of the liquid crystal display device of the present invention, it is possible to realize sufficient brightness improvement performance by the brightness enhancement film or the optical sheet member of the present invention having a simple configuration such as the light reflection layer formed by immobilizing the cholesteric liquid crystalline phase which is each of RGB light reflection layers and the λ/4 plate while improving color reproducibility by a combination with red, green, and blue (RGB) narrowband backlights.

An example of a preferred display panel of the liquid crystal display device is a liquid crystal panel in a transmission mode, and includes a pair of polarizers, and a liquid crystal cell between the polarizers. In general, a retardation film for compensating a view angle is arranged between each of the polarizers and the liquid crystal cell. The configuration of the liquid crystal cell is not particularly limited, and a liquid crystal cell having a general configuration is able to be adopted. The liquid crystal cell, for example, includes a pair of substrates which are arranged to face each other, and a liquid crystal layer interposed between the pair of substrates, and as necessary, may include a color filter layer and the like. The driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode are able to be used.

It is preferable that an embodiment of the liquid crystal display device includes a liquid crystal cell in which a liquid crystal layer is interposed between facing substrates of which at least one includes an electrode, and the liquid crystal cell is configured by being arranged between two polarizing plates. The liquid crystal display device comprises the liquid crystal cell in which a liquid crystal is sealed between upper and lower substrates, changes the alignment state of the liquid crystal by applying a voltage, and thus, displays an image. Further, as necessary, the liquid crystal display device includes an associated functional layer such as a polarizing plate protective film or an optical compensation member performing optical compensation, and an adhesive layer. In addition, the liquid crystal display device of the present invention may include other members. For example, a surface layer such as a forward scattering layer, a primer layer, an antistatic layer, and an undercoat layer may be arranged along with (or instead of) a color filter substrate, a thin layer transistor substrate, a lens film, a diffusion sheet, a hard coat layer, an anti-reflection layer, a low reflection layer, an antiglare layer, and the like.

Figure 6:
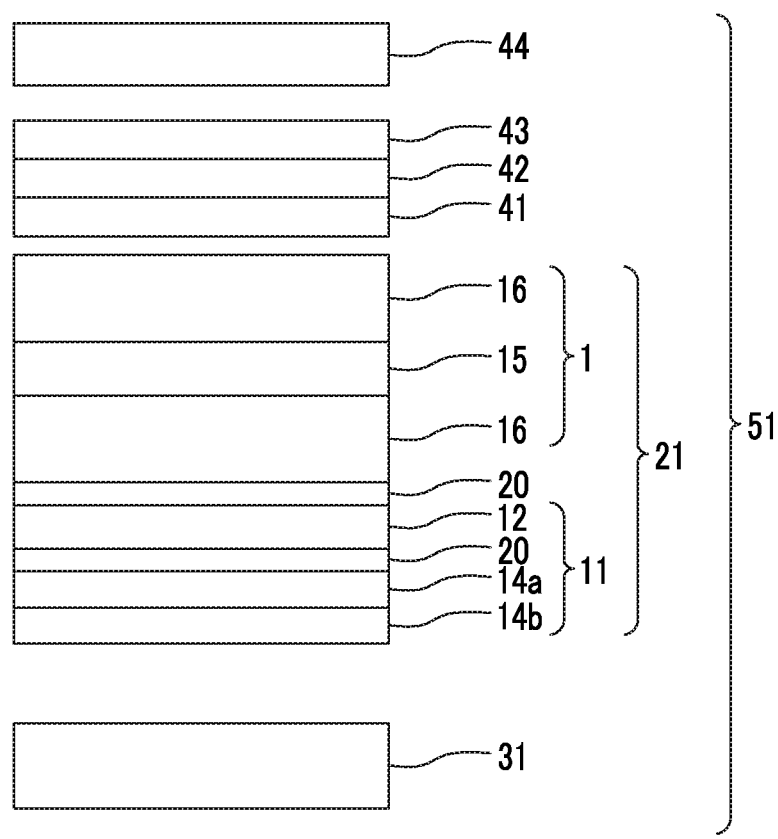
FIG. 6 is a schematic sectional view of an example of a liquid crystal display device including a brightness enhancement film of the present invention.

In FIG. 6, an example of the configuration of the liquid crystal display device is illustrated. In FIG. 6, in a liquid crystal display device 51, the backlight unit 31, the optical sheet member 21 (a laminated body of a reflection polarizer 11 and the backlight side polarizing plate 1), a thin layer transistor substrate 41, a liquid crystal cell 42, a color filter substrate 43, and a display side polarizing plate 44 are laminated in this order.

Furthermore, in FIG. 6, the configuration of the brightness enhancement film is an example, and the brightness enhancement film which is applied to the liquid crystal display device is not limited to the example illustrated in FIG. 6.

[Method of Bonding Optical Sheet Member to Liquid Crystal Display Device]

A known method is able to be used as a method of bonding the brightness enhancement film or the optical sheet member of the present invention to the liquid crystal display device. In addition, a roll to panel method is able to be used, and the roll to panel method is preferable from the viewpoint of improving productivity and a yield. The roll to panel method is disclosed in JP2011-48381A, JP2009-175653A, JP4628488B, JP4729647B, WO2012/014602A, WO2012/014571A, and the like, but is not limited thereto.

[Layer Changing Polarization State of Light]

In the liquid crystal display device, it is preferable that a layer changing a polarization state of light is arranged between the light reflection layer on the outermost layer of the brightness enhancement film and the backlight unit. The brightness enhancement film may include the layer changing the polarization state of the light on a side opposite to the λ/4 plate layer side of the reflection polarizer. This is because the layer changing the polarization state of the light functions as a layer changing a polarization state of light which is reflected from the light reflection layer, and thus, brightness is able to be improved, a change in the shade is able to be reduced, and coating unevenness is able to be relaxed.

Examples of the layer changing the polarization state of the light include a polymer layer having a refractive index higher than that of an air layer, and examples of the polymer layer having a refractive index higher than that of the air layer include various low reflection layers such as a hardcoat (HC) treatment layer, an antiglare (AG) treatment layer, and a low reflection (AR) treatment layer, a triacetyl cellulose (TAC) film, an acrylic resin film, a cycloolefin polymer (COP) resin film, a stretched PET film, and the like. The layer changing the polarization state of the light may also function as a support. A relationship between the average refractive index of the layer changing the polarization state of the light which is reflected from the light reflection layer and the average refractive index of the light reflection layer on the outermost layer, is preferably 0<|Average Refractive Index of Layer Changing Polarization State of Light−Average Refractive Index of Light Reflection Layer on Outermost Layer|<0.8, is more preferably 0<|Average Refractive Index of Layer Changing Polarization State of Light−Average Refractive Index of Light Reflection Layer on Outermost Layer|<0.4, and is even more preferably 0<|Average Refractive Index of Layer Changing Polarization State of Light−Average Refractive Index of Light Reflection Layer on Outermost Layer|<0.2.

The layer changing the polarization state of the light may be integrated with the brightness enhancement film, or may be disposed separately from the brightness enhancement film.

EXAMPLES

Hereinafter, the characteristics of the present invention will be more specifically described with reference to examples and comparative examples. Materials, used amounts, ratios, treatment contents, treatment sequences, and the like of the following examples are able to be suitably changed unless the changes cause deviance from the gist of the present invention. Therefore, the range of the present invention will not be restrictively interpreted by the following specific examples.

Examples 1 to 25

<S1: Preparation of Support and Formation of Alignment Layer>

(Alkali Saponification Treatment)

A cellulose acylate film T1 ("TD40UL" (manufactured by Fujifilm Corporation) passed through dielectric heating rolls at a temperature of 60° C., and thus, a film surface temperature increased to 40° C., and then, an alkali solution having compositions described below was applied onto one surface of the film by using a bar coater at a coating amount of 14 ml/m² and was heated to 110° C. The film was transported under a steam type far infrared heater manufactured by NORITAKE CO., LIMITED for 10 seconds. Subsequently, pure water was applied thereon by using the same bar coater at a coating amount of 3 ml/m². Next, water washing of a fountain coater and water draining of an air knife were repeated three times, and then, the film was dried by being transported to a drying zone at 70° C. for 10 seconds, and thus, a cellulose acylate film which had been subjected to an alkali saponification treatment was prepared.

Alkali Solution Composition

| Potassium Hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene Glycol | 14.8 parts by mass |

(Formation of Alignment Film)

An alignment film coating liquid having compositions described below was continuously applied onto a long cellulose acylate film which had been subjected to the saponification treatment as described above by using a wire bar of #14. The alignment layer coating liquid was dried by hot air at 60° C. for 60 seconds, and was further dried by hot air at 100° C. for 120 seconds. The obtained coated film was continuously subjected to a rubbing treatment. At this time, a longitudinal direction of the long film was parallel to a transport direction of the long film, and a rotational axis of a rubbing roller was in a direction of 45° with respect to a film longitudinal direction in a clockwise direction.

Composition of Alignment Film Coating Liquid

| Modified Polyvinyl Alcohol 1 | 10 parts by mass |
| Water | 371 parts by mass |
| Methanol | 119 parts by mass |
| Glutaraldehyde | 0.5 parts by mass |
| Photopolymerization Initiator (IRGACURE 2959, manufactured by BASF SE) | 0.3 parts by mass |

Modified Polyvinyl Alcohol 1

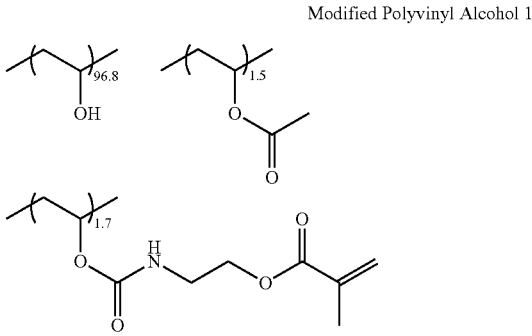

<A1 Formation of λ/4 Plate Using Disk-Like Liquid Crystal Compound>

A coating liquid A1 containing a disk-like liquid crystal compound having compositions described below was continuously applied onto the surface of the alignment film prepared as described above by using a wire bar of #3.6. A transport speed (V) of the film was set to 20 m/min. In order to dry a solvent of the coating liquid and to align and mature the disk-like liquid crystal compound, the film was heated by hot air at 130° C. for 90 seconds. Subsequently, ultraviolet irradiation (300 mJ/cm²) was performed at 80° C., and thus, a λ/4 plate was formed by immobilizing the alignment of the liquid crystal compound.

Coating Liquid A1 Containing Disk-Like Liquid Crystal Compound

| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |

-continued

| | |
|---|---|
| Alignment Aid 2 | 0.1 parts by mass |
| Surfactant 1 | 0.3 parts by mass |
| Polymerization Initiator 1 | 3 parts by mass |
| Methyl Ethyl Ketone | 301 parts by mass |

Each of the alignment aids 1 and 2 described above is a mixture of two types of compounds having different substitution positions of a methyl group in a benzene ring substituted with trimethyl (a mixed ratio of two types of compounds of 50:50 (Mass Ratio)). In addition, in "a/b=98/2" of the surfactant 1, a represents 98 mass %, and b represents 2 mass %.

Compound 101

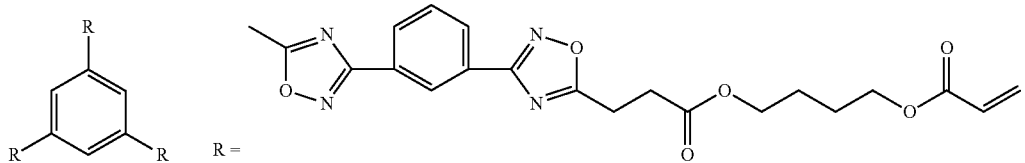

Compound 102

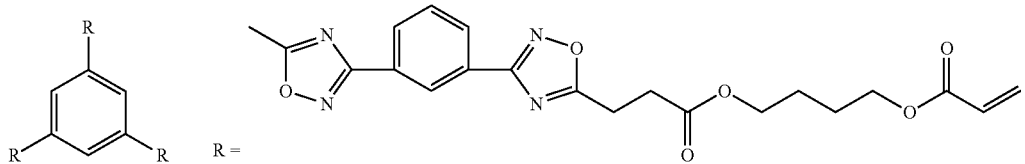

Alignment Aid 1

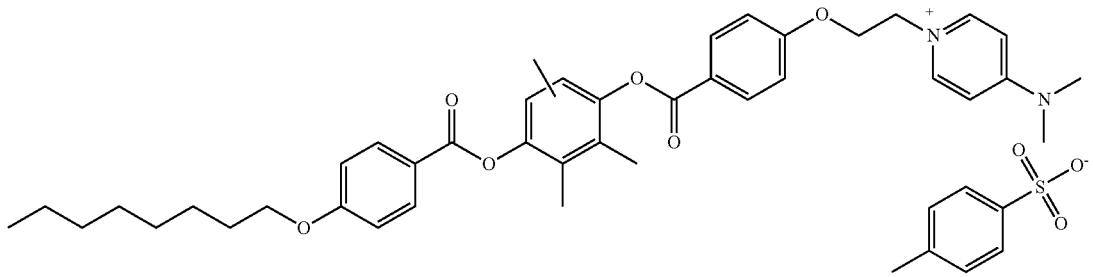

Alignment Aid 2

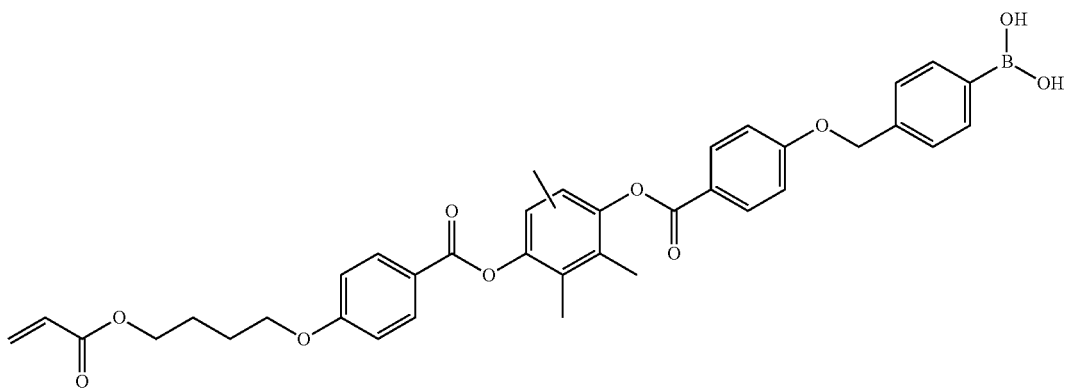

Surfactant 1

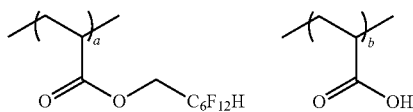

a/b = 98/2

Polymerization Initiator 1

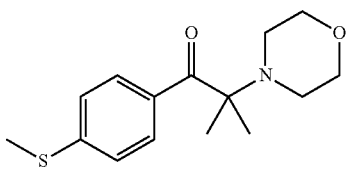

51

<B1 Formation of Cholesteric Liquid Crystal Layer Using Disk-Like Liquid Crystal Compound>

A PET film (a thickness of 75 μm) manufactured by Fujifilm Corporation was prepared as a temporary support, and was continuously subjected to a rubbing treatment. The direction of the rubbing treatment was parallel to the film longitudinal direction. Furthermore, it was confirmed that a general PET film (for example, COSMOSHINE A4100 (manufactured by TOYOBO CO., LTD.)) was able to be used as the temporary support in addition to the PET film described above.

A coating liquid B1 containing a disk-like liquid crystal compound having compositions described below was continuously applied onto the rubbing treatment surface of the PET film described above such that the thickness was adjusted to be a film thickness shown in Table 1. Subsequently, a solvent was dried at 70° C. for 2 minutes, and the solvent was vaporized, and then, heating and maturing were performed at 115° C. for 3 minutes, and thus, a homogeneous alignment state was obtained.

After that, the coated film was retained at 45° C., and was subjected to ultraviolet irradiation (300 mJ/cm$^2$) under nitrogen atmosphere by using a high pressure mercury lamp, and thus, a light reflection layer was formed.

Coating Liquid B1 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Polymerizable Monomer 1 | 10 parts by mass |
| Surfactant 1 | 0.3 parts by mass |
| Polymerization Initiator 1 | 3 parts by mass |
| Chiral Agent 1 | Shown in Table 1 |
| Methyl Ethyl Ketone | 290 parts by mass |
| Cyclohexanone | 50 parts by mass |

Polymerizable Monomer 1

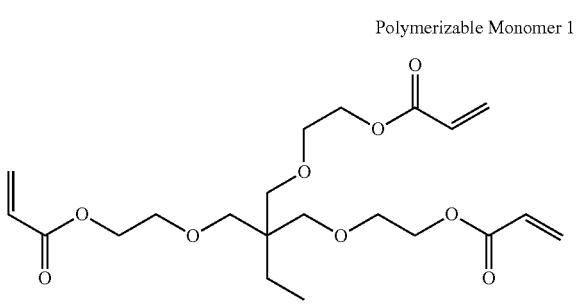

Chiral Agent 1

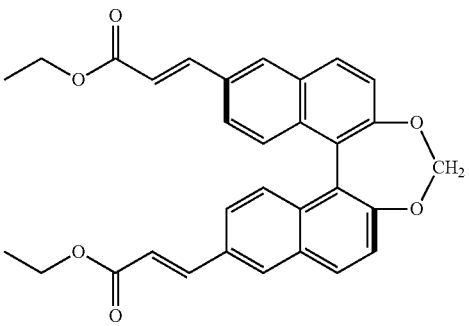

<A2 Formation of λ/4 Plate Using Rod-Like Liquid Crystal Compound>

A coating liquid A2 containing a rod-like liquid crystal compound having compositions described below was continuously applied onto the alignment film prepared as described above by using a wire bar of #3.6. A transport speed (V) of the film was set to 20 m/min. In order to dry a solvent of the coating liquid and to align and mature the rod-like liquid crystal compound, the film was heated by hot air at 85° C. for 120 seconds. Subsequently, ultraviolet irradiation (300 mJ/cm$^2$) was performed at 80° C., and thus, a λ/4 plate was formed by immobilizing the alignment of the liquid crystal compound.

Coating Liquid A2 Containing Rod-Like Liquid Crystal Compound

| | |
|---|---|
| Rod-Like Liquid Crystal Compound 201 | 83 parts by mass |
| Rod-Like Liquid Crystal Compound 202 | 15 parts by mass |
| Rod-Like Liquid Crystal Compound 203 | 2 parts by mass |
| Multifunctional Monomer A-TMMT (manufactured by Shin Nakamura Chemical Co., Ltd.) | 1 part by mass |
| Polymerization Initiator IRGACURE 819 (manufactured by BASF SE) | 4 parts by mass |
| Surfactant 2 | 0.05 parts by mass |
| Surfactant 3 | 0.01 parts by mass |
| Methyl Ethyl Ketone | 165 parts by mass |
| Cyclohexanone | 10 parts by mass |

Rod-Like Liquid Crystal Compound 201

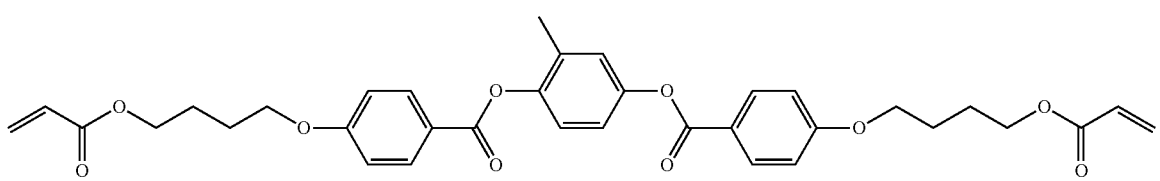

Rod-Like Liquid Crystal Compound 202

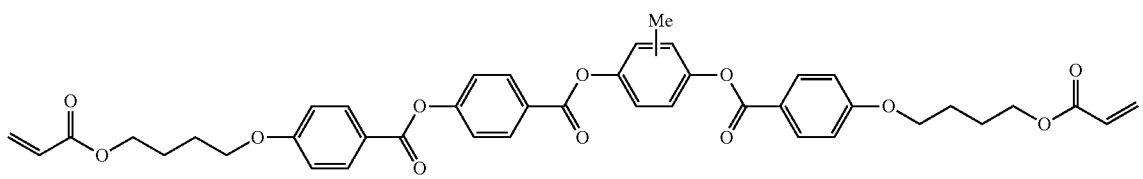

-continued

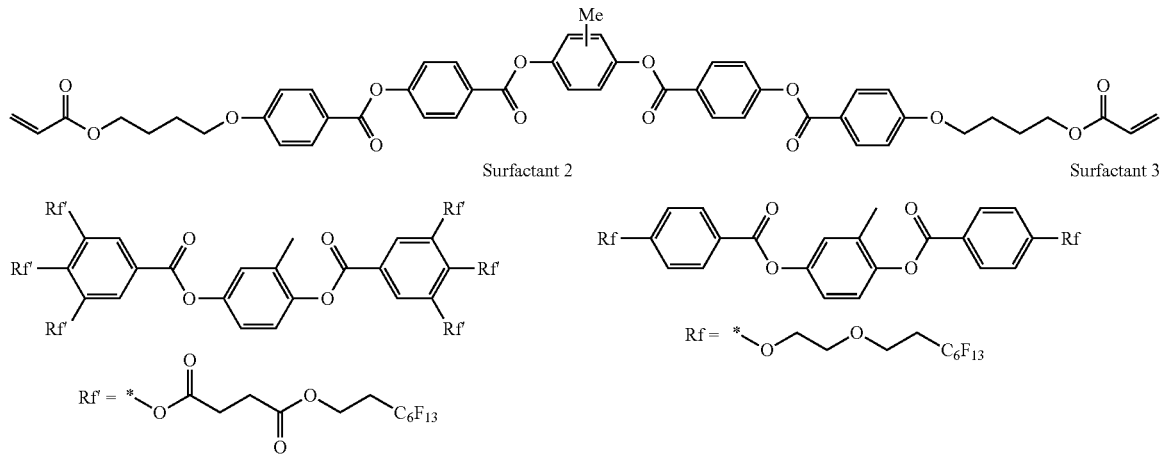

<A3 Formation of λ/4 Plate Using Disk-Like Liquid Crystal Compound>

A coating liquid A3 containing a disk-like liquid crystal compound having compositions described below was continuously applied onto the surface of the alignment film prepared as described above by using a wire bar of #3.6. A transport speed (V) of the film was set to 20 m/min. In order to dry a solvent of the coating liquid and to align and mature the disk-like liquid crystal compound, the film was heated by hot air at 130° C. for 90 seconds. Subsequently, ultraviolet irradiation (300 mJ/cm$^2$) was performed at 80° C., and thus, a λ/4 plate was formed by immobilizing the alignment of the liquid crystal compound.

Coating Liquid A3 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |
| Alignment Aid 2 | 0.1 parts by mass |
| MEGAFAC 444F (manufactured by DIC Corporation) | 0.15 parts by mass |
| Polymerization Initiator 1 | 3 parts by mass |
| Methyl Ethyl Ketone | 301 parts by mass |

<A4 Formation of λ/4 plate Using Disk-Like Liquid Crystal Compound>

A coating liquid A4 containing a disk-like liquid crystal compound having compositions described below was continuously applied onto the surface of the alignment film prepared as described above by using a wire bar of #3.6. A transport speed (V) of the film was set to 20 m/min. In order to dry a solvent of the coating liquid and to align and mature the disk-like liquid crystal compound, the film was heated by hot air at 130° C. for 90 seconds. Subsequently, ultraviolet irradiation (300 mJ/cm$^2$) was performed at 80° C., and thus, a λ/4 plate was formed by immobilizing the alignment of the liquid crystal compound.

Coating Liquid A4 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |
| Alignment Aid 2 | 0.1 parts by mass |
| PHTHAGENT F710 (manufactured by NEOS COMPANY LIMITED) | 0.15 parts by mass |
| Polymerization Initiator 1 | 3 parts by mass |
| Methyl Ethyl Ketone | 301 parts by mass |

<B2 Formation of Cholesteric Liquid Crystal Layer Using Rod-Like Liquid Crystal Compound>

A PET film (a thickness of 75 μm) manufactured by Fujifilm Corporation was prepared as a temporary support, and was continuously subjected to a rubbing treatment. The direction of the rubbing treatment was parallel to the film longitudinal direction. Furthermore, it was confirmed that a general PET film (for example, COSMOSHINE A4100 (manufactured by TOYOBO CO., LTD.)) was able to be used as the temporary support in addition to the PET film described above.

A coating liquid B2 containing a rod-like liquid crystal compound having compositions described below was continuously applied onto the rubbing treatment surface of the PET film described above such that the thickness was adjusted to be a film thickness shown in the table. A transport speed (V) of the film was set to 20 m/min. In order to dry a solvent of the coating liquid and to align and mature the rod-like liquid crystal compound, the film was heated by hot air at 85° C. for 120 seconds. Subsequently, ultraviolet irradiation (300 mJ/cm$^2$) was performed at 80° C., and thus, a light reflection layer was formed by immobilizing the alignment of the liquid crystal compound.

Coating Liquid B2 Containing Rod-Like Liquid Crystal Compound

| | |
|---|---|
| Rod-Like Liquid Crystal Compound 201 | 83 parts by mass |
| Rod-Like Liquid Crystal Compound 202 | 15 parts by mass |
| Rod-Like Liquid Crystal Compound 203 | 2 parts by mass |
| Multifunctional Monomer A-TMMT (manufactured by Shin Nakamura Chemical Co., Ltd.) | 1 part by mass |
| Polymerization Initiator IRGACURE 819 (manufactured by BASF SE) | 4 parts by mass |
| Surfactant 2 | 0.05 parts by mass |
| Surfactant 3 | 0.01 parts by mass |
| Chiral Agent LC756 (manufactured by BASF SE) | Shown in Table 1 |
| Methyl Ethyl Ketone | 165 parts by mass |
| Cyclohexanone | 10 parts by mass |

<B3 Formation of Cholesteric Liquid Crystal Layer Using Rod-Like Liquid Crystal Compound Having High Δn>

A PET film (a thickness of 75 μm) manufactured by Fujifilm Corporation was prepared as a temporary support, and was continuously subjected to a rubbing treatment. The direction of the rubbing treatment is parallel to the film longitudinal direction. Furthermore, it was confirmed that a general PET film (for example, COSMOSHINE A4100 (manufactured by TOYOBO CO., LTD.)) was able to be used as the temporary support in addition to the PET film described above.

A coating liquid B3 containing a rod-like liquid crystal compound having compositions described below was continuously applied onto the rubbing treatment surface of the PET film described above such that the thickness was adjusted to be a film thickness shown in the table. A transport speed (V) of the film was set to 20 m/min. In order to dry a solvent of the coating liquid and to align and mature the rod-like liquid crystal compound, the film was heated by hot air at 85° C. for 120 seconds. Subsequently, ultraviolet irradiation (300 mJ/cm$^2$) was performed at 80° C., and thus, a light reflection layer was formed by immobilizing the alignment of the liquid crystal compound.

Coating Liquid B3 Containing Rod-Like Liquid Crystal Compound

| | |
|---|---|
| Rod-Like Liquid Crystal Compound 204 | 100 parts by mass |
| Multifunctional Monomer A-TMMT (manufactured by Shin Nakamura Chemical Co., Ltd.) | 1 part by mass |
| Polymerization Initiator IRGACURE 819 (manufactured by BASF SE) | 4 parts by mass |
| Surfactant 2 | 0.05 parts by mass |
| Surfactant 3 | 0.01 parts by mass |
| Chiral Agent LC756 (manufactured by BASF SE) | Shown in Table 1 |
| Methyl Ethyl Ketone | 200 parts by mass |
| Cyclohexanone | 20 parts by mass | direction of the rubbing treatment was parallel to the film longitudinal direction. Furthermore, it was confirmed that a general PET film (for example, COSMOSHINE A4100 (manufactured by TOYOBO CO., LTD.)) was able to be used as the temporary support in addition to the PET film described above.

A coating liquid B4 containing a rod-like liquid crystal compound having compositions described below was continuously applied onto the rubbing treatment surface of the PET film described above such that the thickness was adjusted to be a film thickness shown in the table. A transport speed (V) of the film was set to 20 m/min.

In order to dry a solvent of the coating liquid and to align and mature the rod-like liquid crystal compound, the film was heated by hot air at 110° C. for 120 seconds.

Subsequently, ultraviolet irradiation was performed at a temperature of 100° C. and irradiation dose of 20 mJ/cm$^2$.

Further, after that, in order to align and remature the rod-like liquid crystal compound, the film was heated by hot air at 80° C. for 120 seconds.

Subsequently, ultraviolet irradiation was performed at a temperature of 70° C. and irradiation dose of 350 mJ/cm$^2$, and thus, a light reflection layer was formed.

Coating Liquid B4 Containing Rod-Like Liquid Crystal Compound

| | |
|---|---|
| Rod-Like Liquid Crystal Compound 204 | 100 parts by mass |
| Multifunctional Monomer A-TMMT (manufactured by Shin Nakamura Chemical Co., Ltd.) | 1 part by mass |
| Polymerization Initiator 1 | 4 parts by mass |
| Surfactant 2 | 0.05 parts by mass |
| Surfactant 3 | 0.01 parts by mass |
| Chiral Agent 2 | Shown in Table 1 |
| Methyl Ethyl Ketone | 200 parts by mass |
| Cyclohexanone | 20 parts by mass |

Rod-Like Liquid Crystal Compound 204

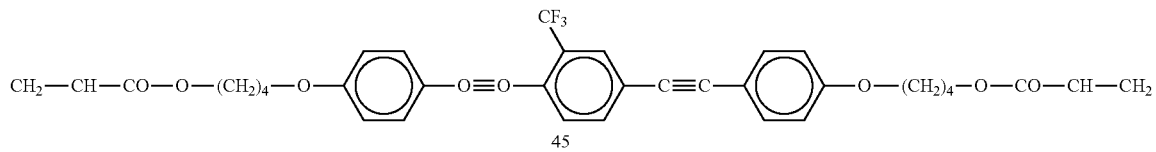

<B4 Formation of Pitch Gradient Cholesteric Liquid Crystal Layer Using Rod-Like Liquid Crystal Compound Having High Δn>

A PET film (a thickness of 75 μm) manufactured by Fujifilm Corporation was prepared as a temporary support, and was continuously subjected to a rubbing treatment. The Chiral Agent 2

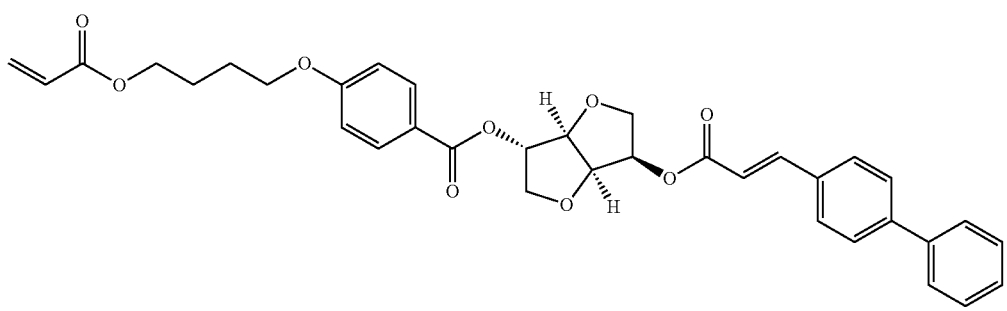

<B5 Formation of Pitch Gradient Cholesteric Liquid Crystal Layer Using Rod-Like Liquid Crystal Compound>

A PET film (a thickness of 75 μm) manufactured by Fujifilm Corporation was prepared as a temporary support, and was continuously subjected to a rubbing treatment. The direction of the rubbing treatment was parallel to the film longitudinal direction. Furthermore, it was confirmed that a general PET film (for example COSMOSHINE A4100 (manufactured by TOYOBO CO., LTD.)) was able to be used as the temporary support in addition to the PET film described above.

A coating liquid B5 containing a rod-like liquid crystal compound having compositions described below was continuously applied onto the rubbing treatment surface of the PET film described above such that the thickness was adjusted to be a film thickness shown in the table. A transport speed (V) of the film was set to 20 m/min.

In order to dry a solvent of the coating liquid and to align and mature the rod-like liquid crystal compound, the film was heated by hot air at 110° C. for 120 seconds.

Subsequently, ultraviolet irradiation was performed at a temperature of 100° C. and irradiation dose of 20 mJ/cm$^2$.

Further, after that, in order to align and remature the rod-like liquid crystal compound, the film was heated by hot air at 80° C. for 120 seconds.

Subsequently, ultraviolet irradiation was performed at a temperature of 70° C. and irradiation dose of 350 mJ/cm$^2$, and thus, a light reflection layer was formed.

Coating Liquid B5 Containing Rod-Like Liquid Crystal Compound

| | |
|---|---|
| Rod-Like Liquid Crystal Compound 201 | 83 parts by mass |
| Rod-Like Liquid Crystal Compound 202 | 15 parts by mass |
| Rod-Like Liquid Crystal Compound 203 | 2 parts by mass |
| Multifunctional Monomer A-TMMT (manufactured by Shin Nakamura Chemical Co., Ltd.) | 1 part by mass |
| Polymerization Initiator 1 | 4 parts by mass |
| Surfactant 2 | 0.05 parts by mass |
| Surfactant 3 | 0.01 parts by mass |
| Chiral Agent 2 | Shown in Table 1 |
| Methyl Ethyl Ketone | 165 parts by mass |
| Cyclohexanone | 35 parts by mass |

<B6 Formation of Cholesteric Liquid Crystal Layer Using Disk-Like Liquid Crystal Compound>

A light reflection layer was formed by the same method as that in B1 described above by using a coating liquid described below.

Coating Liquid B6 Containing Disk-Like Liquid Crystal Compound

| | |
|---|---|
| Disk-Like Liquid Crystal Compound (Compound 1 Described below) | 35 parts by mass |
| Disk-Like Liquid Crystal Compound (Compound 2 Described below) | 35 parts by mass |
| Chiral Agent (Compound 103 Described below) | 25 parts by mass |
| Alignment Aid (Compound 3 Described below) | 1 part by mass |
| Alignment Aid (Compound 4 Described below) | 1 part by mass |
| Polymerization Initiator (Compound 5 Described below) | 3 parts by mass |

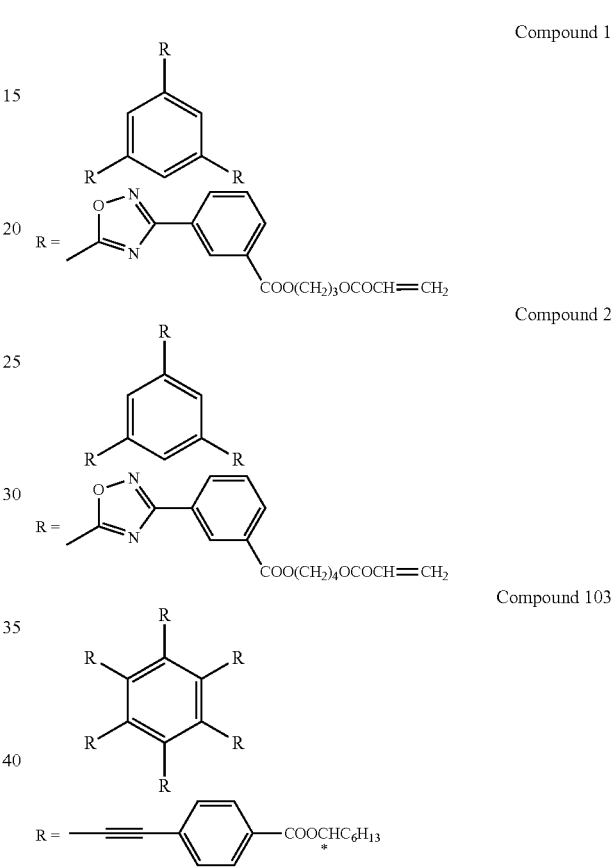

Compound 3 (In Structural Formula Described below, Mixture of Two Types of Compounds Having Different Substitution Positions of Methyl Group in Benzene Ring Substituted with Trimethyl. Mixed Ratio of Two Types of Compounds of 50:50 (Mass Ratio))

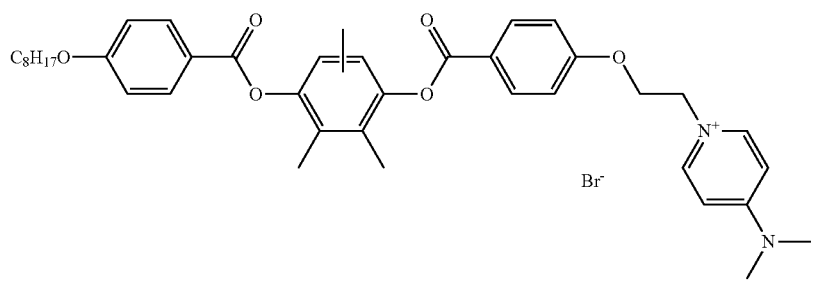

Compound 4

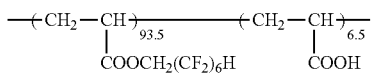

Compound 5

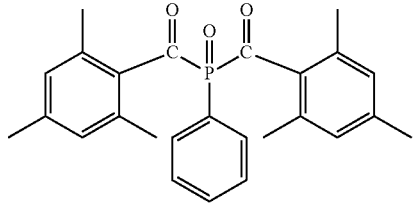

<B7 Formation of Cholesteric Liquid Crystal Layer Using Rod-Like Liquid Crystal Compound>

A light reflection layer was formed by the same method as that in B2 described above by using a coating liquid described below.

Coating Liquid B7 Containing Rod-Like Liquid Crystal Compound

| | |
|---|---|
| Compound 11 Described below | 80 parts by mass |
| Compound 12 Described below | 20 parts by mass |
| Surfactant 3 | 0.1 parts by mass |
| Surfactant 2 | 0.007 parts by mass |
| Chiral Agent LC756 (manufactured by BASF SE) | Shown in Table 1 |
| Polymerization Initiator IRGACURE 819 (manufactured by BASF SE) | 3 parts by mass |
| Solvent (Methyl Ethyl Ketone) | Amount at Which Solute Concentration Become 30 mass % | air at 85° C. for 120 seconds. Subsequently, ultraviolet irradiation (300 mJ/cm$^2$) was performed at 80° C., and thus, a light reflection layer was formed by immobilizing the alignment of the liquid crystal compound.

Coating Liquid B8 Containing Rod-Like Liquid Crystal Compound

| | |
|---|---|
| Rod-Like Liquid Crystal Compound 201 | 83 parts by mass |
| Rod-Like Liquid Crystal Compound 202 | 15 parts by mass |
| Rod-Like Liquid Crystal Compound 203 | 2 parts by mass |
| Multifunctional Monomer A-TMMT (manufactured by Shin Nakamura Chemical Co., Ltd.) | 1 part by mass |
| Polymerization Initiator IRGACURE 819 (manufactured by BASF SE) | 4 parts by mass |
| MEGAFAC 444F | 0.25 parts by mass |
| Chiral Agent LC756 (manufactured by BASF SE) | Shown in Table 1 |
| Methyl Ethyl Ketone | 165 parts by mass |
| Cyclohexanone | 10 parts by mass |

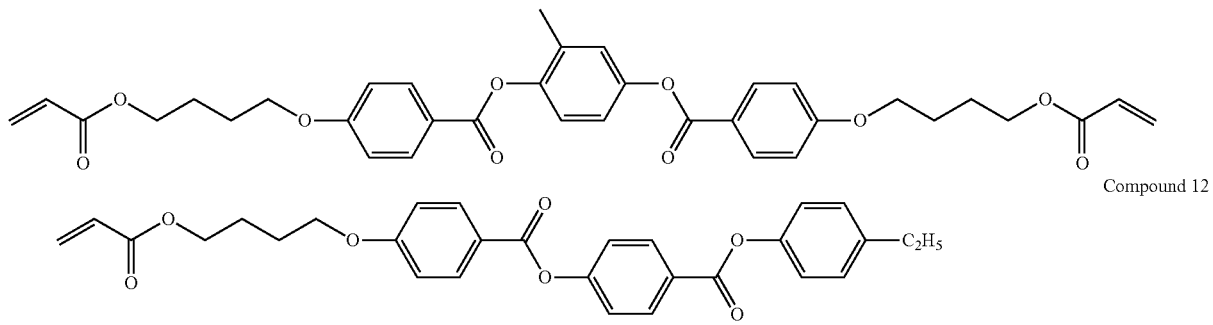

Compound 11

Compound 12

<B8 Formation of Cholesteric Liquid Crystal Layer Using Rod-Like Liquid Crystal Compound>

A PET film (a thickness of 75 μm) manufactured by Fujifilm Corporation was prepared as a temporary support, and was continuously subjected to a rubbing treatment. The direction of the rubbing treatment was parallel to the film longitudinal direction. Furthermore, it was confirmed that a general PET film (for example COSMOSHINE A4100 (manufactured by TOYOBO CO., LTD.)) was able to be used as the temporary support in addition to the PET film described above.

A coating liquid B8 containing a rod-like liquid crystal compound having compositions described below was continuously applied onto the rubbing treatment surface of the PET film described above such that the thickness was adjusted to be a film thickness shown in the table. A transport speed (V) of the film was set to 20 m/min. In order to dry a solvent of the coating liquid and to align and mature the rod-like liquid crystal compound, the film was heated by hot <B9 Formation of Cholesteric Liquid Crystal Layer Using Rod-Like Liquid Crystal Compound>

A PET film (a thickness of 75 μm) manufactured by Fujifilm Corporation was prepared as a temporary support, and was continuously subjected to a rubbing treatment. The direction of the rubbing treatment is parallel to the film longitudinal direction. Furthermore, it was confirmed that a general PET film (for example, COSMOSHINE A4100 (manufactured by TOYOBO CO., LTD.)) was able to be used as the temporary support in addition to the PET film described above.

A coating liquid B9 containing a rod-like liquid crystal compound having compositions described below was continuously applied onto the rubbing treatment surface of the PET film described above such that the thickness was adjusted to be a film thickness shown in the table. A transport speed (V) of the film was set to 20 m/min. In order to dry a solvent of the coating liquid and to align and mature the rod-like liquid crystal compound, the film was heated by hot air at 85° C. for 120 seconds. Subsequently, ultraviolet irradiation (300 mJ/cm$^2$) was performed at 80° C., and thus, a light reflection layer was formed by immobilizing the alignment of the liquid crystal compound.

Coating Liquid B9 Containing Rod-Like Liquid Crystal Compound

| | |
|---|---|
| Rod-Like Liquid Crystal Compound 201 | 83 parts by mass |
| Rod-Like Liquid Crystal Compound 202 | 15 parts by mass |
| Rod-Like Liquid Crystal Compound 203 | 2 parts by mass |
| Multifunctional Monomer A-TMMT (manufactured by Shin Nakamura Chemical Co., Ltd.) | 1 part by mass |
| Polymerization Initiator IRGACURE 819 (manufactured by BASF SE) | 4 parts by mass |
| PHTHAGENT F710 (manufactured by NEOS COMPANY LIMITED) | 0.25 parts by mass |
| Chiral Agent LC756 (manufactured by BASF SE) | Shown in Table 1 |
| Methyl Ethyl Ketone | 165 parts by mass |
| Cyclohexanone | 10 parts by mass |

<Formation of Brightness Enhancement Film>

The film prepared as described above was laminated in the order as shown in Table 1. That is, the light reflection layer on the temporary support was sequentially bonded onto the λ/4 plate by an adhesive agent. The adhesion was performed by applying a commercially available acrylic adhesive agent (UV-3300, manufactured by TOAGOSEI CO., LTD.) onto the surface of any one of the light reflection layer and the λ/4 plate, and by allowing the surface onto which the adhesive agent was applied to adhere to the surface of the other one of the light reflection layer and the λ/4 plate, and then, the adhesive agent was cured by being irradiated with an ultraviolet ray having irradiation dose of 100 mJ/cm$^2$ from a temporary support side by using a metal halide lamp. After that, the temporary support was peeled off.

Here, brightness enhancement films of Comparative Example 2 and Example 12 were prepared as follows.

Example 12

A "QL film" (S2) manufactured by Fujifilm Corporation was used as a λ/4 plate. Re (550) of the film was 125 nm, and Rth (550) of the film was 1 nm.

A first light reflection layer was formed on the QL film as a light reflection layer formed by immobilizing a cholesteric liquid crystalline phase in which a disk-like liquid crystal compound was used as a cholesteric liquid crystal material according to the following method.

First, in an alignment layer, POVAL PVA-103 manufactured by KURARAY CO., LTD. was dissolved in pure water, and then, was applied onto a PET base with a bar by adjusting the concentration such that the thickness of the dried film was 0.5 μm, and after that, was heated at 100° C. for 5 minutes. Further, the surface thereof was subjected to a rubbing treatment, and thus, an alignment layer was formed.

Subsequently, the composition B6 described above was applied onto the alignment layer described above with a bar to have a thickness of a dried film of a cholesteric liquid crystal layer 1 as shown in Table 1 described above, and the solvent was vaporized by being retained at 70° C. for 2 minutes, and then, the composition B6 was heated and matured at 100° C. for 4 minutes, and thus, a homogeneous alignment state was obtained.

After that, the coated film was retained at 80° C., and was subjected to ultraviolet irradiation under nitrogen atmosphere by using a high pressure mercury lamp, and thus, the cholesteric liquid crystal layer 1 was formed.

The cholesteric liquid crystal layer 1 was bonded onto the QL film described above by using the acrylic adhesive agent described above, the PET base and the alignment layer were peeled off, and thus, the cholesteric liquid crystal layer 1 was formed. Further, each of a cholesteric liquid crystal layer 2 and a cholesteric liquid crystal layer 3 was prepared on a PET film manufactured by Fujifilm Corporation by using the composition B7 described above, the second light reflection layer 2 was bonded onto the cholesteric liquid crystal layer 1 by using the acrylic adhesive agent, and then, the PET film was peeled off, and the cholesteric liquid crystal layer 3 was bonded onto the second light reflection layer 2 by using the acrylic adhesive agent, and then, the PET film was peeled off, and thus, a brightness enhancement film of Example 12 was prepared.

Comparative Example 2

A brightness enhancement film of Comparative Example 2 was formed in the same procedure as that in Example 12 except that the composition B2 described above was used in each of the cholesteric liquid crystal layers 1 to 3.

TABLE 1

| | | | Layer λ/4 Plate | | Cholesteric Liquid Crystal Layer 1 | | | | Cholesteric Liquid Crystal Layer 2 | | | |
|---|---|---|---|---|---|---|---|---|---|---|---|---|
| | Support | Alignment Film | Preparation | Re | Material | Amount of Chiral Agent | Film Thickness | Δn | Material | Amount of Chiral Agent | Film Thickness | Δn |
| Example 1 | S1 | H | A1 | 128 | B1 | 3.8 | 2.7 | 0.17 | B2 | 6.5 | 2.3 | 0.16 |
| Comparative Example 1 | S1 | H | A1 | 128 | B1 | 3.8 | 2.7 | 0.17 | B1 | 5.6 | 2.3 | 0.17 |
| Comparative Example 2 | | S2 | | 135 | B2 | 3.7 | 2.7 | 0.16 | B2 | 6.5 | 2.3 | 0.16 |
| Example 2 | S1 | H | A1 | 128 | B1 | 3.8 | 2.7 | 0.17 | B2 | 6.5 | 2.3 | 0.16 |
| Example 3 | S1 | H | A1 | 128 | B1 | 3.8 | 2.7 | 0.17 | B2 | 6.5 | 2.3 | 0.16 |
| Example 4 | S1 | H | A1 | 128 | B1 | 3.8 | 2.7 | 0.17 | B4 | 3.5 | 5.2 | 0.29 |
| Example 5 | S1 | H | A1 | 128 | B1 | 3.8 | 2.7 | 0.17 | B5 | 3.5 | 11.0 | 0.16 |
| Example 6 | S1 | H | A1 | 120 | B1 | 5.6 | 2.3 | 0.17 | B4 | 2.7 | 5.5 | 0.29 |
| Example 7 | S1 | H | A1 | 128 | B1 | 3.9 | 2.8 | 0.17 | B3 | 6.2 | 2.2 | 0.29 |

TABLE 1-continued

| | | | | | | | | | | | | | |
|---|---|---|---|---|---|---|---|---|---|---|---|---|---|
| Example 8 | S1 | H | A1 | 128 | B1 | 3.8 | 2.7 | 0.17 | B2 | 5.1 | 2.8 | 0.16 | |
| Example 9 | S1 | H | A1 | 128 | B1 | 3.8 | 2.7 | 0.17 | B2 | 5 | 2.9 | 0.16 | |
| Comparative Example 3 | S1 | H | A1 | 128 | B2 | 3.7 | 2.7 | 0.17 | B2 | 5 | 2.9 | 0.16 | |
| Example 10 | S1 | H | A1 | 128 | B1 | 3.8 | 2.7 | 0.17 | B1 | 5.6 | 2.3 | 0.16 | |
| Example 11 | S1 | H | A2 | 132 | B1 | 3.8 | 2.7 | 0.17 | B2 | 6.5 | 2.3 | 0.16 | |
| Example 12 | | S2 | | 135 | B6 | 25 | 2.4 | 0.17 | B7 | 5.1 | 2.1 | 0.17 | |
| Comparative Example 4 | | | | | | None | | | | | | | |
| Comparative Example 5 | | | | | | None | | | | | | | |
| Comparative Example 6 | | | Film Prepared by Method Disclosed in Example 2 of JP1999-231130A (JP-H11-231130A) | | | | | | | | | | |
| Example 13 | S1 | H | A3 | 128 | B1 | 3.8 | 2.7 | 0.17 | B8 | 6.5 | 2.3 | 0.16 | |
| Example 14 | S1 | H | A4 | 128 | B1 | 3.8 | 2.7 | 0.17 | B9 | 6.5 | 2.3 | 0.16 | |

| | Cholesteric Liquid Crystal Layer 3 | | | | Cholesteric Liquid Crystal Layer 3 | | | | Film Lamination Reflection Range Having Reflectivity of Greater than or Equal to 10 40% (nm) | Backlight |
|---|---|---|---|---|---|---|---|---|---|---|
| | Material | Amount of Chiral Agent | Film Thickness | $\Delta n$ | Material | Amount of Chiral Agent | Film Thickness | $\Delta n$ | | |
| Example 1 | B2 | 5.1 | 2.8 | 0.16 | — | — | — | — | 180 | Quantum Dot |
| Comparative Example 1 | B1 | 4.3 | 2.8 | 0.17 | — | — | — | — | 180 | Quantum Dot |
| Comparative Example 2 | B2 | 5.1 | 2.8 | 0.16 | — | — | — | — | 180 | Quantum Dot |
| Example 2 | B2 | 5.1 | 2.8 | 0.16 | — | — | — | — | 180 | White LED |
| Example 3 | B3 | 4.5 | 2.5 | 0.29 | — | — | — | — | 240 | White LED |
| Example 4 | — | — | — | — | — | — | — | — | 240 | White LED |
| Example 5 | — | — | — | — | — | — | — | — | 240 | White LED |
| Example 6 | — | — | — | — | — | — | — | — | 240 | White LED |
| Example 7 | B3 | 3.5 | 2.8 | 0.29 | — | — | — | — | 240 | White LED |
| Example 8 | B2 | 6.5 | 2.3 | 0.16 | — | — | — | — | 180 | Quantum Dot |
| Example 9 | — | — | — | — | — | — | — | — | 140 | White LED |
| Comparative Example 3 | — | — | — | — | — | — | — | — | 140 | White LED |
| Example 10 | B2 | 3.8 | 3.0 | 0.16 | B2 | 4.4 | 2.7 | 0.16 | 250 | White LED |
| Example 11 | B2 | 5.1 | 2.8 | 0.16 | — | — | — | — | 180 | Quantum Dot |
| Example 12 | B7 | 6.5 | 1.8 | 0.17 | — | — | — | — | 180 | Quantum Dot |
| Comparative Example 4 | | | None | | | | | | | Quantum Dot |
| Comparative Example 5 | | | None | | | | | | | White LED |
| Comparative Example 6 | | Film Prepared by Method Disclosed in Example 2 of JP1999-231130A (JP-H11-231130A) | | | | | | | 250 | White LED |
| Example 13 | B3 | 4.5 | 2.5 | 0.29 | — | — | — | — | 250 | White LED |
| Example 14 | B3 | 4.5 | 2.5 | 0.29 | — | — | — | — | 250 | White LED |

<Preparation of Polarizing Plate>

Next, a polarizer was manufactured as with [0219] to [0220] of JP2006-293275A, and the brightness enhancement film described above and a polarizing plate protective film (TD40UL (manufactured by Fujifilm Corporation) were respectively bonded onto both surfaces of the polarizer, and thus, an optical sheet member was manufactured. A PVA paste of a commercially available adhesive agent was used as an adhesive agent at the time of performing bonding.

<Manufacturing of Liquid Crystal Display Device>

A liquid crystal display device was manufactured by disassembling a commercially available liquid crystal display device (manufactured by Panasonic Corporation, Product Name: TH-L42D2), by changing a backlight side polarizing plate to the optical sheet member prepared as described above, and by changing a backlight unit to a quantum dot (RGB narrowband) backlight unit described below, and thus, a liquid crystal display device of a quantum dot was obtained.

The used quantum dot backlight unit comprises a blue light emitting diode (B-LED manufactured by NICHIA CORPORATION, a main wavelength of 465 nm, and a half-width of 20 nm) as a light source. In addition, a quantum dot member emitting fluorescent light of green light having a center wavelength of 535 nm and a half-width of 40 nm, red light having a center wavelength of 630 nm and a half-width of 40 nm when blue light of the blue light emitting diode was incident thereon is comprised in the front of the light source. In addition, a reflection member performing conversion of a polarization state of light which is emitted from the light source and is reflected on the brightness enhancement film described above or the optical sheet member described above and reflection of the light is comprised in the rear of the light source.

A commercially available liquid crystal display device (manufactured by Panasonic Corporation, Product Name: TH-L42D2) was disassembled, and a backlight side polarizing plate was changed to the optical sheet member prepared as described above, and thus, a liquid crystal display device of a white LED was obtained.

The evaluation results of each of the examples and the comparative examples shown in Table 1 are shown in Table 2 described below.

(1) Front Brightness

Front brightness of the liquid crystal display device at the time of performing white display was measured by the same method as that disclosed in [0180] of JP2009-93166A using a measurement machine (EZ-Contrast 160D, manufactured by ELDIM Corporation). The results were collectively evaluated on the basis of the following criteria. Furthermore, in order to match the light sources to be evaluated, Examples 1, 9, 11, and 12, and Comparative Examples 1 and 2 were based on Comparative Example 4 in which the light source was a quantum dot backlight, and Examples 2 to 7, 10, 11, and 14, and Comparative Examples 3 and 6 were based on Comparative Example 5 in which the light source was a white LED backlight.

6: Higher than the front brightness of the liquid crystal display device of Comparative Example 4 or 5 by greater than or equal to 33%.

5: Higher than the front brightness of the liquid crystal display device of Comparative Example 4 or 5 by greater than or equal to 30%.

4: Higher than the front brightness of the liquid crystal display device of Comparative Example 4 or 5 by greater than or equal to 20% and less than 30%.

3: Higher than the front brightness of the liquid crystal display device of Comparative Example 4 or 5 by greater than or equal to 10% and less than 20%.

2: Less than or equal to the front brightness of the liquid crystal display device of Comparative Example 4 or 5.

(2) Oblique Change in Shade

An oblique change in the shade $\Delta u'v'$ of the liquid crystal display device was evaluated by the following method. A shade color difference $\Delta u'v'$ obtained by a difference between the values of shade coordinates u' and v' in a front surface (a polar angle of 0 degrees) and a direction at a polar angle of 60 degrees was measured in a direction of an azimuth angle of 0 degrees to 360 degrees, and the average value thereof was set to an evaluation index of the oblique change in the shade $\Delta u'v'$. The shade coordinates u'v' were measured by using a measurement machine (EZ-Contrast 160D, manufactured by ELDIM Corporation). The results were collectively evaluated on the basis of the following criteria.

7: Less than the oblique change in the shade of the liquid crystal display device of Comparative Example 1 by greater than or equal to 40%.

6: Less than the oblique change in the shade of the liquid crystal display device of Comparative Example 1 by greater than or equal to 35% and less than 40%.

5: Less than the oblique change in the shade of the liquid crystal display device of Comparative Example 1 by greater than or equal to 30% and less than 35%.

4: Less than the oblique change in the shade of the liquid crystal display device of Comparative Example 1 by greater than or equal to 20% and less than 30%.

3: Less than the oblique change in the shade of the liquid crystal display device of Comparative Example 1 by greater than or equal to 10% and less than 20%.

2: Less than or equal to the oblique change in the shade of the liquid crystal display device of Comparative Example 1.

(3) Color Reproduction Range

A color reproduction range of the liquid crystal display device was measured by Bm5 manufactured by TOPCON CORPORATION as disclosed in [0066] of JP2012-3073A. The results were collectively evaluated by the following criteria.

4: Higher than the NTSC ratio of the liquid crystal display device of Comparative Example 5 by greater than or equal to 20%.

3: Higher than the NTSC ratio of the liquid crystal display device of Comparative Example 5 by greater than or equal to 5% and less than 20%.

2: Higher than or equal to the NTSC ratio of the liquid crystal display device of Comparative Example 5 by less than +5%. Enhancement in the color reproduction range is able to be confirmed.

1: Less than or equal to the NTSC ratio of the liquid crystal display device of Comparative Example 5. The color reproduction range deteriorates.

TABLE 2

| | Film Lamination Reflection Range Having Reflectivity of Greater than or equal to 40% (nm) | Backlight | Transmittance 430 to 460 (nm) | 470 to 500 (nm) | 520 to 550 (nm) | Brightness | View Angle Shade | Color Reproduction Range |
|---|---|---|---|---|---|---|---|---|
| Example 1 | 180 | Quantum Dot | Less than or equal to 60% | 74% | Less than or equal to 60% | 5 | 5 | 4 |
| Comparative Example 1 | 180 | Quantum Dot | Less than or equal to 60% | 72% | Less than or equal to 60% | 5 | 2 | 3 |
| Comparative | 180 | Quantum Dot | Less than or | 75% | Less than or | 5 | 2 | 4 |

TABLE 2-continued

| | Film Lamination Reflection Range Having Reflectivity of Greater than or equal to 40% (nm) | Backlight | Transmittance 430 to 460 (nm) | 470 to 500 (nm) | 520 to 550 (nm) | Brightness | View Angle Shade | Color Reproduction Range |
|---|---|---|---|---|---|---|---|---|
| Example 2 | | | equal to 60% | | equal to 60% | | | |
| Example 2 | 180 | White LED | Less than or equal to 60% | 74% | Less than or equal to 60% | 5 | 5 | 4 |
| Example 3 | 240 | White LED | Less than or equal to 60% | 75% | Less than or equal to 60% | 6 | 6 | 5 |
| Example 4 | 240 | White LED | Less than or equal to 60% | 50% | Less than or equal to 60% | 6 | 6 | 5 |
| Example 5 | 240 | White LED | Less than or equal to 60% | 52% | Less than or equal to 60% | 6 | 5 | 4 |
| Example 6 | 240 | White LED | Less than or equal to 60% | 52% | Less than or equal to 60% | 6 | 6 | 5 |
| Example 7 | 240 | White LED | Less than or equal to 60% | 50% | Less than or equal to 60% | 6 | 6 | 5 |
| Example 8 | 180 | Quantum Dot | Less than or equal to 60% | 74% | Less than or equal to 60% | 6 | 4 | 4 |
| Example 9 | 140 | White LED | Greater than or equal to 60% | 75% | Greater than or equal to 60% | 2 | 5 | 3 |
| Comparative Example 3 | 140 | White LED | Greater than or equal to 60% | 75% | Greater than or equal to 60% | 2 | 3 | 3 |
| Example 10 | 250 | White LED | Less than or equal to 60% | 65% | Less than or equal to 60% | 5 | 5 | 4 |
| Example 11 | 180 | Quantum Dot | Less than or equal to 60% | 76% | Less than or equal to 60% | 5 | 3 | 3 |
| Example 12 | 180 | Quantum Dot | Less than or equal to 60% | 74% | Less than or equal to 60% | 5 | 5 | 4 |
| Comparative Example 4 | | Quantum Dot | | | | 2 | 5 | 4 |
| Comparative Example 5 | | White LED | | | | 2 | 5 | 2 |
| Comparative Example 6 | 250 | White LED | Greater than or equal to 60% | 65% | Less than or equal to 60% | 5 | 2 | 3 |
| Example 13 | 250 | White LED | Greater than or equal to 60% | 65% | Less than or equal to 60% | 6 | 6 | 5 |
| Example 14 | 250 | White LED | Greater than or equal to 60% | 65% | Less than or equal to 60% | 6 | 6 | 5 |

Example 15

A coating liquid A11 containing a disk-like liquid crystal compound having compositions described below was continuously applied onto the surface of an alignment film of a laminated body of a support (S1) and an alignment film (H) prepared as with Example 1 by using a wire bar of #3.0. A transport speed (V) of the film was set to 20 m/min. In order to dry a solvent of the coating liquid and to align and mature the disk-like liquid crystal compound, the film was heated by hot air at 80° C. for 80 seconds. Subsequently, ultraviolet irradiation (100 mJ/cm$^2$) was performed at 60° C., and thus, a λ/4 plate was formed by immobilizing the alignment of the liquid crystal compound. Re (550) of the obtained λ/4 plate was 128 nm.

Coating Liquid A11 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |
| Alignment Aid 2 | 0.1 parts by mass |
| MEGAFAC F444 manufactured by DIC Corporation | 0.12 parts by mass |
| Polymerization Initiator 1 | 3 parts by mass |
| Acetone | 172 parts by mass |
| Cyclohexanone | 25 parts by mass |
| t-Butanol | 49 parts by mass |

A coating liquid B11 containing a disk-like liquid crystal compound having compositions described below was continuously applied onto the surface of the λ/4 plate prepared as described above such that the film thickness was adjusted to be 2.9 μm. Subsequently, a solvent was dried at 70° C. for 1 minute, and the solvent was vaporized, and then, heating and maturing were performed at 115° C. for 3 minutes, and thus, a homogeneous alignment state was obtained.

After that, the coated film was retained at 30° C., and was subjected to ultraviolet irradiation (200 mJ/cm$^2$) under nitrogen atmosphere by using a high pressure mercury lamp, and thus, a cholesteric liquid crystal layer 1 was formed.

Coating Liquid B11 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Polymerizable Monomer 1 | 10 parts by mass |

| | |
|---|---|
| MEGAFAC F444 manufactured by DIC Corporation | 0.20 parts by mass |
| Polymerization Initiator 1 | 3 parts by mass |
| Chiral Agent 1 | 3.2 parts by mass |
| Methyl Ethyl Ketone | 196 parts by mass |
| Cyclohexanone | 25 parts by mass |
| t-Butanol | 25 parts by mass |

A coating liquid B12 containing a rod-like liquid crystal compound having compositions described below was continuously applied onto the cholesteric liquid crystal layer 1 obtained as described above such that the film thickness was adjusted to be 6 μm. A transport speed (V) of the film was set to 20 m/min. In order to align and mature the rod-like liquid crystal compound, the film was heated by hot air at 70° C. for 120 seconds. After that, UV light having illuminance of 10 mW was emitted from the outermost surface of a film of the polymerizable liquid crystal composition described above for 30 seconds under a temperature of 25° C. Further, after that, UV light of 50 mW was emitted for 20 seconds under an environment of 25° C. and a nitrogen atmosphere, and a cholesteric liquid crystal layer 2 which is a pitch gradient layer was formed, and thus, a brightness enhancement film of Example 15 was obtained.

Coating Liquid B12 Containing Rod-Like Liquid Crystal Compound

| | |
|---|---|
| Rod-Like Liquid Crystal Compound 204 | 100 parts by mass |
| IRGACURE 819 (manufactured by BASF SE, Polymerization Initiator) | 0.7 parts by mass |
| MEGAFAC F444 manufactured by DIC Corporation | 0.10 parts by mass |
| Surfactant 11 | 0.20 parts by mass |
| Chiral Agent 2 | 5.3 parts by mass |
| Methyl Ethyl Ketone | 250 parts by mass |
| Cyclohexanone | 50 parts by mass | hot air at 80° C. for 80 seconds. Subsequently, ultraviolet irradiation (100 mJ/cm$^2$) was performed at 60° C., and thus, a λ/4 plate was formed by immobilizing the alignment of the liquid crystal compound. Re (550) of the obtained λ/4 plate was 128 nm.

Coating Liquid A12 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |
| Alignment Aid 2 | 0.1 parts by mass |
| PHTHAGENT 710FM manufactured by NEOS COMPANY LIMITED | 0.12 parts by mass |
| Polymerization Initiator 1 | 3 parts by mass |
| Acetone | 172 parts by mass |
| Cyclohexanone | 25 parts by mass |
| t-Butanol | 49 parts by mass |

A coating liquid B13 containing a disk-like liquid crystal compound having compositions described below was continuously applied onto the surface of the λ/4 plate prepared as described above such that the film thickness was adjusted to be 2.9 μm. Subsequently, a solvent was dried at 70° C. for 1 minute, and the solvent was vaporized, and then, heating and maturing were performed at 115° C. for 3 minutes, and thus, a homogeneous alignment state was obtained.

After that, the coated film was retained at 30° C., and was subjected to ultraviolet irradiation (200 mJ/cm$^2$) under nitrogen atmosphere by using a high pressure mercury lamp, and thus, a cholesteric liquid crystal layer 1 was formed.

Coating Liquid B13 Containing Disk-Like Liquid Crystal Compound

| | |
|---|---|
| Disk-Like Liquid Crystal Compound (Compound 101) | 80 parts by mass |

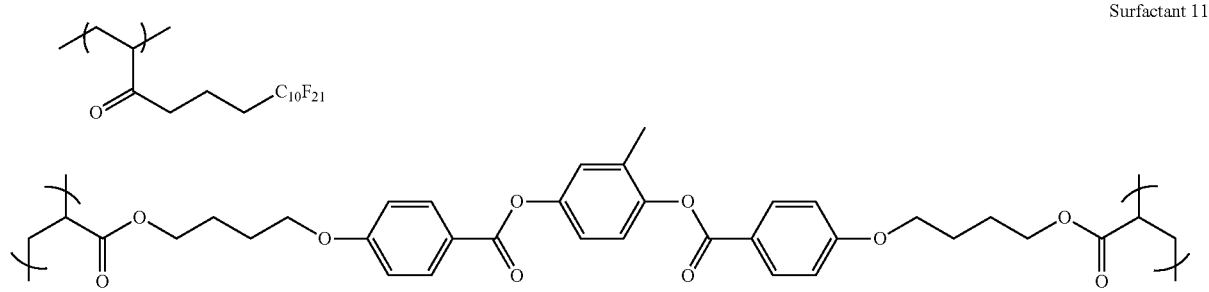

Surfactant 11

(Material Polymerized at Composition of Left Structure Containing F of 75 Mass % and Right Structure of 25 Mass %)

Example 16

A coating liquid A12 containing a disk-like liquid crystal compound having compositions described below was continuously applied onto the surface of an alignment film of a laminated body of a support (S1) and an alignment film (H) prepared as with Example 1 by using a wire bar of #3.0. A transport speed (V) of the film was set to 20 m/min. In order to dry a solvent of the coating liquid and to align and mature the disk-like liquid crystal compound, the film was heated by -continued

| | |
|---|---|
| Disk-Like Liquid Crystal Compound (Compound 102) | 20 parts by mass |
| Polymerizable Monomer 1 | 10 parts by mass |
| PHTHAGENT 710FM manufactured by NEOS COMPANY LIMITED | 0.20 parts by mass |
| Polymerization Initiator 1 | 3 parts by mass |
| Chiral Agent 1 | 3.2 parts by mass |
| Methyl Ethyl Ketone | 196 parts by mass |
| Cyclohexanone | 25 parts by mass |
| t-Butanol | 25 parts by mass |

A coating liquid B14 containing a rod-like liquid crystal compound having compositions described below was continuously applied onto the surface of the cholesteric liquid crystal layer 1 such that the film thickness was adjusted to be 6 μm. A transport speed (V) of the film was set to 20 m/min. In order to align and mature the rod-like liquid crystal compound, the film was heated by hot air at 70° C. for 120 seconds. After that, UV light having illuminance of 10 mW was emitted from the outermost surface of a film of the polymerizable liquid crystal composition described above for 30 seconds under a temperature of 25° C. Further, after that, UV light of 50 mW was emitted for 20 seconds under an environment of 25° C. and a nitrogen atmosphere, and a cholesteric liquid crystal layer 2 which is a pitch gradient layer was formed, and thus, a brightness enhancement film of Example 16 was obtained.

Coating Liquid B14 Containing Rod-Like Liquid Crystal Compound

| | |
|---|---|
| Rod-Like Liquid Crystal Compound 204 | 100 parts by mass |
| IRGACURE 819 (manufactured by BASF SE, Polymerization Initiator) | 0.7 parts by mass |
| PHTHAGENT 710FM manufactured by NEOS COMPANY LIMITED | 0.05 parts by mass |
| Surfactant 11 | 0.20 parts by mass |
| Chiral Agent 2 | 5.3 parts by mass |
| Methyl Ethyl Ketone | 250 parts by mass |
| Cyclohexanone | 50 parts by mass |

Example 17

A coating liquid A13 containing a disk-like liquid crystal compound having compositions described below was continuously applied onto the surface of an alignment film of a laminated body of a support (S1) and an alignment film (H) prepared as with Example 1 by using a wire bar of #3.0. A transport speed (V) of the film was set to 20 m/min. In order to dry a solvent of the coating liquid and to align and mature the disk-like liquid crystal compound, the film was heated by hot air at 80° C. for 80 seconds. Subsequently, ultraviolet irradiation (100 mJ/cm$^2$) was performed at 60° C., and thus, a λ/4 plate was formed by immobilizing the alignment of the liquid crystal compound. Re (550) of the obtained λ/4 plate was 128 nm.

Coating Liquid A13 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |
| Alignment Aid 2 | 0.1 parts by mass |
| MEGAFAC F444 manufactured by DIC Corporation | 0.12 parts by mass |
| Polymerization Initiator 1 | 3 parts by mass |
| Acetone | 172 parts by mass |
| Cyclohexanone | 25 parts by mass |
| t-Butanol | 49 parts by mass |

A coating liquid B15 containing a disk-like liquid crystal compound having compositions described below was continuously applied onto the surface of the λ/4 plate prepared as described above such that the film thickness was adjusted to be 2.9 μm. Subsequently, a solvent was dried at 70° C. for 1 minute, and the solvent was vaporized, and then, heating and maturing were performed at 115° C. for 3 minutes, and thus, a homogeneous alignment state was obtained.

After that, the coated film was retained at 30° C., and was subjected to ultraviolet irradiation (200 mJ/cm$^2$) under nitrogen atmosphere by using a high pressure mercury lamp, and thus, a cholesteric liquid crystal layer 1 was formed.

Coating Liquid B15 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Polymerizable Monomer 1 | 10 parts by mass |
| MEGAFAC F444 manufactured by DIC Corporation | 0.20 parts by mass |
| Polymerization Initiator 1 | 3 parts by mass |
| Chiral Agent 1 | 3.2 parts by mass |
| Methyl Ethyl Ketone | 196 parts by mass |
| Cyclohexanone | 25 parts by mass |
| t-Butanol | 25 parts by mass |

A coating liquid B16 containing a rod-like liquid crystal compound having compositions described below was continuously applied onto the surface of the cholesteric liquid crystal layer 1 such that the film thickness was adjusted to be 6 μm. A transport speed (V) of the film was set to 20 m/min. In order to align and mature the rod-like liquid crystal compound, the film was heated by hot air at 70° C. for 120 seconds. After that, UV light having illuminance of 10 mW was emitted from the outermost surface of a film of the polymerizable liquid crystal composition described above for 30 seconds under a temperature of 25° C. Further, after that, UV light of 50 mW was emitted for 20 seconds under an environment of 25° C. and a nitrogen atmosphere, and a cholesteric liquid crystal layer 2 which is a pitch gradient layer was formed, and thus, a brightness enhancement film of Example 17 was obtained.

Coating Liquid B16 Containing Rod-Like Liquid Crystal Compound

| | |
|---|---|
| Rod-Like Liquid Crystal Compound 204 | 100 parts by mass |
| IRGACURE 819 (manufactured by BASF SE, Polymerization Initiator) | 0.7 parts by mass |
| MEGAFAC F444 manufactured by DIC Corporation | 0.10 parts by mass |
| Surfactant 12 (hereinafter, a synthesis method will be described) | 0.20 parts by mass |
| Chiral Agent 2 | 5.3 parts by mass |
| Methyl Ethyl Ketone | 250 parts by mass |
| Cyclohexanone | 50 parts by mass |

(Synthesis of Surfactant 12)

25.0 g of toluene was put into a three-neck flask of mL in which a stirrer, a thermometer, a reflux cooling pipe, and a nitrogen gas introduction pipe were comprised, and was heated to 120° C. Next, a mixed solution formed of 4.2 g (6.8 millimols) of 2-(perfluorohexyl) ethyl acrylate, 1.3 g (2.1 millimols) of a trifunctional disk-like liquid crystal compound denoted by Expression (A) described below, 25.0 g of toluene, and 6.0 g of "V-601" (manufactured by Wako Pure Chemical Industries, Ltd.) was dropped at constant velocity such that the dropping was completed in 30 minutes. After the dropping was completed, the mixtures was further stirred for 2 hours, and then, a solvent was distilled under reduced pressure, was dried at 130° C. under reduced pressure, and thus, 5.0 g of a surfactant 12 was obtained. A weight average molecular weight (Mw) of the polymer was 5020 (calculated in terms of polystyrene by using gel permeation chromatography (GPC)), and the used column was TSKgel SuperHZM-H, TSKgel SuperHZ4000, and TSKgel SuperHZ200 (manufactured by TOSOH CORPORATION).

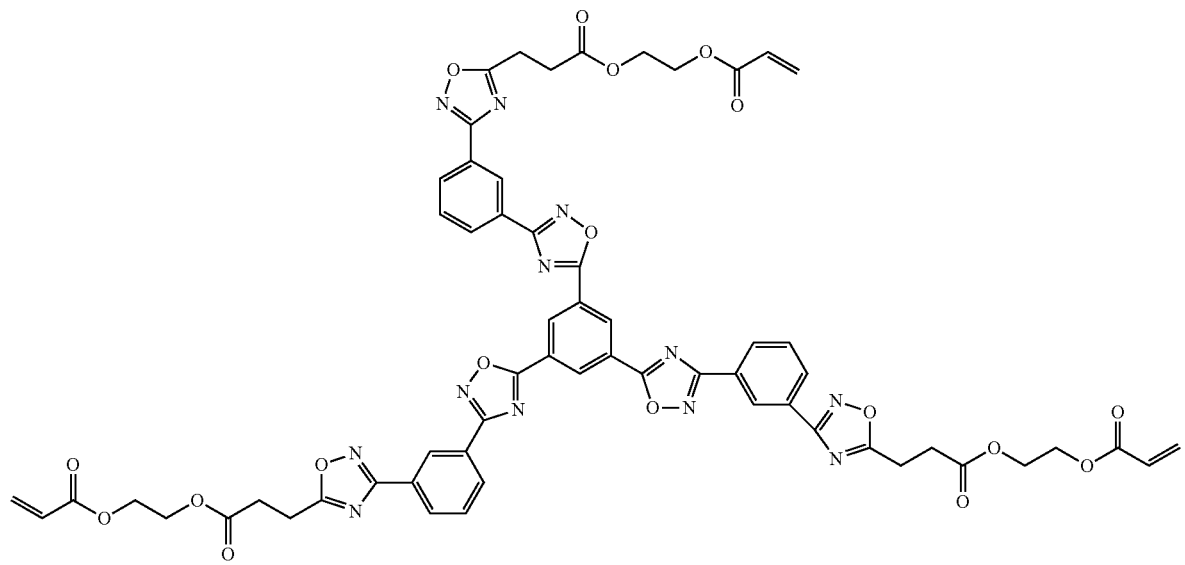

(A)

Example 18

A coating liquid A14 containing a disk-like liquid crystal compound having compositions described below was continuously applied onto the surface of an alignment film of a laminated body of a support (S1) and an alignment film (H) prepared as with Example 1 by using a wire bar of #3.0. A transport speed (V) of the film was set to 20 m/min. In order to dry a solvent of the coating liquid and to align and mature the disk-like liquid crystal compound, the film was heated by hot air at 80° C. for 80 seconds. Subsequently, ultraviolet irradiation (100 mJ/cm$^2$) was performed at 60° C., and thus, a λ/4 plate was formed by immobilizing the alignment of the liquid crystal compound. Re (550) of the obtained λ/4 plate was 128 nm.

Coating Liquid A14 Containing Disk-Like Liquid Crystal Compound

| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |
| Alignment Aid 2 | 0.1 parts by mass |
| MEGAFAC F444 manufactured by DIC Corporation | 0.12 parts by mass |
| Polymerization Initiator 1 | 3 parts by mass |
| Acetone | 172 parts by mass |
| Cyclohexanone | 25 parts by mass |
| t-Butanol | 49 parts by mass |

A coating liquid B17 containing a disk-like liquid crystal compound having compositions described below was continuously applied onto the surface of the λ/4 plate prepared as described above such that the film thickness was adjusted to be 2.9 μm. Subsequently, a solvent was dried at 70° C. for 1 minute, and the solvent was vaporized, and then, heating and maturing were performed at 115° C. for 3 minutes, and thus, a homogeneous alignment state was obtained.

After that, the coated film was retained at 30° C., and was subjected to ultraviolet irradiation (200 mJ/cm$^2$) under nitrogen atmosphere by using a high pressure mercury lamp, and thus, a cholesteric liquid crystal layer 1 was formed.

Coating Liquid B17 Containing Disk-Like Liquid Crystal Compound

| Disk-Like Liquid Crystal Compound (Compound 101) | 80 parts by mass |
| Disk-Like Liquid Crystal Compound (Compound 102) | 20 parts by mass |
| Polymerizable Monomer 1 | 10 parts by mass |
| MEGAFAC F444 manufactured by DIC Corporation | 0.20 parts by mass |
| Polymerization Initiator 1 | 3 parts by mass |
| Chiral Agent 1 | 3.2 parts by mass |
| Methyl Ethyl Ketone | 196 parts by mass |
| Cyclohexanone | 25 parts by mass |
| t-Butanol | 25 parts by mass |

A coating liquid B18 containing a rod-like liquid crystal compound having compositions described below was continuously applied onto the surface of the cholesteric liquid crystal layer 1 such that the film thickness was adjusted to be 6 μm. A transport speed (V) of the film was set to 20 m/min. In order to align and mature the rod-like liquid crystal compound, the film was heated by hot air at 70° C. for 120 seconds. After that, UV light having illuminance of 10 mW was emitted from the outermost surface of a film of the polymerizable liquid crystal composition described above for 30 seconds under a temperature of 25° C. Further, after that, UV light of 50 mW was emitted for 20 seconds under an environment of 25° C. and a nitrogen atmosphere, and a cholesteric liquid crystal layer 2 which is a pitch gradient layer was formed, and thus, a brightness enhancement film of Example 18 was obtained.

Coating Liquid B18 Containing Rod-Like Liquid Crystal Compound

| Rod-Like Liquid Crystal Compound 204 | 100 parts by mass |
| IRGACURE 819 (manufactured by BASF SE, Polymerization Initiator) | 0.7 parts by mass |

| | |
|---|---|
| Surfactant 11 | 0.20 parts by mass |
| Chiral Agent 2 | 5.3 parts by mass |
| Methyl Ethyl Ketone | 250 parts by mass |
| Cyclohexanone | 50 parts by mass |

Coating Liquid for Forming Photo Alignment Film

| | |
|---|---|
| Photo Alignment Material 1 | 1 part by mass |
| Water | 16 parts by mass |
| Butoxy Ethanol | 42 parts by mass |
| Propylene Glycol Monomethyl Ether | 42 parts by mass |

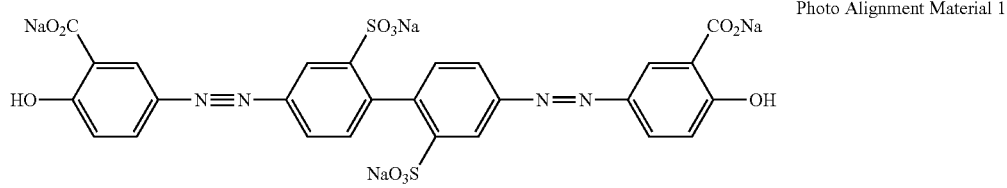

Photo Alignment Material 1

Example 19

A brightness enhancement film of Example 19 was prepared in the same procedure as that in Example 18 except that each MEGAFAC F444 manufactured by DIC Corporation which was contained in the coating liquid A14 and the coating liquid B17 of Example 18 was changed to Capstone FS30 manufactured by E. I. du Pont de Nemours and Company.

Example 20

A λ/4 plate (A1) was formed on the surface of an alignment film of a laminated body of a support (S1) and an alignment film (H) prepared as with Example 1 by the same method as that in Example 1. The coating liquid B1 described above was continuously applied onto the surface of the λ/4 plate (A1) such that the film thickness on the surface of the alignment film prepared as described above was adjusted to be 2.9 μm. Subsequently, a solvent was dried at 70° C. for 2 minutes, the solvent was vaporized, and then, heating and maturing were performed at 115° C. for 3 minutes, and thus, a homogeneous alignment state was obtained.

After that, the coated film was retained at 45° C., and was subjected to ultraviolet irradiation (300 mJ/cm$^2$) under nitrogen atmosphere by using a high pressure mercury lamp, and thus, a cholesteric liquid crystal layer 1 was formed.

A corona treatment of 60 W·min/m$^2$ was performed with respect to the cholesteric liquid crystal layer 1. Compositions described below were applied onto the surface which had been subjected to the corona treatment by using a wire bar of #2. The compositions were dried by hot air at 60° C. for 60 seconds, and thus, a photo alignment film was prepared. The photo alignment film was vertically irradiated with an ultraviolet ray under air by using an ultra high pressure mercury lamp (UL750, manufactured by HOYA CANDEO OPTRONICS CORPORATION) of 750 mW/cm$^2$. At this time, a wire grid polarizer (ProFlux PPL02, manufactured by MOXTEK, Inc.) was set to be 45° with respect to the surface of the photo alignment film, and then, was exposed. At this time, the illuminance of the ultraviolet ray to be used was 5 mW/cm$^2$ in UV-A region (integrating accumulation at a wavelength of 380 nm to 320 nm), and the irradiation dose thereof was 50 mJ/cm$^2$ in UV-A region.

A cholesteric liquid crystal layer 2 was formed on the surface of the photo alignment film described above after being exposed by the same method as that in Example 15, and thus, a brightness enhancement film of Example 20 was obtained.

Example 21

Compositions described below were applied onto the surface of the support (S1) which had been subjected to a saponification treatment by using a wire bar of #2 by the same method as that in Example 1. The compositions were dried by hot air at 60° C. for 60 seconds, and thus, a photo alignment film was prepared. The photo alignment film was vertically irradiated with an ultraviolet ray under air by using an ultra high pressure mercury lamp (UL750, manufactured by HOYA CANDEO OPTRONICS CORPORATION) of 750 mW/cm$^2$. At this time, a wire grid polarizer (ProFlux PPL02, manufactured by MOXTEK, Inc.) was set to be 45° with respect to the surface of the photo alignment film, and then, was exposed. At this time, the illuminance of the ultraviolet ray to be used was 5 mW/cm$^2$ in UV-A region (integrating accumulation at a wavelength of 380 nm to 320 nm), and the irradiation dose thereof was 50 mJ/cm$^2$ in UV-A region.

Coating Liquid for Forming Photo Alignment Film

| | |
|---|---|
| Photo Alignment Material 1 | 1 part by mass |
| Water | 16 parts by mass |
| Butoxy Ethanol | 42 parts by mass |
| Propylene Glycol Monomethyl Ether | 42 parts by mass |

A λ/4 plate, a cholesteric liquid crystal layer 1, and a cholesteric liquid crystal layer 2 were sequentially formed on the photo alignment layer formed as described above by the same method as that in Example 15, and thus, a brightness enhancement film of Example 21 was obtained.

Example 22

A coating liquid A15 containing a disk-like liquid crystal compound having compositions described below was continuously applied onto the surface of an alignment film of a laminated body of a support (S1) and an alignment film (H) prepared as with Example 1 by using a wire bar of #3.0. A transport speed (V) of the film was set to 20 m/min. In order to dry a solvent of the coating liquid and to align and mature the disk-like liquid crystal compound, the film was heated by hot air at 80° C. for 80 seconds. Subsequently, ultraviolet irradiation (100 mJ/cm$^2$) was performed at 60° C., and thus, a λ/4 plate was formed by immobilizing the alignment of the liquid crystal compound. Re (550) of the obtained λ/4 plate was 128 nm.

Coating Liquid A15 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |
| Alignment Aid 2 | 0.1 parts by mass |
| Polymerization Initiator 1 | 3 parts by mass |
| Acetone | 172 parts by mass |
| Cyclohexanone | 25 parts by mass |
| t-Butanol | 49 parts by mass |

A coating liquid B19 containing a disk-like liquid crystal compound having compositions described below was continuously applied onto the surface of the λ/4 plate prepared as described above such that the film thickness was adjusted to be 2.9 μm. Subsequently, a solvent was dried at 70° C. for 1 minute, and the solvent was vaporized, and then, heating and maturing were performed at 115° C. for 3 minutes, and thus, a homogeneous alignment state was obtained.

After that, the coated film was retained at 30° C., and was subjected to ultraviolet irradiation (200 mJ/cm$^2$) under nitrogen atmosphere by using a high pressure mercury lamp, and thus, a cholesteric liquid crystal layer 1 was formed.

Coating Liquid B19 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Polymerizable Monomer 1 | 10 parts by mass |
| Polymerization Initiator 1 | 3 parts by mass |
| Chiral Agent 1 | 3.2 parts by mass |
| Methyl Ethyl Ketone | 196 parts by mass |
| Cyclohexanone | 25 parts by mass |
| t-Butanol | 25 parts by mass |

A coating liquid B20 containing a rod-like liquid crystal compound having compositions described below was continuously applied onto the surface of cholesteric liquid crystal layer 1 such that the film thickness was adjusted to be 6 μm. A transport speed (V) of the film was set to 20 m/min. In order to align and mature the rod-like liquid crystal compound, the film was heated by hot air at 70° C. for 120 seconds. After that, UV light having illuminance of 10 mW was emitted from the outermost surface of a film of the polymerizable liquid crystal composition described above for 30 seconds under a temperature of 25° C. Further, after that, UV light of 50 mW was emitted for 20 seconds under an environment of 25° C. and a nitrogen atmosphere, and a cholesteric liquid crystal layer 2 which is a pitch gradient layer was formed, and thus, a brightness enhancement film of Example 22 was obtained.

Coating Liquid B20 Containing Rod-Like Liquid Crystal Compound

| | |
|---|---|
| Rod-Like Liquid Crystal Compound 204 | 100 parts by mass |
| IRGACURE 819 (manufactured by BASF SE, Polymerization Initiator) | 0.7 parts by mass |
| Surfactant 11 | 0.2 parts by mass |
| Chiral Agent 2 | 5.3 parts by mass |
| Methyl Ethyl Ketone | 250 parts by mass |
| Cyclohexanone | 50 parts by mass |

Example 23

A coating liquid B21 containing a disk-like liquid crystal compound having compositions described below was continuously applied onto the surface of an alignment film of a laminated body of a support (S1) and an alignment film (H) prepared as with Example 1 by using a wire bar of #3.0. A transport speed (V) of the film was set to 20 m/min. In order to dry a solvent of the coating liquid and to align and mature the disk-like liquid crystal compound, the film was heated by hot air at 55° C. for 80 seconds. Subsequently, ultraviolet irradiation (100 mJ/cm$^2$) was performed at 60° C., and thus, a λ/4 plate was formed by immobilizing the alignment of the liquid crystal compound. Re (550) of the obtained λ/4 plate was 128 nm.

Coating Liquid B21 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |
| Alignment Aid 2 | 0.1 parts by mass |
| MEGAFAC F444 manufactured by DIC Corporation | 0.12 parts by mass |
| Polymerizable Monomer 1 | 10 parts by mass |
| Polymerization Initiator 1 | 3 parts by mass |
| Acetone | 172 parts by mass |
| Cyclohexanone | 25 parts by mass |
| t-Butanol | 49 parts by mass |

A coating liquid B22 containing a disk-like liquid crystal compound having compositions described below was continuously applied onto the surface of the λ/4 plate prepared as described above such that the film thickness was adjusted to be 2.9 μm. Subsequently, a solvent was dried at 70° C. for 1 minute, and the solvent was vaporized, and then, heating and maturing were performed at 90° C. for 3 minutes, and thus, a homogeneous alignment state was obtained.

After that, the coated film was retained at 30° C., and was subjected to ultraviolet irradiation (200 mJ/cm$^2$) under nitrogen atmosphere by using a high pressure mercury lamp, and thus, a cholesteric liquid crystal layer 1 was formed.

Coating Liquid B22 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Polymerizable Monomer 1 | 10 parts by mass |
| MEGAFAC F444 manufactured by DIC Corporation | 0.20 parts by mass |
| Polymerization Initiator 1 | 3 parts by mass |
| Chiral Agent 1 | 3.5 parts by mass |
| Methyl Ethyl Ketone | 176 parts by mass |
| Cyclohexanone | 45 parts by mass |
| t-Butanol | 25 parts by mass |

A coating liquid B23 containing a rod-like liquid crystal compound having compositions described below was continuously applied onto the surface of the cholesteric liquid crystal layer 1 such that the film thickness was adjusted to be 6 μm. A transport speed (V) of the film was set to 20 m/min. In order to align and mature the rod-like liquid crystal compound, the film was heated by hot air at 70° C. for 120 seconds. After that, UV light having illuminance of 10 mW was emitted from the outermost surface of a film of the polymerizable liquid crystal composition described above for 30 seconds under a temperature of 25° C. Further, after that, UV light of 50 mW was emitted for 20 seconds under an environment of 25° C. and a nitrogen atmosphere, and a cholesteric liquid crystal layer 2 which is a pitch gradient layer was formed, and thus, a brightness enhancement film of Example 23 was obtained.

Coating Liquid B23 Containing Rod-Like Liquid Crystal Compound

| | |
|---|---|
| Rod-Like Liquid Crystal Compound 204 | 100 parts by mass |
| IRGACURE 819 (manufactured by BASF SE, Polymerization Initiator) | 0.7 parts by mass |
| Surfactant 11 | 0.2 parts by mass |
| Chiral Agent 2 | 5.3 parts by mass |

-continued

| | |
|---|---|
| Methyl Ethyl Ketone | 250 parts by mass |
| Cyclohexanone | 50 parts by mass |

Example 24

An alignment film, a λ/4 plate, and a cholesteric liquid crystal layer 1 were sequentially formed on a support by the same method as that in Example 23. A coating liquid B24 containing a rod-like liquid crystal compound having compositions described below was continuously applied onto the surface of the cholesteric liquid crystal layer 1 such that the film thickness was adjusted to be 4 μm. A transport speed (V) of the film was set to 20 m/min. In order to align and mature the rod-like liquid crystal compound, the film was heated by hot air at 70° C. for 120 seconds. After that, UV light having illuminance of 10 mW was emitted from the outermost surface of a film of the polymerizable liquid crystal composition described above for 30 seconds under a temperature of 25° C. Further, after that, UV light of 50 mW was emitted for 20 seconds under an environment of 25° C. and a nitrogen atmosphere, and a cholesteric liquid crystal layer 12 which is a pitch gradient layer was formed, and thus, a brightness enhancement film of Example 24 was obtained.

Coating Liquid B24 Containing Rod-Like Liquid Crystal Compound

| | |
|---|---|
| Rod-Like Liquid Crystal Compound 204 | 100 parts by mass |
| IRGACURE 819 (manufactured by BASF SE, Polymerization Initiator) | 0.7 parts by mass |
| Surfactant 11 | 0.2 parts by mass |
| Chiral Agent 2 | 5.3 parts by mass |
| Dye (SR1) | 0.01 parts by mass |
| Methyl Ethyl Ketone | 250 parts by mass |
| Cyclohexanone | 50 parts by mass |

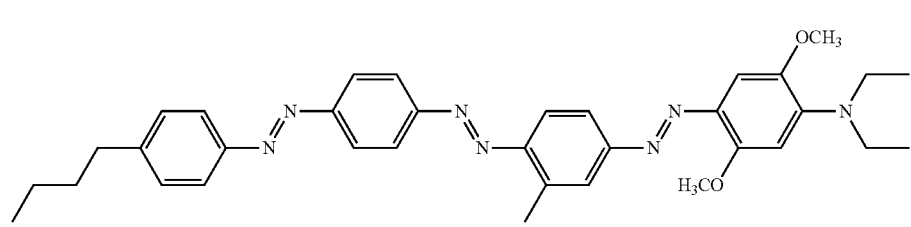

Dye (SR1)

Example 25

A brightness enhancement film of Example 25 was prepared in the same procedure as that in Example 18 except that each MEGAFAC F444 manufactured by DIC Corporation which was contained in the coating liquid A14 and the coating liquid B17 was changed to Capstone FS34 manufactured by E. I. du Pont de Nemours and Company.

Optical member sheets and liquid crystal display devices were respectively prepared by using the brightness enhancement films of Examples 15 to 25 by the same methods as those in Examples 1 to 14, and evaluation was performed by the same methods as those in Examples 1 to 14. The results are shown in Table 3.

TABLE 3

| | Film Lamination Reflection Range Having Reflectivity of Greater than or equal to 40% (nm) | Backlight | Transmittance 430 to 460 (nm) | 470 to 500 (nm) | 520 to 550 (nm) | Brightness | View Angle Shade | Color Reproduction Range |
|---|---|---|---|---|---|---|---|---|
| Example 15 | 280 | White LED | Less than or equal to 60% | 52 | Less than or equal to 60% | 6 | 5 | 5 |
| Example 16 | 280 | White LED | Less than or equal to 60% | 52 | Less than or equal to 60% | 6 | 5 | 5 |
| Example 17 | 280 | White LED | Less than or equal to 60% | 52 | Less than or equal to 60% | 6 | 5 | 5 |
| Example 18 | 280 | White LED | Less than or equal to 60% | 52 | Less than or equal to 60% | 6 | 5 | 5 |

TABLE 3-continued

| | Film Lamination Reflection Range Having Reflectivity of Greater than or equal to 40% (nm) | Backlight | Transmittance 430 to 460 (nm) | 470 to 500 (nm) | 520 to 550 (nm) | Brightness | View Angle Shade | Color Reproduction Range |
|---|---|---|---|---|---|---|---|---|
| Example 19 | 280 | White LED | Less than or equal to 60% | 52 | Less than or equal to 60% | 6 | 5 | 5 |
| Example 20 | 280 | White LED | Less than or equal to 60% | 52 | Less than or equal to 60% | 6 | 5 | 5 |
| Example 21 | 280 | White LED | Less than or equal to 60% | 52 | Less than or equal to 60% | 6 | 4 | 4 |
| Example 22 | 280 | White LED | Less than or equal to 60% | 52 | Less than or equal to 60% | 6 | 5 | 5 |
| Example 23 | 280 | White LED | Less than or equal to 60% | 52 | Less than or equal to 60% | 5 | 6 | 6 |
| Example 24 | 280 | White LED | Less than or equal to 60% | 52 | Less than or equal to 60% | 5 | 6 | 6 |
| Example 25 | 280 | White LED | Less than or equal to 60% | 52 | Less than or equal to 60% | 6 | 5 | 5 |

As described above, it is found that the liquid crystal display devices of the examples have excellent front brightness and a reduced oblique change in the shade.

Examples 101 to 121

Examples 101 to 110

<Preparation of λ/4 Plate>

First, a cellulose ester support T1 for a λ/4 plate was prepared.

(Preparation of Cellulose Ester Solution A-1)

Compositions described below were put into a mixing tank and were stirred while being heated, each component was dissolved, and thus, a cellulose ester solution A-1 was prepared.

Composition of Cellulose Ester Solution A-1

| | |
|---|---|
| Cellulose Acetate (Acetylation Degree 2.86) | 100 parts by mass |
| Methylene Chloride | 320 parts by mass |
| Methanol | 83 parts by mass |
| 1-Butanol | 3 parts by mass |
| Triphenyl Phosphate | 7.6 parts by mass |
| Biphenyl Diphenyl Phosphate | 3.8 parts by mass |

(Preparation of Matting Agent Dispersion B-1)

Compositions described below were put into a dispersion machine and were stirred, each component was dissolved, and thus, a matting agent dispersion B-1 was prepared.

Composition of Matting Agent Dispersion B-1

| | |
|---|---|
| Silica Particles Dispersion (Average Particle Diameter of 16 nm) "AEROSIL R972", manufactured by NIPPON AEROSIL CO., LTD. | 10.0 parts by mass |
| Methylene Chloride | 72.8 parts by mass |
| Methanol | 3.9 parts by mass |
| Butanol | 0.5 parts by mass |
| Cellulose Ester Solution A-1 | 10.3 parts by mass |

(Preparation of Ultraviolet Absorbent Solution C-1)

Compositions described below were put into another mixing tank and were stirred while being heated, each component was dissolved, and thus, an ultraviolet absorbent solution C-1 was prepared.

Composition of Ultraviolet Absorbent Solution C-1

| | |
|---|---|
| Ultraviolet Absorbent (UV-1) | 10.0 parts by mass |
| Ultraviolet Absorbent (UV-2) | 10.0 parts by mass |
| Methylene Chloride | 55.7 parts by mass |
| Methanol | 10 parts by mass |
| Butanol | 1.3 parts by mass |
| Cellulose Ester Solution A-1 | 12.9 parts by mass |

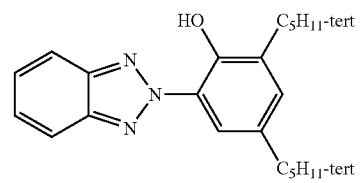

(UV-1)

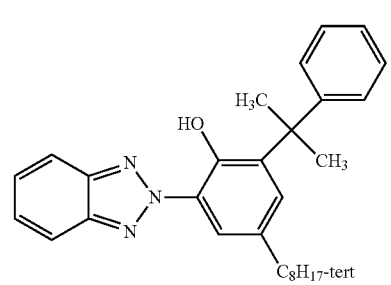

(UV-2)

(Preparation of Cellulose Ester Support T1)

Figure 3:
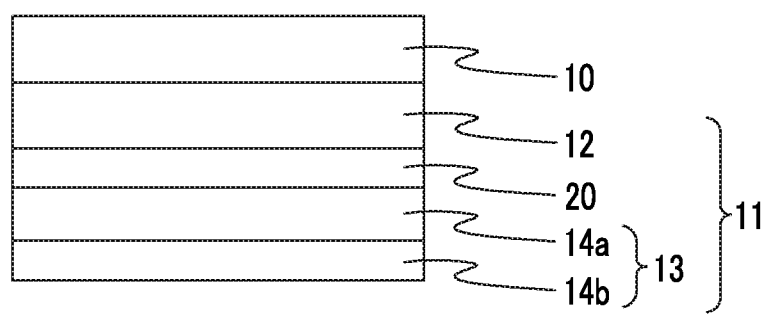
FIG. 3 is a diagram illustrating one embodiment of a layer configuration of the brightness enhancement film of the present invention.
Figure 4:
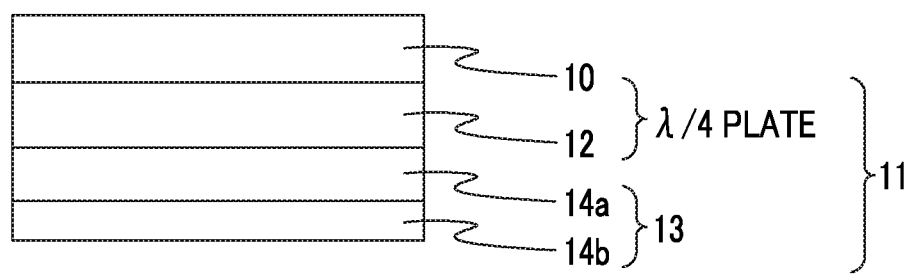
FIG. 4 is a diagram illustrating one embodiment of a layer configuration of the brightness enhancement film of the present invention.
Figure 5:
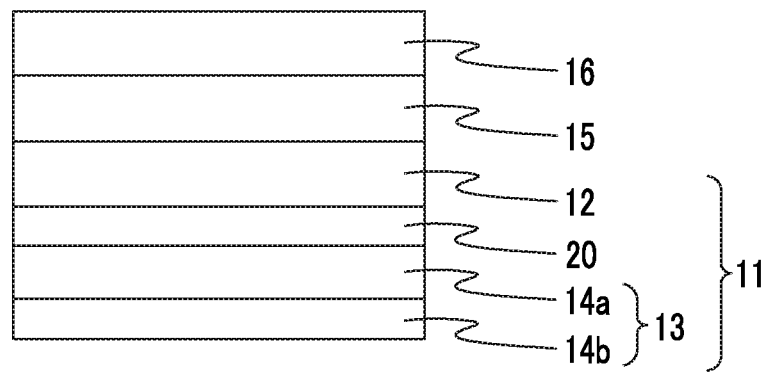
FIG. 5 is a diagram illustrating one embodiment of a layer configuration of an optical sheet member of the present invention.

The ultraviolet absorber solution C-1 was added to a mixture including 94.6 parts by mass of the cellulose acylate solution A-1 and 1.3 parts by mass of the matting agent dispersion B-1 such that the amount of each of the ultraviolet absorber (UV-1) and the ultraviolet absorber (UV-2) was 1.0 part by mass with respect to 100 parts by mass of cellulose acylate and was sufficiently stirred while being heated, each component was dissolved, and thus, a dope was prepared. The obtained dope was heated to 30° C., and was cast onto a mirror stainless support which was a drum having a diameter of 3 m through a casting die. The surface temperature of the support was set to −5° C., and the coating width was set to 1470 mm. The doped film which was cast was dried on the drum by drying air at a temperature of 34° C. and a rate of 150 m³/minutes, and was peeled off from the drum in a state where a residual solvent was 150%. When the doped film was peeled off, stretching of 15% was performed in a transport direction (a longitudinal direction). After that, the film was transported while gripping both ends of the film in a width direction (a direction orthogonal to a casting direction) with a pin tenter (a pin tenter illustrated in FIG. 3 of JP1992-1009A (JP-H04-1009A)), and a stretching treatment was not performed in the width direction. Further, the film was further dried by being transported between rolls of a heat treatment device, and thus, a cellulose acylate support T1 was manufactured. The amount of residual solvent of the prepared long cellulose acylate support T1 was 0.2%, the thickness was 60 μm, and Re and Rth at 550 nm were 0.8 nm and 40 nm, respectively.

<Preparation of λ/4 Plate F>

POVAL PVA-103 manufactured by KURARAY CO., LTD. was dissolved in pure water. The concentration and the coating amount of the solution described above were adjusted such that the thickness of the dried film became 0.5 μm, and the solution was applied onto the cellulose acylate support T1 prepared as described above with a bar. After that, the coated film was heated at 100° C. for 5 minutes. Further, the surface was subjected to a rubbing treatment, and thus, an alignment layer was obtained.

Subsequently, a solute having compositions described below was dissolved in methyl ethyl ketone (MEK), and thus, a coating liquid was prepared. The concentration and the coating amount of the coating liquid was adjusted such that the thickness of the dried film became 1 μm, and the coating liquid was applied onto the alignment layer described above with a bar. After that, a solvent was retained at 85° C. for 2 minutes, and the solvent was vaporized, and then, heating and maturing were performed at 100° C. for 4 minutes, and thus, a homogeneous alignment state was obtained. Furthermore, a disk-like compound may be vertical aligned with respect to the plane of the support.

After that, the coated film was retained at 80° C. and was subjected to ultraviolet irradiation under a nitrogen atmosphere by using a high pressure mercury lamp, and thus, a λ/4 plate F was prepared.

<Solute Composition of Coating Liquid for Preparing λ/4 Plate F>

| | |
|---|---|
| Disk-Like Liquid Crystal Compound (Compound 1) | 35 parts by mass |
| Disk-Like Liquid Crystal Compound (Compound 2) | 35 parts by mass |
| Alignment Aid (Compound 3) | 1 parts by mass |
| Alignment Aid (Compound 4) | 1 part by mass |
| Polymerization Initiator (Compound 5) | 3 parts by mass |

<Preparation of Retardation Element I>

A styrene-maleic anhydride copolymer ("DYLARK D332", manufactured by NOVA Chemicals Corporation, Tg=131° C.) was used as a material having a negative intrinsic birefringence value, and a norbornene-based resin (Product Name: ZEONOR 1020, manufactured by Zeon Corporation, Tg=105° C.) was used as a transparent resin material. First, each of the norbornene-based resin and a styrene-maleic anhydride copolymer in a melted state was stored in each extruder of an extruding die in which two extruders were integrally combined in an extruding die. An extruding flow path of the extruder in which the norbornene-based resin described above was stored branched into two paths, the styrene-maleic anhydride copolymer extruded from the other extruder was interposed between the norbornene-based resins extruded from the branching flow paths, and a laminated body having a three-layer configuration was formed in the extruding die. In addition, a filter was arranged on a communication port of the extruding die of the two extruders, the norbornene-based resin and the styrene-maleic anhydride copolymer described above passed through the filter, and then, were extruded into the extruding die, and thus, a laminated body having a three-layer structure was obtained. The thickness unevenness of the laminated body was measured by using a scanning thickness meter. The thickness unevenness was measured by performing continuous scanning in a longitudinal direction of the laminated body. The obtained laminated body had an average thickness of 300 μm, and the thickness unevenness was 2.5% with respect to the average thickness described above.

Next, the laminated body was sequentially fed into a monoaxial stretching device in which monoaxial stretching was performed in a vertical direction parallel to a transport direction of a heating zone and a tenter stretching device (in which monoaxial stretching was performed in a horizontal direction vertical to the transport direction), and then, was subjected to sequentially biaxial stretching, and thus, a retardation element I was prepared. The stretching temperature was 140° C. in both of the vertical stretching and the horizontal stretching described above, and the stretching ratio of the vertical stretching was 1.8 times and the stretching ratio of the horizontal stretching was 1.5 times.

The average thickness of the obtained retardation element I was 120 μm, and the refractive index and the retardation were measured by using an automatic birefringence measurement device KOBRA-21SDH (manufactured by Oji Scientific Instruments), and thus, in the refractive index in a plane direction, nx was 1.5732 and ny was 1.5731, and in the refractive index in a thickness direction, nz was 1.5757. In the retardation, Re was 10 nm, and Rth was −300 nm.

<Preparation of λ/4 Plate H>

A norbornene-based resin (Product Name: ZEONOR 1420, manufactured by Zeon Corporation, Tg=136° C.) was used as a material having a positive intrinsic birefringence value, a styrene-maleic anhydride copolymer (Product Name: DYLARK D332, manufactured by NOVA Chemicals Corporation, Tg=131° C.) was used as a material having a negative intrinsic birefringence value, and a laminated body having a three-layer structure was obtained by the same method as that of the retardation element I. The thickness unevenness of the laminated body was measured by using a scanning thickness meter. The thickness unevenness was measured by performing continuous scanning in a longitudinal direction of the laminated body. The obtained laminated body had an average thickness of 120 μm, and the thickness unevenness was 2.2% with respect to the average thickness described above.

Next, the laminated body was stretched at a temperature of 125° C. and a stretching ratio of 1.7 times by using a vertically monoaxial stretching device, and the retardation was measured by using an automatic birefringence measurement device KOBRA-21SDH (manufactured by Oji Scientific Instruments), and thus, a λ/4 plate H was obtained in which each ratio of the retardation and wavelengths λ of 450 nm, 550 nm, and 650 nm was 0.235, 0.250, and 0.232.

<Formation of Light Reflection Layer D>

SUNEVER SE-130 (manufactured by Nissan Chemical Industries, Ltd.) was dissolved in N-methyl pyrrolidone as an alignment layer. The concentration and the coating amount of the solution described above were adjusted such that the thickness of the dried film became 0.5 µm, and the solution was applied onto GLASS 7059 manufactured by Corning Incorporated with a bar. The coated film was heated at 100° C. for 5 minutes, and was further heated at 250° C. for 1 hour. After that, the surface thereof was subjected to a rubbing treatment, and thus, an alignment layer was obtained.

Subsequently, a solute having compositions described below was dissolved in MEK, and thus, a coating liquid forming a first light reflection layer containing a disk-like liquid crystal compound was prepared. The concentration and the coating amount of the coating liquid were adjusted such that the thickness of the dried film of the first light reflection layer was adjusted as shown in Table 4, the coating liquid was applied onto the alignment layer described above with a bar, a solvent was retained at 70° C. for 2 minutes, and the solvent was vaporized, and then, heating and maturing were performed at 100° C. for 4 minutes, and thus, a homogeneous alignment state was obtained.

After that, the coated film was retained at 45° C., and was subjected to ultraviolet irradiation under a nitrogen atmosphere by using a high pressure mercury lamp, and thus, a light reflection layer D was formed. The film thickness of the light reflection layer D was 2.4 µm. A cholesteric pitch was measured by using AXOSCAN manufactured by Opto Science, Inc., and thus, a reflection wavelength was 700 nm.

<Solute Composition of Coating Liquid for Forming Light Reflection Layer D>

| Disk-Like Liquid Crystal Compound 1 | 56 parts by mass |
| Disk-Like Liquid Crystal Compound 2 | 14 parts by mass |
| Alignment Aid (Compound 3) | 1 part by mass |
| Alignment Aid (Compound 4) | 1 part by mass |
| Polymerization Initiator (Compound 5) | 3 parts by mass |
| Chiral Agent 1 | 2.5 parts by mass |

<Formation of Light Reflection Layer E>

A light reflection layer E was prepared by the same method as that in the formation of the light reflection layer D except that the reflection wavelength peak and the coating thickness were changed by adjusting the mixed ratio of the chiral agent. The film thickness of the light reflection layer E was 2.4 µm. A cholesteric pitch was measured by using AXOSCAN manufactured by Opto Science, Inc., and thus, a reflection wavelength was 450 nm.

(Preparation of Optical Laminated Body A)

First, a terminal fluorinated alkyl group-containing polymer having an optical active site (hereinafter, referred to as a compound 7) was obtained in the procedure disclosed in [0065] of JP4570377B. Specifically, a compound A was obtained as follows.

50 parts by mass of a fluorine-based solvent AK-225 (manufactured by ASAHI GLASS CO., LTD., a mixed solvent of 1,1,1,2,2-pentafluoro-3,3-dichloropropane:1,1,2,2,3-pentafluoro-1,3-dichloropropane=1:1.35 (a molar ratio)) and 5.22 parts by mass of a reactive chiral agent having an optical active site with a structure described below (the compound 7, in the formula, * represents the optical active site) were put into a four-neck flask comprising a condenser, a thermometer, a stirrer, and a dropping funnel, the temperature of a reaction vessel was adjusted to be 45° C., and then, 6.58 parts by mass of a solution of diperfluoro-2-methyl-3-oxahexanoyl peroxide/AK225 of 10 mass % was dropped thereinto for 5 minutes. After ending the dropping, a reaction was performed at 45° C. for 5 hours in nitrogen gas stream, and after that, a product was concentrated into 5 ml, reprecipitation was performed by hexane, and drying was performed, and thus, 3.5 parts by mass of a terminal fluorinated alkyl group-containing polymer having an optical active site (the compound 7) was obtained (a yield of 60%).

The molecular weight of the obtained polymer was measured by GPC using tetrahydrofuran (THF) as a developing solvent, and thus, Mn was 4,000 (Mw/Mn=1.77), and a fluorine content was measured, and thus, the fluorine content was 5.89 mass %.

Compound 7

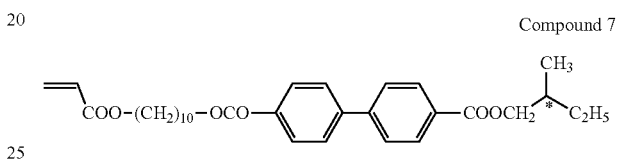

An alignment film coating liquid formed of 10 parts by mass of polyvinyl alcohol and 371 parts by mass of water was applied onto one surface of GLASS 7059 manufactured by Corning Incorporated and was dried, and thus, an alignment film having a thickness of 1 µm was formed. Next, the alignment film was continuously subjected to a rubbing treatment in a direction parallel to a longitudinal direction of the glass.

A composition having compositions described below was applied onto the alignment film by using a bar coater, was dried at room temperature for 10 seconds, and then, was heated (aligned and matured) in an oven at 100° C. for 2 minutes, and was further subjected to ultraviolet irradiation for 30 seconds, and thus, an optical laminated body (A) including a cholesteric liquid crystal layer (A) having a thickness of 5.0 µm was prepared.

<Composition for Forming Cholesteric Liquid Crystal Layer (A)>

| Compound 8 | 8.2 parts by mass |
| Compound 9 | 0.3 parts by mass |
| Terminal Fluorinated Alkyl Group-Containing Polymer Having Optical Active Site Prepared in Advance (Compound 7) | 1.9 parts by mass |
| Methyl Ethyl Ketone | 24.0 parts by mass |

The sectional surface of the cholesteric liquid crystal layer (A) was observed by a scanning electron microscope, and thus, a structure having a spiral axis in a layer normal direction and a continuously changing cholesteric pitch was obtained. Here, in the cholesteric pitch, when the sectional surface of the cholesteric liquid crystal layer was observed by a scanning electron microscope, the width of two repetitions of a bright portion and a dark portion (bright-dark-bright-dark) in the layer normal direction was counted as one pitch.

In a case where a surface side having a small cholesteric pitch was defined as an x surface, and a surface side having a large cholesteric pitch was defined as a y surface, as a result of performing calculation from the measured cholesteric pitch, a cholesteric reflection wavelength in the vicinity of the x surface side was 410 nm, and a cholesteric reflection wavelength in the vicinity of the y surface side was 700 nm.

In addition, for example, even in a case where a long cellulose acylate film (TD80UL (manufactured by Fujifilm Corporation) of greater than or equal to 100 meters is used instead of GLASS 7059 manufactured by Corning Incorporated, an optical laminated body (AL) including the same cholesteric liquid crystal layer (A) is able to be prepared. Thus, it is more preferable that an optical sheet member is able to be prepared in a so-called roll to roll process by using a long cellulose acylate film from the viewpoint of manufacturing suitability. The long film to be used is not limited thereto insofar as the film is able to transfer the cholesteric liquid crystal layer.

structure having a spiral axis in the layer normal direction and a continuously changing cholesteric pitch in the thickness direction was obtained.

In addition, as a result of measuring the cholesteric pitch by the same method as that of the optical laminated body A, a cholesteric reflection wavelength in the vicinity of the x surface side was 500 nm, and a cholesteric reflection wavelength in the vicinity of the y surface side was 700 nm.

<Preparation of Brightness Enhancement Film>

In the configuration illustrated in FIG. 1, any one of the optical laminated bodies A, B, and C, a light reflection layer, and a λ/4 plate were bonded to each other by using a pressure sensitive adhesive material, and thus, brightness enhancement films of Examples 101 to 110, and Compara-

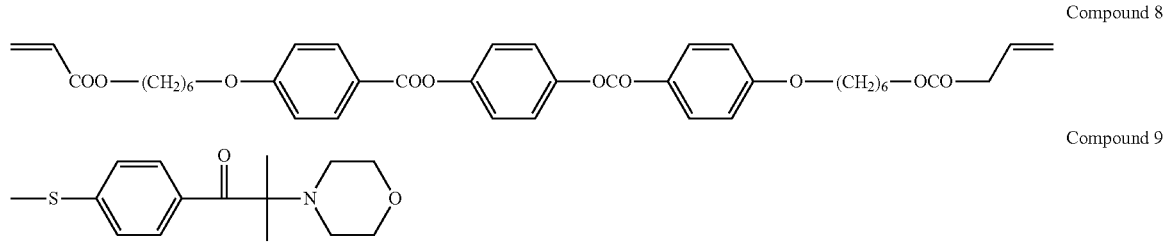

Compound 8

Compound 9

(Preparation of Optical Laminated Body B)

In the preparation of the optical laminated body A, an optical laminated body B was prepared by the same method as that of the optical laminated body A except that the film thickness of the cholesteric liquid crystal layer was 3.5 μm, and the added amount, the maturing temperature, and the ultraviolet irradiation conditions of the polymer (the compound A) were changed.

The sectional surface of the optical laminated body B was observed by a scanning electron microscope, and thus, a structure having a spiral axis in the layer normal direction and a continuously changing cholesteric pitch in the thickness direction was obtained.

In addition, as a result of measuring the cholesteric pitch by the same method as that of the optical laminated body A, a cholesteric reflection wavelength in the vicinity of the x surface side was 410 nm, and a cholesteric reflection wavelength in the vicinity of the y surface side was 580 nm.

In addition, even in a case where a long cellulose acylate film (TD80UL (manufactured by Fujifilm Corporation) is used instead of GLASS 7059 manufactured by Corning Incorporated, an optical laminated body (BL) including the same cholesteric liquid crystal layer (B) is able to be prepared. Thus, it is more preferable that an optical sheet member is able to be prepared in a roll to roll process by using a long cellulose acylate film from the viewpoint of the manufacturing suitability. The long film to be used is not limited thereto insofar as the film is able to transfer the cholesteric liquid crystal layer.

(Preparation of Optical Laminated Body C)

In the preparation of the optical laminated body A, an optical laminated body C was prepared by the same method as that of the optical laminated body A except that the film thickness of the cholesteric liquid crystal layer was 3.5 μm, and the added amount, the maturing temperature, and the ultraviolet irradiation conditions of the polymer (the compound A) were changed.

The sectional surface of the optical laminated body C was observed by a scanning electron microscope, and thus, a tive Examples 101 to 103 were prepared. Furthermore, in the optical laminated body, only the cholesteric liquid crystal layer which was transferred from a support glass by using the pressure sensitive adhesive material was used as the configuration of the brightness enhancement film. In addition, in Example 110, the brightness enhancement film prepared as described above was dipped in pure water at 25° C. for 10 minutes, and PVA-103 which is the alignment layer of the λ/4 plate was dissolved, and thus, cellulose acylate which is the support was peeled off.

A roll-like polyvinyl alcohol film having a thickness of 80 μm which was continuously dyed in an aqueous solution of iodine was stretched in a transport direction at a stretching ratio of 5 times and was dried, and thus, a long polarizer was manufactured, and the brightness enhancement film described above and a polarizing plate protective film (TD80UL (manufactured by Fujifilm Corporation) were respectively bonded to both surfaces of the polarizer, and thus, an optical sheet member was manufactured. The λ/4 plate of the brightness enhancement film adhered to the polarizer at the time of performing bonding.

Examples 111 to 113

<Preparation of Support for Brightness Enhancement Film>

(Preparation of Cellulose Acylate Support T2)

A cellulose acylate support T2 was prepared by the same method as that of the cellulose acylate support T1 described above except that only the thickness was changed to 120 μm. In the optical properties thereof, Rth was 80 nm.

(Preparation of Cellulose Acylate Support T3)

Compositions described below were put into a mixing tank and were stirred, each component was dissolved, and thus, a cellulose acetate solution was adjusted.

Composition of Core Layer Cellulose Acylate Dope:

| | |
|---|---|
| Cellulose Acetate Having Degree of Substitution of Acetyl of 2.88 | 100 parts by mass |
| Plasticizer 2 (Having Structure Described below) | 15 parts by mass |
| Methylene Chloride | 426 parts by mass |
| Methanol | 64 parts by mass |

(Plasticizer 2)

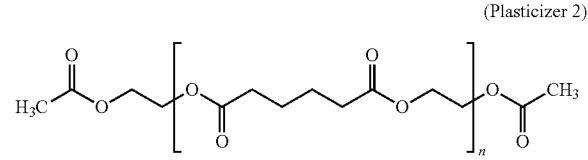

Molecular Weight of approximately 1000

(Preparation of Outer Layer Cellulose Acylate Dope)

10 parts by mass of a matting agent solution described below was added to 90 parts by mass of the core layer cellulose acylate dope described above, and thus, an outer layer cellulose acetate solution was adjusted.

Composition of Matting Agent Solution:

| | |
|---|---|
| Silica Particles Having Average Particle Size 20 nm (AEROSIL R972, manufactured by NIPPON AEROSIL CO., LTD.) | 2 parts by mass |
| Methylene Chloride | 76 parts by mass |
| Methanol | 11 parts by mass |
| Core Layer Cellulose Acylate Dope | 1 part by mass |

(Preparation of Cellulose Acylate Support T3)

Three layers of the core layer cellulose acylate dope described above, and the outer layer cellulose acylate dopes on both sides of the core layer cellulose acylate dope were simultaneously cast from a casting port onto a drum at 20° C. Peeling off was performed in a state where a solvent content ratio was approximately 20 mass %, both ends of the film in a width direction were immobilized by a tenter clip, and the film was dried while being stretched in a horizontal direction at a stretching ratio of 1.1 times in a state where a residual solvent was in the amount of 3% to 15%. After that, a cellulose acylate support T3 having a thickness of 25 μm and Rth of 0 nm was prepared by being transported between rolls of a heat treatment device.

<Preparation of λ/4 Plates Tλ1, Tλ2, and Tλ3>

(Alkali Saponification Treatment)

The cellulose acylate films T1, T2, and T3 described above passed through dielectric heating rolls at a temperature of 60° C., and thus, the film surface temperature was heated to 40° C., and then, an alkali solution having compositions described below was applied onto the band surface of the film by using a bar coater at a coating amount of 14 ml/m² and was transported under a steam type far infrared heater manufactured by Noritake Co., Ltd. which was heated to 110° C. for 10 seconds. Subsequently, pure water was applied thereon by using the same bar coater at a coating amount of 3 ml/m². Next, water washing of a fountain coater and water draining of an air knife were repeated three times, and then, the film was dried by being transported to a drying zone at 70° C. for 10 seconds, and thus, a cellulose acylate film which had been subjected to an alkali saponification treatment was prepared.

Alkali Solution Composition

| | |
|---|---|
| Potassium Hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 parts by mass |
| Propylene Glycol | 14.8 parts by mass |

(Formation of Alignment Film)

An alignment film coating liquid (A) having compositions described below was continuously applied onto the surface of the cellulose acylate supports T1, T2, and T3 to which the alkali saponification treatment had been performed by using a wire bar of #14. The alignment layer coating liquid (A) was dried by hot air at 60° C. for 60 seconds, and was further dried by hot air at 100° C. for 120 seconds. The degree of saponification of the used modified polyvinyl alcohol 1 was 96.8%.

Composition of Alignment Film Coating Liquid (A)

| | |
|---|---|
| Modified Polyvinyl Alcohol 1 | 10 parts by mass |
| Water | 308 parts by mass |
| Methanol | 70 parts by mass |
| Isopropanol | 29 parts by mass |
| Photopolymerization Initiator (IRGACURE 2959, manufactured by BASF SE) | 0.8 parts by mass |

The alignment film prepared as described above was continuously subjected to a rubbing treatment. At this time, a longitudinal direction of a long film was parallel to a transport direction, and an angle between the longitudinal direction of the film and a rotational axis of a rubbing roller was approximately 45°.

Subsequently, a solute having compositions described below was dissolved in MEK, and thus, a coating liquid was prepared. The concentration and the coating amount of the coating liquid were adjusted such that the thickness of the dried film became 1.0 μm, and the coating liquid was applied onto the alignment layer described above with a bar. The coated film was heated and matured at 80° C. for 1 minute, and thus, a homogeneous alignment state was obtained. After that, the coated film was retained at 75° C., and was subjected to ultraviolet irradiation under nitrogen atmosphere by using a high pressure mercury lamp, and a λ/4 plate was formed on each of the cellulose acylate supports T1, T2, and T3, and thus, λ/4 plates Tλ1, Tλ2, and Tλ3 were prepared. In a case where the retardation of the obtained film was measured, the retardation was 128 nm in all of the λ/4 plates Tλ1, Tλ2, and Tλ3.

<Solute Composition of λ/4 Plate Coating Liquid>

| | |
|---|---|
| Disk-Like Liquid Crystal Compound (Compound 1) | 80 parts by mass |
| Disk-Like Liquid Crystal Compound (Compound 2) | 20 parts by mass |
| Alignment Aid 1 | 0.9 parts by mass |
| Alignment Aid 2 | 0.08 parts by mass |
| Surfactant 1 | 0.075 parts by mass |
| Polymerization Initiator | 3 parts by mass |
| Polymerizable Monomer 1 | 10 parts by mass |

<Formation of Reflection Polarizer>
<Formation of First Light Reflection Layer>

A first light reflection layer was formed on the λ/4 plates Tλ1, Tλ2, and Tλ3 described above as a light reflection layer formed by immobilizing a cholesteric liquid crystalline phase using a disk-like liquid crystal compound as a cholesteric liquid crystal material in the following method.

A solute having compositions described below was dissolved in MEK, and thus, a coating liquid for forming the first light reflection layer containing a disk-like liquid crystal compound was prepared. The concentration and the coating amount of the coating liquid were adjusted such that the thickness of the dried film became 2.4 μm, and the coating liquid was applied onto the λ/4 plate described above with a bar, and was heated and matured at 110° C. for 1 minute, and thus, a homogeneous alignment state was obtained. After that, the coated film was retained at 45° C., and was subjected to ultraviolet irradiation under a nitrogen atmosphere by using a high pressure mercury lamp, and thus, light reflection layers TC1, TC2, and TC3 integrated with a λ/4 plate were prepared.

<Light Reflection Composition 1>

| | |
|---|---|
| Disk-Like Liquid Crystal Compound (Compound 1) | 80 parts by mass |
| Disk-Like Liquid Crystal Compound (Compound 2) | 20 parts by mass |
| Surfactant 1 | 0.45 parts by mass |
| Polymerization Initiator 1 | 3 parts by mass |
| Chiral Agent (Compound 6) | 3.5 parts by mass |

<Preparation of Brightness Enhancement Film>

In the configuration illustrated in FIG. 1, the light reflection layers TC1, TC2, and TC3 integrated with a λ/4 plate and an optical laminated body BL were bonded to each other by using an acrylic UV curing adhesive agent in a roll to roll process, and thus, brightness enhancement films of Examples 111, 112, and 113 were prepared. Furthermore, in the optical laminated body BL, only a cholesteric liquid crystal layer transferred from a cellulose acylate film was used as the configuration of the brightness enhancement film.

A roll-like polyvinyl alcohol film having a thickness of 80 μm which had been continuously dyed in an aqueous solution of iodine was stretched in a transport direction at a stretching ratio of 5 times, and was dried, and thus, a long polarizer was manufactured, and the brightness enhancement film described above and a polarizing plate protective film (TD80UL (manufactured by Fujifilm Corporation) were respectively bonded to both surfaces of the polarizer in a roll to roll manner, and thus, an optical sheet member was manufactured.

<Manufacturing of Liquid Crystal Display Device>
Preparation of Quantum Dot Backlight Unit A commercially available liquid crystal display device (manufactured by Panasonic Corporation, Product Name: TH-L42D2) was disassembled, a backlight side polarizing plate was changed to the optical sheet member of Example 101, and a backlight unit was changed to a quantum dot (RGB narrowband) backlight unit described below, and thus, a liquid crystal display device of Example 101 was manufactured.

The used quantum dot backlight unit comprises a blue light emitting diode (manufactured by NICHIA CORPORATION B-LED, a main wavelength of 465 nm, and a half-width of 20 nm) as a light source. In addition, a quantum dot member emitting fluorescent light of green light having a center wavelength of 535 nm and a half-width of 40 nm and red light having a center wavelength of 630 nm and a half-width of 40 nm when blue light of the blue light emitting diode is incident thereon is comprised in the front of the light source. In addition, a reflection member performing conversion of a polarization state of light which is emitted from the light source and is reflected on the brightness enhancement film described above or the optical sheet member described above and reflection of the light is comprised in the rear of the light source.

In Examples 102 to 108, Examples 110 to 113, and Comparative Examples 101, 102, and 104, the same evaluation as that in Example 101 was performed by using a brightness enhancement film having a configuration shown in Table 4.

In addition, even in a case where the other blue light emitting diode and the other quantum dot member were used, and quantum dot backlight units having different main wavelengths were used, the same results were obtained.

Preparation of White LED Backlight Unit

A commercially available liquid crystal display device (manufactured by Panasonic Corporation, Product Name: TH-L42D2) was disassembled, and the optical sheet member of Example 109 was used instead of a backlight side polarizing plate without changing a backlight unit, and thus, a liquid crystal display device of Example 109 was manufactured.

In addition, the same preparation was also performed in the comparative example.

A backlight light source of the liquid crystal display device was blue light having a light emitting peak wavelength of 450 nm. In a region of green to red, there was one light emitting peak, and a peak wavelength was 550 nm and a half-width was 100 nm.

In addition, even in a case where the other commercially available liquid crystal display device was used, and white LED backlights having different light emitting spectrums were used, the same results were obtained.

The configuration of the brightness enhancement film prepared as described above is shown in Table 4.

TABLE 4

| | | | Example 101 λ/4 Plate Support TAC DLC Vertical Alignment Layer | Example 102 λ/4 Plate Support TAC DLC Vertical Alignment Layer | Example 103 λ/4 Plate Support TAC DLC Vertical Alignment Layer | Example 104 λ/4 Plate Support TAC DLC Vertical Alignment Layer | Example 105 λ/4 Plate Support TAC DLC Vertical Alignment Layer | Example 106 λ/4 Plate Support TAC DLC Vertical Alignment Layer |
|---|---|---|---|---|---|---|---|---|
| Configuration of Brightness Enhancement Film | Reflection Polarizer | Reflection Range of First Light Reflection Layer | R | R | GB | BG | RG | GR |

TABLE 4-continued

|  |  |  |  |  |  |  |  |  |
|---|---|---|---|---|---|---|---|---|
|  |  | Optical Laminated Body Used in First Light Reflection Layer | D | D | B | B | C | C |
|  |  | Type of Cholesteric Liquid Crystal of First Light Reflection Layer | DLC | DLC | CLC | CLC | CLC | CLC |
|  |  | Reflection Range of Second Light Reflection Layer | GB | BG | R | R | B | B |
|  |  | Optical Laminated Body Used in Second Light Reflection Layer | B | B | D | D | E | E |
|  |  | Type of Cholesteric Liquid Crystal of Second Light Reflection Layer | CLC | CLC | DLC | DLC | DLC | DLC |
|  | λ/4 Plate | Retardation Element | None | None | None | None | None | None |
|  |  |  | λ/4 Plate F | λ/4 Plate F | λ/4 Plate F | λ/4 Plate F | λ/4 Plate F | λ/4 Plate F |
| Film Thickness | Light Reflection Layer | Optical Laminated Body (Pitch Gradient Layer) | 3.5 | 3.5 | 3.5 | 3.5 | 3.5 | 3.5 |
|  |  | Light Reflection Layer (B Layer or R Layer of DLC) | 2.4 | 2.4 | 2.4 | 2.4 | 1.8 | 1.8 |
|  | λ/4 Plate | DLC Horizontal Alignment Layer | 1 | 1 | 1 | 1 | 1 | 1 |
|  |  | Support λ/4 Plate of Related Art | 60 | 60 | 60 | 60 | 60 | 60 |
|  |  | Retardation Element | — | — | — | — | — | — |
|  |  | Total | 66.9 | 66.9 | 66.9 | 66.9 | 66.3 | 66.3 |
|  | Light Source |  | Qdot | Qdot | Qdot | Qdot | Qdot | Qdot |

|  |  |  | Example 107 λ/4 Plate Support TAC DLC Vertical Alignment Layer | Example 108 λ/4 Plate Support TAC DLC Vertical Alignment Layer | Example 109 λ/4 Plate Support TAC DLC Vertical Alignment Layer | Example 110 λ/4 Plate No Support DLC Vertical Alignment Layer | Example 111 λ/4 Plate Support TAC Rth 40 DLC Vertical Alignment Layer | Example 112 λ/4 Plate Support TAC Rth 80 DLC Vertical Alignment Layer |
|---|---|---|---|---|---|---|---|---|
| Configuration of Brightness Enhancement Film | Reflection Polarizer | Reflection Range of First Light Reflection Layer | B | B | R | R | R | R |

TABLE 4-continued

| | | | | | | | | |
|---|---|---|---|---|---|---|---|---|
| | | Optical Laminated Body Used in First Light Reflection Layer | E | E | D | D | TC1 | TC2 |
| | | Type of Cholesteric Liquid Crystal of First Light Reflection Layer | DLC | DLC | DLC | DLC | DLC | DLC |
| | | Reflection Range of Second Light Reflection Layer | RG | GR | BG | BG | BG | BG |
| | | Optical Laminated Body Used in Second Light Reflection Layer | C | C | B | B | BL | BL |
| | | Type of Cholesteric Liquid Crystal of Second Light Reflection Layer | CLC | CLC | CLC | CLC | CLC | CLC |
| | | λ/4 Plate | λ/4 Plate F | λ/4 Plate F | λ/4 Plate F | λ/4 Plate G | λ/4 Plate Tλ1 | λ/4 Plate Tλ2 |
| | | Retardation Element | None | None | None | None | None | None |
| Film Thickness | Light Reflection Layer | Optical Laminated Body (Pitch Gradient Layer) | 3.5 | 3.5 | 3.5 | 3.5 | 3.5 | 3.5 |
| | | Light Reflection Layer (B Layer or R Layer of DLC) | 1.8 | 1.8 | 2.4 | 2.4 | 2.4 | 2.4 |
| | λ/4 Plate | DLC Horizontal Alignment Layer | 1 | 1 | 1 | 1 | 1 | 1 |
| | | Support | 60 | 60 | 60 | — | 60 | 120 |
| | | λ/4 Plate of Related Art | | | | | | |
| | | Retardation Element | — | — | — | — | — | — |
| | | Total | 66.3 | 66.3 | 66.9 | 6.9 | 66.9 | 126.9 |
| | | Light Source | Qdot | Qdot | White LED | Qdot | Qdot | Qdot |

TABLE 4-continued

| | | | Example 113 λ/4 Plate Support TAC Rth 0 DLC Vertical Alignment Layer | Comparative Example 101 λ/4 Plate | Comparative Example 102 λ/4 Plate + Retardation Element (Configuration of Related Art) | Comparative Example 103 λ/4 Plate + Retardation Element (Configuration of Related Art) | Comparative Example 104 |
|---|---|---|---|---|---|---|---|
| Configuration of Brightness Enhancement Film | Reflection Polarizer | Reflection Range of First Light Reflection Layer | R | RGB | RGB | RGB | None |
| | | Optical Laminated Body Used in First Light Reflection Layer | TC3 | A | A | A | |
| | | Type of Cholesteric Liquid Crystal of First Light Reflection Layer | DLC | CLC | CLC | CLC | |
| | | Reflection Range of Second Light Reflection Layer | BG | None | None | None | |
| | | Optical Laminated Body Used in Second Light Reflection Layer | BL | | | | |
| | | Type of Cholesteric Liquid Crystal of Second Light Reflection Layer | CLC | None | None | None | |
| | | λ/4 Plate | λ/4 Plate Tλ3 | λ/4 Plate H | λ/4 Plate H | λ/4 Plate H | |
| | Retardation Element | | None | None | Retardation Element I | Retardation Element I | |
| Film Thickness | Light Reflection Layer | Optical Laminated Body (Pitch Gradient Layer) | 3.5 | 5 | 5 | 5 | — |
| | | Light Reflection Layer (B Layer or R Layer of DLC) | 2.4 | — | — | — | — |
| | λ/4 Plate | DLC Horizontal Alignment Layer | 1 | — | — | — | — |
| | | Support | 25 | — | — | — | — |

TABLE 4-continued

|  |  |  |  |  |  |  |
|---|---|---|---|---|---|---|
|  | λ/4 Plate of Related Art | 120 | 120 | 120 | — |  |
|  | Retardation Element | — | — | 120 | 120 | — |
|  | Total | 31.9 | 125 | 245 | 245 | — |
| Light Source |  | Qdot | Qdot | Qdot | White LED | Qdot |

In Table 4, a reflection layer including two or more of BGR in a reflection range indicates a reflection layer covering two wavelength regions of B (blue light), G (green light), and R (red light) or the entire wavelength region of BGR by one light reflection layer. In addition, in Table 4, DLC indicates a disk-like liquid crystal compound, and CLC indicates a rod-like liquid crystal compound.

In the brightness enhancement film shown in Table 4, evaluation was performed on the basis of the following criteria.

(1) Front Brightness

Front brightness of the liquid crystal display device at the time of performing white display was measured by the same method as that disclosed in [0180] of JP2009-93166A using a measurement machine (EZ-Contrast 160D, manufactured by ELDIM Corporation). The results were collectively evaluated on the basis of the following criteria. Furthermore, Examples 101 to 113 and Comparative Examples 101 to 103 were based on Comparative Example 104.

5: Higher than the front brightness of the liquid crystal display device of Comparative Example 104 by greater than or equal to 130%.

4: Higher than the front brightness of the liquid crystal display device of Comparative Example 104 by greater than or equal to 120% and less than 130%.

3: Higher than the front brightness of the liquid crystal display device of Comparative Example 104 by greater than or equal to 110% and less than 120%.

2: Less than or equal to the front brightness of the liquid crystal display device of Comparative Example 104.

(2) Oblique Change in Shade

An oblique change in the shade Δu'v' of the liquid crystal display device was evaluated by the following method. A shade color difference Δu'v' obtained by a difference between the values of shade coordinates u' and v' in a front surface (a polar angle of 0 degrees) and a direction at a polar angle of 60 degrees was measured in a direction of an azimuth angle of 0 degrees to 360 degrees, and the average value thereof was set to an evaluation index of the oblique change in the shade Δu'v'. The shade coordinates u'v' were measured by using a measurement machine (EZ-Contrast 160D, manufactured by ELDIM Corporation). The results were collectively evaluated on the basis of the following criteria.

6: Less than the oblique change in the shade of the liquid crystal display device of Comparative Example 101 by greater than or equal to 35%.

5: Less than the oblique change in the shade of the liquid crystal display device of Comparative Example 101 by greater than or equal to 30% and less than 35%.

4: Less than the oblique change in the shade of the liquid crystal display device of Comparative Example 101 by greater than or equal to 20% and less than 30%.

3: Less than the oblique change in the shade of the liquid crystal display device of Comparative Example 101 by greater than or equal to 10% and less than 20%.

2: Greater than or equal to the oblique change in the shade of the liquid crystal display device of Comparative Example 101.

(3) Color Reproduction Range

A color reproduction range of the liquid crystal display device was measured by Bm5 manufactured by TOPCON CORPORATION as disclosed in [0066] of JP2012-3073A. The results were collectively evaluation by the following criteria.

4: Higher than the NTSC ratio of the liquid crystal display device of Comparative Example 103 by greater than or equal to 120%.

3: Higher than the NTSC ratio of the liquid crystal display device of Comparative Example 103 by greater than or equal to 110% and less than 120%.

2: Less than or equal to the NTSC ratio of the liquid crystal display device of Comparative Example 103.

The results are shown in Table 5.

TABLE 5

|  | Example 101 | Example 102 | Example 103 | Example 104 | Example 105 | Example 106 | Example 107 | Example 108 |
|---|---|---|---|---|---|---|---|---|
| Front Brightness | 5 | 5 | 5 | 5 | 5 | 5 | 5 | 5 |
| Oblique Change in Shade | 5 | 6 | 4 | 4 | 5 | 5 | 4 | 4 |
| Color Reproduction Range | 4 | 4 | 4 | 4 | 4 | 4 | 4 | 4 |

|  | Example 109 | Example 110 | Example 111 | Example 112 | Example 113 | Comparative Example 101 | Comparative Example 102 | Comparative Example 103 | Comparative Example 104 |
|---|---|---|---|---|---|---|---|---|---|
| Front Brightness | 4 | 5 | 5 | 5 | 5 | 5 | 5 | 5 | 2 |
| Oblique Change in Shade | 5 | 6 | 6 | 6 | 6 | 2 | 3 | 3 | 5 |
| Color Reproduction Range | 2 | 4 | 4 | 4 | 4 | 4 | 4 | 2 | 4 |

From the table described above, it is found that the brightness enhancement film of the present invention provides excellent front brightness and a reduced oblique change in the shade in a liquid crystal display device.

Examples 114 to 117

A liquid crystal display device of Example 114 was prepared by the same method as that in Example 101 except that a commercially available cellulose acylate film (TD80UL (manufactured by Fujifilm Corporation)) was bonded onto the outside of the second light reflection layer by using a pressure sensitive adhesive agent. The same evaluation as that in Example 101 was performed, and thus, the front brightness was 5, the oblique change in the shade was 6, and the color reproducibility was 4.

A liquid crystal display device of Example 115 was prepared by the same method as that in Example 109, except that a commercially available cellulose acylate film (TD80UL (manufactured by Fujifilm Corporation)) was bonded onto the outside of the second light reflection layer by using a pressure sensitive adhesive agent. The same evaluation as that in Example 109 was performed, and thus, the front brightness was 5, the oblique change in the shade was 6, and the color reproducibility was 2.

A liquid crystal display device of Example 116 was prepared by the same method as that in Example 109 except that a commercially available cellulose acylate film (TD80UL (manufactured by Fujifilm Corporation)) was used as the support at the time of preparing the second light reflection layer, and when the commercially available cellulose acylate film was bonded as the brightness enhancement film, the commercially available cellulose acylate film was bonded such that the cellulose acylate film (TD80UL (manufactured by Fujifilm Corporation)) itself became the outermost layer without being transferred. The same evaluation as that in Example 109 was performed, and thus, the front brightness was 5, the oblique change in the shade was 6, and the color reproducibility was 2.

A liquid crystal display device of Example 117 was prepared by the same method as that in Example 107 except that a commercially available cellulose acylate film (TD80UL (manufactured by Fujifilm Corporation)) was bonded onto the outside of the second light reflection layer by using a pressure sensitive adhesive agent. The same evaluation as that in Example 107 was performed, the front brightness was 5, the oblique change in the shade was 5, and the color reproducibility was 4.

Example 201

Preparation of Support (Preparation of Cellulose Acylate Dope)

Compositions described below were put into a mixing tank and were stirred, each component was dissolved, and a cellulose acetate solution was prepared, and thus, a cellulose acylate dope was prepared.

Cellulose Acetate Solution Composition

| | |
|---|---|
| Cellulose Acetate (Degree of Substitution of 2.88) | 100 parts by mass |
| P-1 | 12 parts by mass |
| Ultraviolet Absorbent (UV-1) | 1.8 parts by mass |
| Ultraviolet Absorbent (UV-2) | 0.8 parts by mass |
| L-1 Described below | 3 parts by mass |
| Methylene Chloride (First Solvent) | 501.1 parts by mass |
| Methanol (Second Solvent) | 74.9 parts by mass |

P-1 is a mixture of triphenyl phosphate (TPP)/biphenyl diphenyl phosphate (BDP)=2/1 (a mass ratio).

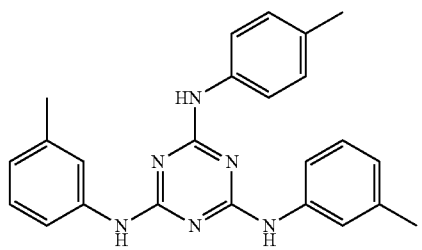

L-1

Further, 3.6 parts by mass of a matting agent dispersion described below was added to 100 parts by mass of the cellulose acylate dope.

(Matting Agent Dispersion)
Silica Particles Dispersion (Average Particle Diameter of 16 nm) 0.7 parts by mass
Methylene Chloride (First Solvent) 75.5 parts by mass
Methanol (Second Solvent) 6.5 parts by mass
Dope Described above 17.3 parts by mass (Preparation of Cellulose Acylate Film)

The cellulose acylate dope was cast onto a drum from a casting port onto a drum at 20° C. Peeling off was performed in a state where a solvent content ratio was approximately 20 mass %, and the film was dried while immobilizing both ends of the film in a width direction by a tenter clip. After that, a cellulose acylate film (CTA1) having a film thickness of 15 μm was prepared by being transported between rolls of a heat treatment device and by being further dried.

The surface of a support of CTA1 described above was subjected to an alkali saponification treatment in the following procedure.

(Alkali Saponification Treatment)

The cellulose acylate film passed through dielectric heating rolls at a temperature of 60° C., and thus, the film surface temperature was heated to 40° C. After that, an alkali solution having compositions described below was applied onto one surface of the film by using a bar coater at a coating amount of 10 ml/m$^2$, and was heated at 105° C. The heated film was transported under a steam type far infrared heater manufactured by NORITAKE CO., LIMITED for 10 seconds. Subsequently, pure water was applied thereon by using the same bar coater at a coating amount of 3 ml/m$^2$. Further, water washing of a fountain coater and water draining of an air knife were repeated three times, and then, the film was dried by being transported to a drying zone at 70° C. for 10 seconds, and thus, a film which had been subjected to an alkali saponification treatment was prepared.

Alkali Solution Composition

| | |
|---|---|
| Potassium Hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene Glycol | 14.8 parts by mass |

(Formation of Alignment Film)

An alignment film coating liquid having compositions described below was continuously applied onto CTA1 which had been subjected to the saponification treatment as described above by using a wire bar of #12. The alignment film coating liquid was dried by hot air at 60° C. for 60 seconds, and was further dried by hot air at 100° C. for 120 seconds. The obtained coated film was continuously subjected to a rubbing treatment. At this time, a longitudinal direction of a long film was parallel to a transport direction, and an angle between a film longitudinal direction and a rotational axis of a rubbing roller was approximately 0°.

Composition of Coating Liquid for Forming Alignment Film

| | |
|---|---|
| Modified Polyvinyl Alcohol 1 | 2.4 parts by mass |
| Isopropyl alcohol | 1.6 parts by mass |
| Methanol | 36 parts by mass |
| Water | 60 parts by mass |

<Preparation of Coating Type Polarizer 1 (TGH1)> cooled to room temperature, and thus, a polarizer 1 was obtained. An absorption axis of the formed polarizer 1 was aligned to be parallel to a rubbing direction.

Composition of Coating Liquid 1 for Dye Polarizer

| | |
|---|---|
| Dichroic Pigment PB-7 | 50 parts by mass |
| Dichroic Pigment C-3 | 30 parts by mass |
| Dichroic Pigment C-19 | 20 parts by mass |
| Fluorine-Containing Compound C | 0.3 parts by mass |
| Chloroform | 1130 parts by mass |

Fluorine-Containing Compound C

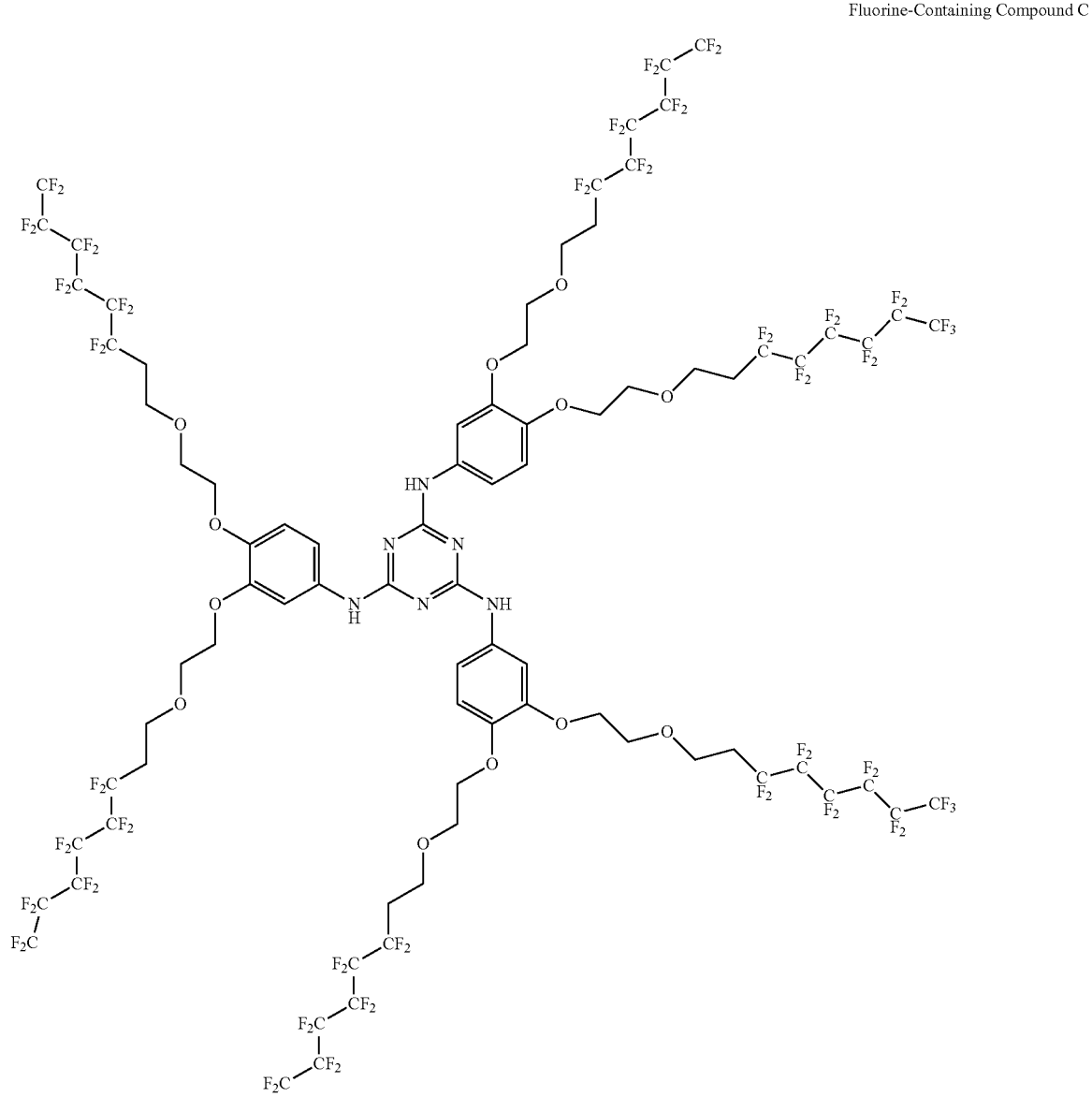

A coating liquid 1 for a dye polarizer was cast onto the rubbing treatment surface of the alignment film described above by using a spin coater at 2000 rpm for 10 seconds. Next, the coating liquid 1 for a dye polarizer matured at a film surface temperature of 160° C. for 15 seconds, and was (Formation of Alignment Film)

An alignment film coating liquid having compositions described below was continuously applied onto the surface of TGH1 prepared as described above on a side opposite to a coating type polarizer surface by using a wire bar of #12.

The alignment film coating liquid was dried by hot air at 60° C. for 60 seconds, and was further dried by hot air at 100° C. for 120 seconds. The obtained coated film was continuously subjected to a rubbing treatment, and thus, a TGH-Y film was obtained. At this time, a longitudinal direction of a long film was parallel to a transport direction, and an angle between a film longitudinal direction and a rotational axis of a rubbing roller was approximately 45°.

Composition of Alignment Film Coating Liquid

| | |
|---|---|
| Modified Polyvinyl Alcohol 1 | 10 parts by mass |
| Water | 371 parts by mass |
| Methanol | 119 parts by mass |
| Glutaraldehyde | 0.5 parts by mass |
| Photopolymerization Initiator (IRGACURE 2959, manufactured by BASF SE) | 0.3 parts by mass |

<Formation of λ/4 Plate Using Disk-Like Liquid Crystal Compound>

A coating liquid A1 containing a disk-like liquid crystal compound having compositions described below was further continuously applied onto TGH-Y on which the alignment film was formed by using a wire bar of #3.2. A transport speed (V) of the film was 40 m/min. In order to dry a solvent of the coating liquid and to align and mature the disk-like liquid crystal compound, the film was heated by hot air at 60° C. for 80 seconds. Subsequently, ultraviolet irradiation was performed at 60° C., and thus, an optical anisotropic layer was formed by immobilizing the alignment of the liquid crystal compound. At this time, the UV irradiation dose was 300 mJ/cm². Furthermore, the film was set to TGH-ZA.

Coating Liquid A1 Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Alignment Aid 1 | 0.9 parts by mass |
| Alignment Aid 2 | 0.1 parts by mass |
| MEGAFAC F444 (manufactured by DIC Corporation) | 0.12 parts by mass |
| Polymerization Initiator 1 | 3 parts by mass |
| Methyl Ethyl Ketone | 301 parts by mass |

<Formation of Cholesteric Layer Using Disk-Like Liquid Crystal Compound>

A first light reflection layer was formed on the surface of the λ/4 plate of TGH-ZA prepared by the method described above, as a light reflection layer formed by immobilizing a cholesteric liquid crystalline phase using a disk-like liquid crystal compound as a liquid crystal compound in a method described below. A transport speed (V) of the film was 30 m/min.

A coating liquid B1 containing a disk-like liquid crystal compound having compositions described below was continuously applied onto the surface of the alignment film prepared as described above such that the film thickness was adjusted to be 3.05 μm.

Subsequently, heating and maturing were performed at 113° C. for 2 minutes, and thus, a homogeneous alignment state was obtained.

Ultraviolet irradiation was performed by using a metal halide lamp manufactured by EYE GRAPHICS CO., LTD. under a nitrogen atmosphere, and thus, a light reflection layer was formed. At this time, the UV irradiation dose was 200 mJ/cm². The prepared film was set to TGH-ZB.

Composition of Coating Liquid (B1) Containing Disk-Like Liquid Crystal Compound

| | |
|---|---|
| Disk-Like Liquid Crystal Compound (Compound 101) | 80 parts by mass |
| Disk-Like Liquid Crystal Compound (Compound 102) | 20 parts by mass |
| Polymerizable Monomer Described below | 2 parts by mass |
| MEGAFAC F444 (manufactured by DIC Corporation) | 0.15 parts by mass |
| Polymerization Initiator 1 | 3 parts by mass |
| Chiral Agent 1 | 5 parts by mass |
| Methyl Ethyl Ketone | 214 parts by mass |
| Cyclohexanone | 66 parts by mass |
| Tertbutyl Alcohol | 50 parts by mass |

<Formation of Pitch Gradient Cholesteric Layer Using Rod-Like Liquid Crystal Compound Having High Δn>

A coating liquid B4 containing a rod-like liquid crystal compound having compositions described below continuously applied onto the cholesteric layer formed of the disk-like liquid crystal of TGH-ZB prepared by the method described above such that the film thickness was adjusted to be 5 μm. A transport speed (V) of the film was 20 m/min.

In order to dry a solvent of the coating liquid and to align and mature the disk-like liquid crystal compound, the film was heated by hot air at 110° C. for 120 seconds. Subsequently, UV irradiation was performed at a temperature of 100° C. and irradiation dose of 20 mJ/cm². Further, after that, in order to align and remature the disk-like liquid crystal compound, the film was heated by hot air at 80° C. for 120 seconds.

Subsequently, UV irradiation was performed at a temperature of 70° C. and irradiation dose of 350 mJ/cm², and thus, a light reflection layer was formed.

Coating Liquid B4 Containing Rod-Like Liquid Crystal Compound

| | |
|---|---|
| Rod-Like Liquid Crystal Compound 204 | 100 parts by mass |
| Multifunctional Monomer A-TMMT (manufactured by Shin Nakamura Chemical Co., Ltd.) | 1 part by mass |
| Polymerization Initiator 1 | 4 parts by mass |
| Surfactant 2 | 0.05 parts by mass |
| Surfactant 3 | 0.01 parts by mass |
| Chiral Agent 2 | Shown in Table 1 |
| Methyl Ethyl Ketone | 200 parts by mass |
| Cyclohexanone | 20 parts by mass |

According to the procedures described above, an optical sheet of Example 201 was obtained in which a pitch gradient cholesteric layer (5 μm), a cholesteric layer (3 μm) using a disk-like liquid crystal compound, a λ/4 layer (1 μm), a PVA alignment film (0.5 μm), a TAC film (15 μm), a PVA alignment film (0.5 μm), and a coating type polarizer (0.2 μm) were formed in this order.

The backlight side polarizing plate of Example 9 described above was substituted with the optical sheet of Example 201 obtained as described above, (and was bonded to a liquid crystal cell by using a pressure sensitive adhesive agent), and the same evaluation as that in Examples 1 to 14 described above was performed. As a result thereof, brightness was 5, a view angle shade was 4, and a color reproduction range was 4.

Examples 218 to 221

(Preparation of Prism Sheet 1)

Methylene chloride was sprayed onto a mold of a nickel alloy which was in the shape of a prism having a pitch of 20 μm and an apex angle of 90 degrees, and immediately after that, a commercially available cellulose acylate film (TD80UL (manufactured by Fujifilm Corporation)) having a film thickness of 80 μm, Re (550) of 4 nm, and Rth (550) of 40 nm was pressed in contact therewith, was dried in a thermostatic tank at 50° C. for 30 minutes while maintaining this state, and was peeled off from the mold, and thus, a prism sheet 1 was prepared.

(Preparation of Prism Sheet 2)

<Preparation of Material>

((Meth)Acrylic Resin)

An acrylic resin described below was used. MMA indicates a structure unit derived from methyl methacrylate.

—Manufacturing of Acrylic Resin A—

An acrylic resin A having a weight average molecular weight of 1,300,000 and an MMA ratio of 100% was synthesized by the following method.

300 g of ion exchange water and 0.6 g of polyvinyl alcohol (a degree of saponification of 80%, and a degree of polymerization of 1,700) were added into a three-neck flask of 1 L in which a mechanical stirrer, a thermometer, and a cooling pipe were provided and were stirred, 100 g of methyl methacrylate and 0.15 g of benzoyl peroxide were added thereto after the polyvinyl alcohol was completely dissolved, and a reaction was performed at 85° C. for 6 hours. The obtained suspension was filtered through nylon filter cloth, and was washed with water, and a filtrate was dried at 50° C. all night, and thus, a desired bead-like polymer was obtained (92.0 g).

<Preparation of Film>

(Dissolving Step: Preparation of (Meth)Acrylic Resin Composition)

Compositions described below were mixed, and were stirred while being heated, and each component was dissolved, and thus, a (meth)acrylic resin composition was prepared.

(Composition of (Meth)Acrylic Resin Composition)

| | |
|---|---|
| Acrylic Resin A | 100 parts by mass |
| Dichloromethane | 534 parts by mass |
| Methanol | 46 parts by mass |

(Casting Step)

The prepared (meth)acrylic resin composition (a dope composition) was homogeneously cast onto a glass plate, and thus, a casting film was formed.

(Peeling Step)

The casting film was peeled off from the glass plate as a film at a time point where the amount of residual solvent in the (meth)acrylic resin composition became 20 mass %, and was dried at 140° C., and thus, an acrylic film having a thickness of 40 μm was prepared. Re (550) and Rth (550) of the prepared film were 2 nm and 5 nm, respectively.

<Preparation of Prism Sheet>

Methylene chloride was sprayed onto a mold of a nickel alloy which was in the shape of a prism having a pitch of 20 μm and an apex angle of 90 degrees, and immediately after that, an acrylic film was pressed in contact therewith, was dried in a thermostatic tank at 50° C. for 30 minutes while maintaining this state, and was peeled off from the mold, and thus, a prism sheet 2 was prepared.

(Preparation of Prism Sheet 3)

—Preparation of Resin Liquid 1—

Compounds described below were mixed at a weight ratio described below, and then, was heated at 50° C., and was stirred and mixed, and thus, a resin liquid 1 was obtained.

Resin Liquid 1 Composition

| | |
|---|---|
| EB3700: EBECRYL 3700, manufactured by DAICEL CORPORATION, Bisphenol A Type Epoxy Acrylate (Viscosity: 2200 mPa · s/65° C.) | 60 parts by mass |
| BPE200: NK ESTER BPE-200, manufactured by Shin Nakamura Chemical Co., Ltd., Ethylene Oxide Added Bisphenol A Methacrylic Acid Ester (Viscosity: 590 mPa · s/25° C.) | 20 parts by mass |
| BR-31: NEW FRONTIER BR-31, manufactured by DKS Co. Ltd., Tribromophenoxy Ethyl Acrylate (Solid at Normal Temperature, Melting Point of Higher than or equal to 50° C.) | 100 parts by mass |
| M-110: ARONIX M-110, manufactured by TOAGOSEI CO., LTD., (Meth)Acrylate of p-Cumyl Phenol Obtained by Reaction of Ethylene Oxide (Viscosity: 150 mPa · s/25° C.) | 20 parts by mass |
| Lucirin TPO-L: manufactured by BASF SE, Radical Generator, 2,4,6-Trimethyl Benzoyl-Diphenyl-Phosphine Oxide | 4 parts by mass |
| MEK: Methyl Ethyl Ketone | 68 parts by mass |

—Preparation of Prism Sheet—

A commercially available cellulose acylate film (TD80UL (manufactured by Fujifilm Corporation)) having a film thickness of 80 μm, Re (550) of 4 nm, and Rth (550) of 40 nm was used as a support. The adjusted resin liquid 1 was applied onto the support with a coater including a slot die by adjusting the coating amount such that the thickness after being dried became 20 μm, and was dried at 100° C. by a hot air circulation type drying device.

Next, the transparent support coated with the resin liquid was interposed between a nip roller and an irregular roller at a nip pressure of 0.5 Pa, and thus, a prism-like irregular pattern having a triangular apex and a triangular valley bottom was formed on the resin layer, and a transparent sheet was prepared. The formed pattern was in the shape of a triangle in which an apex angle of the apex was 90°, and the valley bottom was also in the shape of a triangle in which an angle of a groove not having a flat portion was 90°. The cycle was 20 μm, and the depth was approximately 10 μm.

After that, the transparent sheet was exposed by a metal halide lamp in a state of being wound around the irregular roller, the film was cured and was peeled off from the mold, and thus, a prism sheet 3 was prepared.

(Preparation of Prism Sheet 4)

—Preparation of Support—

Polyethylene terephthalate (PET) film having a film thickness of 100 μm was prepared by the following method as a support.

—Synthesis of Raw Material Polyester—

As described below, a terephthalic acid directly reacted with ethylene glycol, water was distilled, and esterification was performed, and then, a raw material polyester 1 (Sb catalyst-based PET) was obtained by a direct esterification method in which polycondensation was performed under reduced pressure using a continuous polymerization device.

(1) Esterification Reaction 4.7 tons of a terephthalic acid having a high purity and 1.8 tons of ethylene glycol were mixed in a first esterification reactor for 90 minutes, and thus, slurry was formed and was continuously supplied to the first esterification reactor at a flow rate of 3800 kg/h. Further, an ethylene glycol solution of antimony trioxide was continuously supplied, and a reaction was performed in the reactor at a temperature of 250° C. for an average retention time of approximately 4.3 hours while being stirred. At this time, the antimony trioxide was continuously added such that the added amount of Sb became 150 ppm in the element conversion value.

The reactant was fed to a second esterification reactor, and a reaction was performed in the reactor at a temperature of 250° C. and for an average retention time of 1.2 hours while being stirred. An ethylene glycol solution of magnesium acetate and an ethylene glycol solution of trimethyl phosphite were continuously supplied to the second esterification reactor such that the added amount of Mg and the added amount of P became 65 ppm and 35 ppm, respectively, in the element conversion value.

(2) Polycondensation Reaction

The esterification reaction product obtained as described above was continuously supplied to a first polycondensation reactor, and polycondensation was performed in the reactor at a reaction temperature of 270° C. and a pressure of 20 torr ($2.67 \times 10^{-3}$ MPa) for an average retention time of approximately 1.8 hours while being stirred.

Further, the product was fed to a second polycondensation reactor, and a reaction (polycondensation) was performed in the reactor in conditions of a temperature of 276° C., a pressure of 5 torr ($6.67 \times 10^{-4}$ MPa), and a retention time of approximately 1.2 hours while being stirred.

Next, the product was further fed to a third polycondensation reactor, and a reaction (polycondensation) was performed in the reactor in conditions of a temperature of 278° C., a pressure of 1.5 torr ($2.0 \times 10^{-4}$ MPa), and a retention time of 1.5 hours, and thus, a reactant (polyethylene terephthalate (PET)) was obtained.

Next, the obtained reactant was discharged into cold water in the shape of a strand, immediately after that, was cut, and thus, a polyester pellet (Sectional Surface: Long Diameter of approximately 4 mm, Short Diameter of approximately 2 mm, Length: approximately 3 mm) was prepared. In the obtained polymer, an intrinsic viscosity IV was 0.63. The polymer was set to a raw material polyester 1.

Furthermore, IV was obtained from a solution viscosity at 25° C. in a mixed solvent of 1,1,2,2-tetrachloroethane/phenol (=2/3 [Mass Ratio]) in which the raw material polyester 1 was dissolved.

—Film Molding Step—

The raw material polyester 1 was dried such that the moisture content became less than or equal to 20 ppm, and then, was put into a hopper 1 of a monoaxial knead extruder 1 having a diameter of 50 mm, and was melted in the extruder 1 at 300° C. According to extruding conditions described below, a melted resin was extruded from the die through a gear pump and filter (a hole diameter of 20 µm).

In the extruding conditions of the melted resin, a pressure variation was set to 1%, and a temperature distribution of the melted resin was set to 2%, and then, the melted resin was extruded from the die. Specifically, pressurization was performed at a back pressure of 1% with respect to the average pressure in a barrel of the extruder, and heating was performed at a pipe temperature of the extruder higher than the average temperature in the barrel of the extruder by 2%. The melted resin extruded from the die was extruded onto a cooling cast drum of which the temperature was set to 25° C., and adhered to a cooling casting drum by using a static electricity applying method. Peeling off was performed by using a peeling roll arranged to face the cooling casting drum, and thus, a non-stretched polyester film 1 was obtained.

—Preparation of Easily Adhesive Layer—

According to procedures (1) to (5) described below, a coating liquid P1 for a polarizer side easily adhesive layer was prepared.

(1) Synthesis of Copolymerized Polyester Resin (A-1)

Dimethyl Terephthalate of 194.2 parts by mass, Dimethyl Isophthalate of 184.5 parts by mass 14.8 parts by mass of dimethyl-5-sodium sulfoisophthalate, 233.5 parts by mass of diethylene glycol, 136.6 parts by mass of ethylene glycol, and 0.2 parts by mass of tetra-n-butyl titanate were put into a reaction system, and an ester exchange reaction was performed at a temperature from 160° C. to 220° C. for 4 hours. Next, the reaction system was heated to 255° C., and was gradually decompressed, and then, a reaction was performed under reduced pressure of 30 Pa for 1 hour and 30 minutes, and thus, a copolymerized polyester resin (A-1) was obtained.

(2) Preparation of Polyester Water Dispersion Body (Aw-1)

30 parts by mass of the copolymerized polyester resin (A-1) and 15 parts by mass of ethylene glycol n-butyl ether were mixed, were heated at 110° C. and were stirred, and thus, the resin was dissolved. After the resin was completely dissolved, 55 parts by mass of water was gradually added to a polyester solution while being stirred. After water was added, the liquid was cooled to room temperature while being stirred, and thus, a milky white polyester water dispersion body (Aw-1) having a solid content of 30 mass % was prepared.

(3) Preparation of Aqueous Solution of Polyvinyl Alcohol (Bw-1)

10 parts by mass of a polyvinyl alcohol resin (manufactured by KURARAY CO., LTD.) (B-1) having a degree of saponification of 88% and a degree of polymerization of 500 was gradually added to 90 parts by mass of water while being stirred. After the polyvinyl alcohol resin was added, the liquid was heated to 95° C. while being stirred, and thus, the resin was dissolved. After the resin was dissolved, the liquid was cooled to room temperature while being stirred, and thus, an aqueous solution of polyvinyl alcohol (Bw-1) having a solid content of 10 mass % was prepared.

(4) Preparation of Block Polyisocyanate Water Dispersion (C-1)

100 parts by mass of a polyisocyanate compound having an isocyanurate structure in which hexamethylene diisocyanate was used as a raw material (manufactured by Asahi Kasei Chemicals Corporation., DURANATE TPA), 55 parts by mass of propylene glycol monomethyl ether acetate, and 30 parts by mass of polyethylene glycol monomethyl ether (an average molecular weight of 750) were prepared, and were retained at 70° C. for 4 hours under a nitrogen atmosphere. After that, the temperature of a reaction liquid decreased to 50° C., and 47 parts by mass of methyl ethyl ketoxime was dropped. An infrared spectrum of the reaction liquid was measured, and an absorption loss of an isocyanate group was confirmed, and thus, a block polyisocyanate water dispersion (C-1) having a solid content of 75 mass % was obtained.

Coating materials described below were mixed, and thus, a coating liquid P1 for an easily adhesive layer was prepared in which a mass ratio of the polyester-based resin (A-1)/the polyvinyl alcohol-based resin (B-1) became 70/30.

(5) Preparation of Coating Liquid P1 for Easily Adhesive Layer

Coating Liquid P1 Composition

| | |
|---|---|
| Water | 40.61 mass % |
| Isopropanol | 30.00 mass % |
| Polyester Water Dispersion Body (Aw-1) | 11.67 mass % |
| Aqueous Solution of Polyvinyl Alcohol (Bw-1) | 15.00 mass % |
| Block Isocyanate-Based Cross-Linking Agent (C-1) | 0.67 mass % |
| Particles (Silica Sol Having Average Particle Diameter of 100 nm, Solid Content Concentration of 40 mass %) | 1.25 mass % |
| Catalyst (Organic Tin-Based Compound, Solid Content Concentration of 14 mass %) | 0.3 mass % |
| Surfactant (Silicon-Based Surfactant, Solid Content Concentration of 10 mass %) | 0.5 mass % |

—Coating of Easily Adhesive Layer with Respect to One Surface of Polyester Film—

The coating liquid P1 for a polarizer side easily adhesive layer was applied onto one side of the non-stretched polyester film 1 by a reverse roll method while adjusting the coating amount after being dried to be 0.12 g/m².

—Horizontal Stretching Step—
—Preheating Section—

A preheating temperature was set to 90° C., and the non-stretched polyester film 1 coated with the polarizer side easily adhesive layer was heated to a temperature at which stretching was able to be performed.

—Stretching Section—

The non-stretched polyester film 1 which was coated with the polarizer side easily adhesive layer and was preheated was put onto a tenter (a horizontal stretching machine), and was horizontally stretched in a TD direction (a film width direction and a horizontal direction) by the following method in the following conditions while gripping an end portion of the film with a clip, and thus, a horizontally stretched polyester film 1 was obtained.

<<Conditions>>
Horizontal Stretching Temperature: 90° C.
Horizontal Stretching Ratio: 4.3 times
—Thermal Immobilizing Section—

Next, a thermal immobilizing treatment was performed while controlling the film surface temperature of the horizontally stretched polyester film 1 to be a temperature described below.

<<Conditions>>
Thermal Immobilizing Temperature: 180° C.
Thermal Immobilizing Time: 15 seconds
—Thermal Relaxing Section—

The horizontally stretched polyester film 1 after being thermally immobilized was heated at a temperature described below, and thus, the film was relaxed.

Thermal Relax Temperature: 170° C.
Thermal Relaxivity: 2% in TD direction (Film Width Direction and Horizontal Direction)
—Cooling Section—

Next, the horizontally stretched polyester film 1 after being thermally relaxed was cooled at a cooling temperature of 50° C.

The obtained horizontally stretched polyester film 1 was set to a PET film 1. Re (550) and Rth (550) of the PET film 1 were 10,260 nm and 10,493 nm, respectively.

<Preparation of Prism Sheet>

A prism sheet 4 was prepared by the same method as that of prism sheet 3 except that the PET film 1 described above was used as a support.

(Measurement of Depolarization Degree)

In the measurement of the depolarization degree, the linear polarizing plate 1 and the prism sheet prepared as described above or a lens sheet were arranged such that the film planes thereof were parallel to each other, light was incident from the linear polarizer 1 side at an angle of −80 degrees to 80 degrees with respect to the film normal direction from a parallel light source, the color brightness meter BM-5 attached with the linear polarizing plate 2 (manufactured by TOPCON CORPORATION) was arranged, and brightness was measured. When the measurement was performed, the linear polarizing plate 2 was timely rotated, and thus, an angle between the minimum brightness (Ymin) and the maximum brightness (Ymax) was obtained, and the depolarization degree was calculated by Expression 1.

$$\text{Depolarization Degree}=100\times(1-(Y\text{max}-Y\text{min})/(Y\text{max}+Y\text{min})) \qquad \text{(Expression 1)}$$

(Measurement of Ellipticity)

Ellipticity of the prepared prism sheets 1 to 3 was measured according to a method disclosed in Spectral Ellipsometry (written by Hiroyuki FUJIWARA, manufactured by Maruzen, Inc.) pp. 90 to 96.

Example 218

A commercially available iPad Air (iPad is Registered Trademark) (manufactured by Apple Inc.) was disassembled, and the optical sheet member of Example 201 was used instead of a backlight side polarizing plate. Two prism sheets disposed in a backlight unit were taken out, and two prism sheets 1 prepared as described above were disposed instead such that the directions of the prisms were orthogonal to each other, and thus, a liquid crystal display device of Example 218 was manufactured.

Example 219

A liquid crystal display device of Example 219 was manufactured by the same method as that in Example 218 except that the prism sheet 2 was used instead of the prism sheet 1.

Example 220

A liquid crystal display device of Example 220 was manufactured by the same method as that in Example 218 except that the prism sheet 3 was used instead of the prism sheet 1.

Example 221

A liquid crystal display device of Example 221 was manufactured by the same method as that in Example 218 except that the prism sheet 4 was used instead of the prism sheet 1.

(Measurement of Front Brightness)

As disclosed in [0180] of JP2009-93166A, front brightness of the liquid crystal display device at the time of performing white display was measured by using a measurement machine (EZ-Contrast 160D, manufactured by ELDIM Corporation). The results are collectively evaluated on the basis of the following criteria.

4: Higher than the front brightness of the liquid crystal display device of Example 221 by greater than or equal to 110%.

3: Higher than the front brightness of the liquid crystal display device of Example 221 by greater than or equal to 105% and less than 110%.

2: Higher than the front brightness of the liquid crystal display device of Example 221 by greater than or equal to 100% and less than 105%.

1: Less than or equal to the front brightness of the liquid crystal display device of Example 221.

(Measurement of Total Luminous Flux)

Brightness of the liquid crystal display device at the time of performing white display was measured by using a measurement machine (EZ-Contrast 160D, manufactured by ELDIM Corporation), and the total luminous flux [lm] was calculated and was evaluated on the basis of the following criteria in consideration of the brightness value measured at a polar azimuth angle of 15 degrees and a solid angle.

4: Higher than the total luminous flux of the liquid crystal display device of Example 221 by greater than or equal to 110%.

3: Higher than the total luminous flux of the liquid crystal display device of Example 221 by greater than or equal to 105% and less than 110%.

2: Higher than the total luminous flux of the liquid crystal display device of Example 221 by greater than or equal to 100% and less than 105%.

1: Less than or equal to the total luminous flux of the liquid crystal display device of Example 221.

The results are shown in the table. It is found that the prism sheet prism sheet having small optical anisotropy in which the depolarization is suppressed is used together in the optical sheet member of the present invention, and thus, the front brightness and the light utilization efficiency are improved.

EXPLANATION OF REFERENCES

1: backlight side polarizing plate
10: support
11: brightness enhancement film
12: $\lambda/4$ plate
13: reflection polarizer
14a: light reflection layer
14b: broadband light reflection layer
15: polarizer
16: polarizing plate protective film
20: adhesive layer (adhesive agent)
21: optical sheet member
31: backlight unit
41: thin layer transistor substrate
42: liquid crystal cell
43: color filter substrate
44: display side polarizing plate
51: liquid crystal display device
80: manufacturing device of light condensing sheet
81: sheet-like body supply means
82: coating means
89: drying means
83: embossing roll
84: nip roll
85: resin curing means
86: peeling roll
87: protective film supply means
88: sheet winding means

What is claimed is:
1. A brightness enhancement film, comprising:
a $\lambda/4$ plate; and
a reflection polarizer,
wherein the reflection polarizer includes a first light reflection layer and a second light reflection layer in this order from the $\lambda/4$ plate side,
both of the first light reflection layer and the second light reflection layer are light reflection layers formed by immobilizing a cholesteric liquid crystalline phase, and

TABLE 6

|  |  |  | Example 218 | Example 219 | Example 220 | Example 221 |
|---|---|---|---|---|---|---|
| Prism Sheet |  | Prism Sheet No. | Prism Sheet 1 | Prism Sheet 2 | Prism Sheet 3 | Prism Sheet 4 |
|  | Properties of | Re (550) | 4 | 2 | 4 | 10260 |
|  | Support of | Rth (550) | 40 | 5 | 40 | 10493 |
|  | Substrate | Depolarization Degree (Depolarization Degree at 0 Degrees) | 4% | 3% | 4% | 99% |
|  |  | Depolarization Degree (Depolarization Degree at 40 Degrees) | 5% | 4% | 5% | 99% |
|  |  | Depolarization Degree (Depolarization Degree at 80 Degrees) | 8% | 4% | 7% | 99% |
|  |  | Ellipticity (Ellipticity at 0 Degrees) | 0.98 | 0.99 | 0.98 | N.D. |
|  |  | Ellipticity (Ellipticity at 40 Degrees) | 0.92 | 0.98 | 0.94 | N.D. |
|  |  | Ellipticity (Ellipticity at 80 Degrees) | 0.88 | 0.96 | 0.87 | N.D. |
| Performance |  | Front Brightness | 4 | 4 | 4 | 1 |
|  |  | Total Luminous Flux | 3 | 4 | 3 | 1 | one light reflection layer of the first light reflection layer and the second light reflection layer is a layer formed of a polymerizable liquid crystal composition containing a rod-like liquid crystal compound, and the other light reflection layer is formed of a polymerizable liquid crystal composition containing a disk-like liquid crystal compound.

2. The brightness enhancement film according to claim 1, wherein at least one of the first light reflection layer or the second light reflection layer is a broadband light reflection layer.

3. The brightness enhancement film according to claim 1, wherein the first light reflection layer is a layer formed of a polymerizable liquid crystal composition containing a disk-like liquid crystal compound, and the second light reflection layer is a layer formed of a polymerizable liquid crystal composition containing a rod-like liquid crystal compound.

4. The brightness enhancement film according to claim 1, wherein a spiral pitch of a cholesteric liquid crystalline phase of the layer formed of the polymerizable liquid crystal composition containing the rod-like liquid crystal compound is continuously changed in a film thickness direction of the layer.

5. The brightness enhancement film according to claim 1, wherein a birefringence Δn of the rod-like liquid crystal compound is greater than or equal to 0.2 and less than or equal to 0.5.

6. The brightness enhancement film according to claim 1, wherein one light reflection layer of the first light reflection layer and the second light reflection layer is a broadband light reflection layer which reflects blue light and green light, and the other light reflection layer is a red light reflection layer.

7. The brightness enhancement film according to claim 6, wherein the red light reflection layer is a light reflection layer which further reflects infrared light.

8. The brightness enhancement film according to claim 1, wherein one light reflection layer of the first light reflection layer and the second light reflection layer is a broadband light reflection layer which reflects green light and red light, and the other light reflection layer is a blue light reflection layer.

9. The brightness enhancement film according to claim 1, wherein the λ/4 plate is a layer formed of a polymerizable liquid crystal composition containing a disk-like liquid crystal compound.

10. The brightness enhancement film according to claim 1, further comprising:
a layer changing a polarization state of light on a side of the reflection polarizer opposite to the λ/4 plate side,
wherein the layer changing the polarization state of the light satisfies the following conditions 0<|Average Refractive Index of Layer Changing Polarization State of Light −Average Refractive Index of Light Reflection Layer on Outermost Layer |<0.8.

11. The brightness enhancement film according to claim 1, wherein the disk-like liquid crystal compound is any of the following compounds

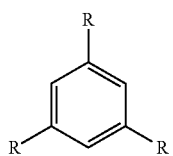

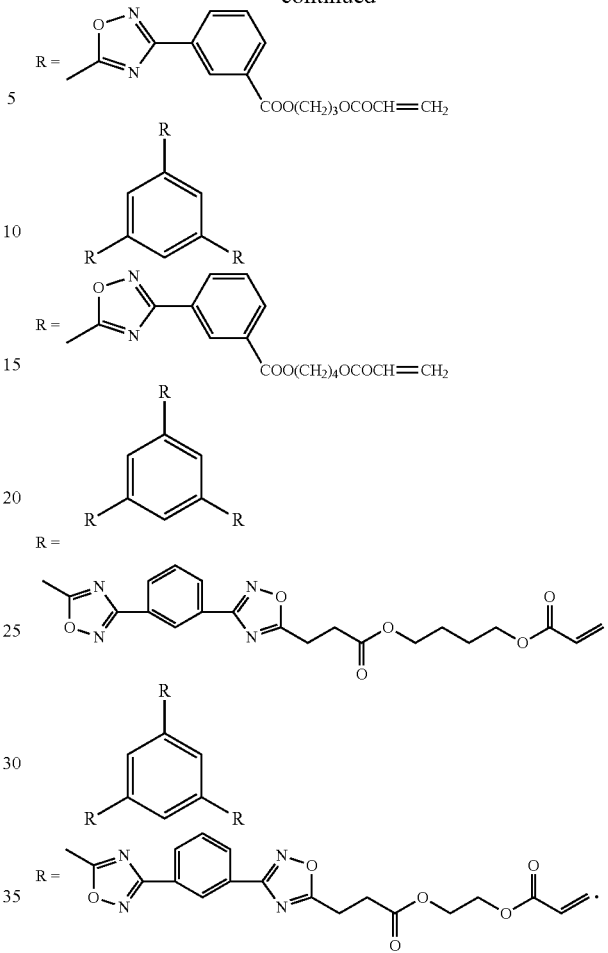

12. An optical sheet member, comprising:
the brightness enhancement film according to claim 1; and
a polarizing plate including a polarizer,
wherein an angle between a slow axis of the λ/4 plate and an absorption axis of the polarizer is 30° to 60°, and
the polarizing plate, the λ/4 plate, and the reflection polarizer are disposed in this order.

13. A liquid crystal display device, sequentially comprising:
a liquid crystal cell;
a polarizing plate including a polarizer;
the brightness enhancement film according to claim 1; and
a backlight unit,
wherein the backlight unit comprises a light source emitting blue light which has a light emission center wavelength in a wavelength range of 430 nm to 500 nm, green light having a light emission center wavelength in a wavelength range of 500 nm to 600 nm, and red light having at least a part of a light emission intensity peak in a wavelength range of 600 nm to 700 nm, and
the backlight unit comprises a reflection member performing conversion of a polarization state of light which is emitted from the light source and is reflected on the brightness enhancement film and reflection of the light in the rear of the light source.

14. The liquid crystal display device according to claim 13, wherein all half-widths of the blue light, the green light, and the red light are less than or equal to 100 nm.

15. The liquid crystal display device according to claim 13,
wherein the light source is a light source including a blue light emitting diode which emits the blue light, and a fluorescent material which emits the green light and the red light when the blue light of the blue light emitting diode is incident thereon.

16. The liquid crystal display device according to claim 15,
wherein the fluorescent material is a quantum dot member.

17. The liquid crystal display device according to claim 13,
wherein the light source is a white LED.

18. The liquid crystal display device according to claim 13,
wherein the backlight unit comprises at least one light condensing sheet.

19. The liquid crystal display device according to claim 18,
wherein the light condensing sheet includes a transparent support and a light condensing layer,
a surface on the light condensing layer side with respect to the transparent support has an irregular shape,
Re of the transparent support at a wavelength of 550 nm is greater than or equal to 0 nm and less than or equal to 20 nm, and
Rth of the transparent support at a wavelength of 550 nm is greater than or equal to −80 nm and less than or equal to 80 nm.

20. The liquid crystal display device according to claim 18,
wherein the light condensing sheet is formed of a polymer film,
the light condensing sheet is obtained by allowing at least one surface of a substrate to have an irregular shape,
Re of the substrate at a wavelength of 550 nm is greater than or equal to 0 nm and less than or equal to 20 nm, and
Rth of the substrate at a wavelength of 550 nm is greater than or equal to −80 nm and less than or equal to 80 nm.

* * * * *